US012710380B2

(12) United States Patent
Chen et al.

(10) Patent No.: US 12,710,380 B2
(45) Date of Patent: Aug. 18, 2026

(54) RAY SCANNING APPARATUS

(71) Applicants: Nuctech Company Limited, Beijing (CN); Tsinghua University, Beijing (CN)

(72) Inventors: Zhiqiang Chen, Beijing (CN); Li Zhang, Beijing (CN); Qingping Huang, Beijing (CN); Xin Jin, Beijing (CN); Hui Ding, Beijing (CN); Yong Zhou, Beijing (CN); Baoyuan Hu, Beijing (CN); Zhenhua Zhao, Beijing (CN)

(73) Assignees: Nuctech Company Limited, Beijing (CN); Tsinghua University, Beijing (CN)

( * ) Notice: Subject to any disclaimer, the term of this patent is extended or adjusted under 35 U.S.C. 154(b) by 101 days.

(21) Appl. No.: 18/575,789

(22) PCT Filed: Jul. 1, 2022

(86) PCT No.: PCT/CN2022/103432
§ 371 (c)(1),
(2) Date: Dec. 29, 2023

(87) PCT Pub. No.: WO2023/280079
PCT Pub. Date: Jan. 12, 2023

(65) Prior Publication Data

US 2024/0369499 A1 Nov. 7, 2024

(30) Foreign Application Priority Data

Jul. 7, 2021 (CN) ......................... 202110769674.8

(51) Int. Cl.
*G01N 23/04* (2018.01)
*G01N 23/06* (2018.01)

(52) U.S. Cl.
CPC ............. *G01N 23/04* (2013.01); *G01N 23/06* (2013.01); *G01N 2223/20* (2013.01);
(Continued)

(58) Field of Classification Search
CPC ......... G01N 2223/20; G01N 2223/308; G01N 2223/32; G01N 2223/321;
(Continued)

(56) References Cited

U.S. PATENT DOCUMENTS 7,440,543 B2 10/2008 Morton
9,618,648 B2 * 4/2017 Morton ................. A61B 6/032
(Continued)

FOREIGN PATENT DOCUMENTS

CN 101361015 A 2/2009
CN 103340641 A 10/2013
(Continued)

OTHER PUBLICATIONS

"Chinese Application No. 202110769674.8, Office Action dated May 30, 2025", w English Translation, (May 30, 2025), 14 pgs.
(Continued)

*Primary Examiner* — David J Makiya
*Assistant Examiner* — Soorena Kefayati
(74) *Attorney, Agent, or Firm* — Schwegman Lundberg & Woessner, P.A.

(57) ABSTRACT

A ray scanning apparatus, including: a conveying device for conveying an object under inspection to pass through a scanning area; a ray source assembly including a plurality of ray source modules arranged around the scanning area on an upper side of the conveying device and fixed in a plane perpendicular to a conveying direction of the object under inspection; and a detector assembly including a plurality of detector sets fixed in a plane perpendicular to the conveying direction of the object under inspection; the detector assem-
(Continued)

bly is located between the ray source assembly and the scanning area in a direction perpendicular to the conveying direction of the object under inspection, the ray source assembly and the detector assembly are arranged to overlap at least partially in the conveying direction of the object under inspection, and the plurality of ray source modules are mounted and detached independently of each other.

20 Claims, 16 Drawing Sheets

(52) U.S. Cl.
CPC ................ *G01N 2223/3307* (2013.01); *G01N 2223/401* (2013.01); *G01N 2223/501* (2013.01); *G01N 2223/643* (2013.01)

(58) Field of Classification Search
CPC ... G01N 2223/3307; G01N 2223/3308; G01N 2223/401; G01N 2223/419; G01N 2223/501; G01N 2223/643; G01N 23/04; G01N 23/046; G01N 23/06; G01V 5/226
See application file for complete search history.

(56) References Cited

U.S. PATENT DOCUMENTS

| | | | | |
|---|---|---|---|---|
| 10,371,648 | B2 | 8/2019 | Zhang et al. | |
| 2003/0231739 | A1* | 12/2003 | Rosner | G01N 23/046 378/57 |
| 2005/0117700 | A1* | 6/2005 | Peschmann | G01V 5/222 378/57 |
| 2007/0009084 | A1* | 1/2007 | Bhatt | G01N 23/046 378/57 |
| 2008/0025461 | A1* | 1/2008 | Foland | G01N 23/046 378/4 |
| 2009/0262891 | A1* | 10/2009 | Zhang | G01V 5/22 378/57 |
| 2009/0285353 | A1* | 11/2009 | Ellenbogen | G01V 5/226 378/57 |
| 2010/0284509 | A1 | 11/2010 | Oreper | |
| 2013/0170611 | A1* | 7/2013 | Beckmann | G01V 5/226 378/9 |
| 2014/0185773 | A1* | 7/2014 | Chen | G01N 23/203 378/87 |
| 2014/0198899 | A1* | 7/2014 | Ziskin | G01V 5/226 378/53 |
| 2015/0014526 | A1* | 1/2015 | Bendahan | G01T 3/00 250/442.11 |
| 2016/0252647 | A1* | 9/2016 | Awad | G01V 5/228 348/48 |
| 2017/0122884 | A1* | 5/2017 | Zhang | G01N 23/04 |
| 2017/0269257 | A1* | 9/2017 | Scoullar | G01V 5/224 |
| 2017/0329036 | A1* | 11/2017 | Morton | G01V 5/224 |
| 2018/0299580 | A1* | 10/2018 | Morton | H01J 35/06 |
| 2019/0137651 | A1* | 5/2019 | Bendahan | G01V 5/22 |
| 2019/0346381 | A1* | 11/2019 | Awad | G01V 5/22 |
| 2021/0041378 | A1* | 2/2021 | Morton | G01N 23/10 |
| 2022/0178852 | A1* | 6/2022 | Ashok | G01V 5/226 |
| 2022/0260745 | A1* | 8/2022 | Bendahan | G01N 23/10 |
| 2024/0248049 | A1 | 7/2024 | Chen et al. | |

FOREIGN PATENT DOCUMENTS

| | | | |
|---|---|---|---|
| CN | 103674979 | A | 3/2014 |
| CN | 103901485 | A | 7/2014 |
| CN | 104483711 | A | 4/2015 |
| CN | 206151474 | U | 5/2017 |
| CN | 106841256 | A | 6/2017 |
| CN | 107991324 | A | 5/2018 |
| CN | 111388001 | A | 7/2020 |
| CN | 112113986 | A | 12/2020 |
| CN | 112683934 | A | 4/2021 |
| EP | 3364176 | A1 | 8/2018 |
| JP | 2010243169 | A | 10/2010 |
| JP | 2016536771 | A | 11/2016 |
| JP | 2020516907 | A | 6/2020 |
| WO | 2005006986 | A1 | 1/2005 |
| WO | 2018184580 | A1 | 10/2018 |
| WO | WO-2023280079 | A1 | 1/2023 |

OTHER PUBLICATIONS

"International Application No. PCT/CN2022/103432, Search Report dated Aug. 30, 2022", (Aug. 30, 2022), 9 pgs.
"International Application No. PCT/CN2022/103432, Written Opinion dated Aug. 30, 2022", (Aug. 30, 2022), 7 pgs.
"Japanese Application No. 2023-579430, Notice of Reasons for Refusal dated Dec. 11, 2024", (Dec. 11, 2024), 9 pgs.
"European Application No. 22836830.4, Extended Search Report dated Jul. 17, 2025", (Jul. 17, 2025), 6 pgs.
"Chinese Application No. 202110769674.8, Office Action dated Oct. 25, 2025", w English Translation, Oct. 25, 2025, 16 pgs.
"Chinese Application No. 202110769674.8, Notice of Grant dated Jun. 17, 2026", w English Translation, Jun. 17, 2026, 7 pgs.
Yuhan, Qi, "CT Imaging System for Standing Wood Based on Fan-Shaped X-Ray Beam", Forestry Sci 52.7, 2016, 121-128.

* cited by examiner (a)

(b)

RAY SCANNING APPARATUS

CROSS-REFERENCE TO RELATED APPLICATIONS

The present application is a U.S. national stage filing under 35 U.S.C. § 371 from International Application No. PCT/CN2022/103432, filed on Jul. 1, 2022, and published as WO2023/280079 on Jan. 12, 2023, which claims priority to Chinese patent application No. 202110769674.8, entitled "RAY SCANNING APPARATUS" filed on Jul. 7, 2021, both of which are incorporated by reference in their entireties.

TECHNICAL FIELD

The present application belongs to the field of radiation imaging, and in particular, to a ray scanning apparatus.

BACKGROUND

In existing static computed tomography (CT) technology (distributed ray source) or multi-view (single-point source) security detection devices, a plurality of different view angles are arranged in different planes perpendicular or inclined to a conveying direction of an object under inspection, or all ray sources are concentrated in a single annular or rectangular enclosed chamber. Crystals of a detector array are mostly perpendicular to a central plane of a ray beam of the ray source, and the same set of detector array only corresponds to one distributed ray source or one single-point source.

A static CT designed with a dual-ring structure also exist in related technologies, which simulates the working principle of a slip ring CT, where a ray source and a detector are arranged on two different circular rings, and the ray source circular ring and the detector circular ring are spaced apart by a distance in a conveying direction of the object under inspection.

SUMMARY

Embodiments of the present application provide a ray scanning apparatus, which can solve the problem of poor reliability and maintenance caused by concentration of a plurality of ray sources in a single annular enclosed chamber, and meanwhile, each detector set of a detector assembly can be shared by a plurality of ray source modules, thereby reducing costs of apparatus; moreover, the detector assembly is easy to be replaced or maintained while the coverage range of an optical path is minimized; in addition, the inclination angle between the center of a ray beam and detector surface can be reduced to improve image quality.

In a first aspect, an embodiment of the present application provides a ray scanning apparatus, including: a conveying device for conveying an object under inspection to pass through a scanning area of the ray scanning apparatus; a ray source assembly including a plurality of ray source modules, each ray source module including at least one ray source point emitting a ray beam, and the plurality of ray source modules being arranged around the scanning area on an upper side of the conveying device and fixed in a plane perpendicular to a conveying direction of the object under inspection; and a detector assembly, for detecting rays transmitted through the object under inspection during scanning and including a plurality of detector sets, end portions of the plurality of detector sets being connected to each other to surround the scanning area, and the plurality of detector sets being fixed in a plane perpendicular to the conveying direction of the object under inspection, where the detector assembly is located between the ray source assembly and the scanning area in a direction perpendicular to the conveying direction of the object under inspection, the ray source assembly and the detector assembly are arranged to overlap at least partially in the conveying direction of the object under inspection, and the plurality of ray source modules can be mounted and detached independently of each other.

In the ray scanning apparatus according to this embodiment, the ray source modules are arranged around the scanning area only above the conveying device, no ray source module is disposed below the conveying device, and the detector assembly is arranged around the scanning area; such ray scanning apparatus can reduce the height of the conveying device, facilitate the transfer of the object under inspection to the conveying device of the ray scanning apparatus, and reduce manufacturing costs while ensuring image quality.

According to some embodiments, the ray source module is a distributed ray source, and the plurality of ray source modules are arranged around the scanning area and form a non-enclosed structure opened on a lower side of the conveying device.

According to some embodiments, each of the plurality of ray source modules is a straight line distributed ray source, and the plurality of straight line distributed ray sources are arranged on upper, left, and right sides of the scanning area respectively, where end portions of the plurality of straight line distributed ray sources are directly connected to or spaced apart from each other.

According to some embodiments, the plurality of ray source modules include a plurality of first distributed ray sources and a plurality of second distributed ray sources, the plurality of first distributed ray sources are arranged alternately with the plurality of second distributed ray sources, and their end portions are directly connected to or spaced apart from each other.

According to some embodiments, the first distributed ray sources are straight line distributed ray sources, and the second distributed ray sources are straight line distributed ray sources or arc-shaped distributed ray sources shorter than the first distributed ray sources.

According to some embodiments, each of the plurality of ray source modules is a single-point source group, the plurality of single-point source groups are arranged at least on a left view angle, a right view angle, a top view angle, and corner squint angles on the upper side of the conveying device, and each single-point source group includes at least two single-point sources.

According to some embodiments, each ray source module includes a separate chamber to accommodate a respective ray generating device.

According to some embodiments, the separate chamber of each ray source module is provided with a mounting-positioning structure, and the mounting-positioning structure is adapted for mounting and positioning the ray source module and rotating the ray source module to adjust an output angle of the ray beam.

According to some embodiments, each detector set is a detector array including a plurality of detector units, and the plurality of detector sets are arranged in an enclosed square, rectangular, polygonal, or elliptical structure surrounding the scanning area.

According to some embodiments, each detector set is a straight line detector array, the detector assembly includes four straight line detector arrays, and the four straight line detector arrays are arranged on the upper, lower, left, and right sides of the scanning area respectively to form the rectangular or square structure.

According to some embodiments, each detector set is a straight line detector array, the detector assembly includes a plurality of first straight line detector arrays and a plurality of second straight line detector arrays, the second straight line detector arrays are shorter than the first straight line detector arrays, and the first straight line detector arrays and the second straight line detector arrays are arranged alternately around the scanning area to form a polygonal structure.

According to some embodiments, the detector sets of the detector assembly can be mounted and detached independently of each other.

According to some embodiments, each detector set of the detector assembly is configured to move in the conveying direction of the object under inspection for being mounted and detached.

According to some embodiments, some of the detector sets of the detector assembly are configured to move in the conveying direction of the object under inspection for being mounted and detached, and other detector sets are configured to move in the direction perpendicular to the conveying direction of the object under inspection for being mounted and detached.

According to some embodiments, each detector set of the detector assembly includes a detector arm, the ray scanning apparatus includes a support frame being stationary relative to a mounting platform of the ray scanning apparatus, and the detector set moves in the conveying direction of the object under inspection or the direction perpendicular to the conveying direction of the object under inspection via the detector arm, so as to be mounted to the support frame or detached from the support frame.

According to some embodiments, each detector set of the detector assembly on the same side as a ray source module relative to the scanning area is configured to avoid the ray beam of said ray source module and receive rays from the ray source modules on all the remaining sides except said ray source module.

According to some embodiments, each detector unit of the detector set includes a detector crystal for receiving the rays transmitting through the object under inspection during scanning, and the detector crystal is arranged at an end portion of the detector unit in the conveying direction of the object under inspection and arranged to be, in the conveying direction of the object under inspection, immediately adjacent to emission area of the ray beam of the ray source module on the same side relative to the scanning area but not to obstruct the ray beam.

According to some embodiments, each ray source module of the ray source assembly on the same side as a detector set relative to the scanning area is arranged so that its ray beam avoids said detector set and illuminates the detector crystal of the detector set on the opposite side of the ray source module.

According to some embodiments, each ray source module is configured to rotate around a target spot axis to illuminate the detector crystal of the detector set on the opposite side of the ray source module with a center position of the ray beam.

According to some embodiments, the ray scanning apparatus further includes an image processing module configured to compensate for missing projection data at the end portions of the ray source modules and/or repair a reconstructed image to obtain a complete reconstructed image.

According to some embodiments, the image processing module is configured to perform image reconstruction by an iterative method, an image domain repair method, or a combination of the both.

In a second aspect, an embodiment of the present application further provides a ray scanning apparatus, including: a conveying device for conveying an object under inspection to pass through a scanning area of the ray scanning apparatus; a ray source assembly including a plurality of ray source modules, each ray source module including at least one ray source point emitting a ray beam, and the plurality of ray source modules being arranged around the scanning area in a non-enclosed structure opened on a left or right side of the scanning area and being fixed in a plane perpendicular to a conveying direction of the object under inspection; and a detector assembly for detecting rays transmitting through the object under inspection during scanning and including a plurality of detector sets, end portions of the plurality of detector sets being connected to each other to surround the scanning area, and the plurality of detector sets being fixed in a plane perpendicular to the conveying direction of the object under inspection, where the detector assembly is located between the ray source assembly and the scanning area in a direction perpendicular to the conveying direction of the object under inspection, the ray source assembly and the detector assembly are arranged to overlap at least partially in the conveying direction of the object under inspection, and the plurality of ray source modules can be mounted and detached independently of each other.

In the ray scanning apparatus according to this embodiment, the ray source modules are arranged around the scanning area on the upper, lower, and one of left and right sides of the scanning area, and the detector assembly is arranged around the scanning area; such ray scanning apparatus is suitable for detecting airport hand luggage, by using the characteristics of large width and small thickness of the airport hand luggage, and considering the impact of self-obstruction of the luggage and ray attenuation on projection data, the high image quality can be ensured and manufacturing costs can be reduced.

According to some embodiments, the ray source module is a distributed ray source, and the plurality of ray source modules are arranged around the scanning area and form a non-enclosed structure opened on the left or right side of the scanning area.

According to some embodiments, each of the plurality of ray source modules is a straight line distributed ray source, and a plurality of straight line distributed ray sources are arranged on the upper, lower, and one of left and right sides of the scanning area respectively to form the non-enclosed structure opened on the left or right side of the scanning area, where end portions of the plurality of straight line distributed ray sources are directly connected to or spaced apart from each other.

According to some embodiments, the plurality of ray source modules include a plurality of first distributed ray sources and a plurality of second distributed ray sources, the plurality of first distributed ray sources are arranged alternately with the plurality of second distributed ray sources, and their end portions are directly connected to or spaced apart from each other.

According to some embodiments, the first distributed ray sources are straight line distributed ray sources, and the second distributed ray sources are straight line distributed ray sources or arc-shaped distributed ray sources shorter than the first distributed ray sources.

According to some embodiments, each of the plurality of ray source modules is a single-point source group, a plurality of single-point source groups are arranged at least on a top view angle, a bottom view angle, one of left and right view angles, and at least some of corner squint angles of the scanning area, and each single-point source group includes at least two single-point sources.

According to some embodiments, each ray source module includes a separate chamber to accommodate a respective ray generating device.

According to some embodiments, the chamber of each ray source module includes a separate vacuum chamber for accommodating a plurality of target spots.

According to some embodiments, the distance between the target spots in each ray source module is smaller than the distance between the target spots of end portions of adjacent ray source modules.

According to some embodiments, the separate chamber of each ray source module is provided with a mounting-positioning structure, which is adapted for mounting and positioning the ray source module and rotating the ray source module to adjust an output angle of the ray beam.

According to some embodiments, each detector set is a detector array including a plurality of detector units, and the plurality of detector sets are arranged in an enclosed square, rectangular, polygonal, or elliptical structure surrounding the scanning area.

According to some embodiments, each detector set is a straight line detector array, the detector assembly includes four straight line detector arrays, and the four straight line detector arrays are arranged on the upper, lower, left, and right sides of the scanning area respectively to form the rectangular or square structure.

According to some embodiments, each detector set is a straight line detector array, the detector assembly includes a plurality of first straight line detector arrays and a plurality of second straight line detector arrays, the second straight line detector arrays are shorter than the first straight line detector arrays, and the plurality of first straight line detector arrays and the plurality of second straight line detector arrays are arranged alternately around the scanning area to form the polygonal structure.

According to some embodiments, the respective detector sets of the detector assembly can be mounted and detached independently of each other.

According to some embodiments, the detector sets on the upper and lower sides of the scanning area and at an opening of the structure of the ray source assembly are configured to move in the direction perpendicular to the conveying direction of the object under inspection for being mounted and detached, while the detector set on an opposite side of the opening of the structure of the ray source assembly is configured to move in the conveying direction of the object under inspection for being mounted and detached.

According to some embodiments, each detector set of the detector assembly includes a detector arm, the ray scanning apparatus includes a support frame being stationary relative to a mounting platform of the ray scanning apparatus, and the detector set is mounted to the support frame or detached from the support frame via the detector arm.

According to some embodiments, each detector set of the detector assembly on the same side as a ray source module relative to the scanning area is configured to avoid the ray beam of said ray source module and to receive rays from the ray source modules on all the remaining sides except said ray source module.

According to some embodiments, each detector unit of the detector set includes a detector crystal for receiving rays transmitting through the object under inspection during scanning, and the detector crystal is arranged at an end portion of the detector unit in the conveying direction of the object under inspection and arranged to be, in the conveying direction of the object under inspection, immediately adjacent to emission area of the ray beam of the ray source module on the same side relative to the scanning area but not to obstruct the ray beam.

According to some embodiments, each ray source module of the ray source assembly on the same side as a detector set relative to the scanning area is arranged so that the ray beam avoids said detector set and illuminates the detector crystal of the detector set on the opposite side of the ray source module.

According to some embodiments, each ray source module is configured to rotate around a target spot axis to illuminate the detector crystal of the detector set on the opposite side of the ray source module with a center position of the ray beam.

According to some embodiments, the ray scanning apparatus further includes an image processing module configured to compensate for missing projection data at the end portions of the ray source modules and/or repair a reconstructed image to obtain a complete reconstructed image.

According to some embodiments, the image processing module is configured to perform image reconstruction by an iterative method, an image threshold repair method, or a combination of the two.

Thirdly, the embodiment of the present application further provides a ray scanning apparatus, including: a conveying device for conveying an object under inspection to pass through a scanning area of the ray scanning apparatus; a ray source assembly including a plurality of ray source modules, each ray source module including at least one ray source point emitting a ray beam, and when observed in a conveying direction of the object under inspection, the plurality of ray source modules being arranged around the scanning area in a non-enclosed structure opened on one side of the scanning area; and a detector assembly for detecting rays transmitting through the object under inspection during scanning and including a plurality of detector sets, when observed in the conveying direction of the object under inspection, the plurality of detector sets being connected to each other at their end portions and arranged around the scanning area in a non-enclosed structure opened on one side of the scanning area, where an opening of the non-enclosed structure of the ray source assembly is opposite to an opening of the non-enclosed structure of the detector assembly, the plurality of detector sets of the detector assembly are fixed in a same plane perpendicular to the conveying direction of the object under inspection, and the plurality of ray source modules of the ray source assembly are arranged in a plurality of different planes perpendicular to the conveying direction of the object under inspection.

In the ray scanning apparatus according to this embodiment, the ray source assembly and the detector assembly surround the scanning area on only three sides, which can obtain enough data for image reconstruction, and can also reduce the cost and weight of the apparatus so as to provide a lightweight ray scanning apparatus, compared to the situation that one or both of the ray source assembly and the detector assembly surround the scanning area on four sides.

According to some embodiments, the ray source module of the ray source assembly that is located on the open side of the non-enclosed structure of the detector assembly and the plurality of detector sets of the detector assembly are fixed in the same plane perpendicular to the conveying direction of the object under inspection, while other ray source modules of the ray source assembly are fixed in another plane(s) perpendicular to the conveying direction of the object under inspection.

According to some embodiments, the other ray source modules of the ray source assembly are fixed in another same plane perpendicular to the conveying direction of the object under inspection.

According to some embodiments, the plurality of ray source modules can be mounted and detached independently of each other.

According to some embodiments, each of the plurality of ray source modules is a distributed ray source, and when observed in the conveying direction of the object under inspection, the plurality of distributed ray sources are arranged on three sides of the scanning area respectively to form the non-enclosed structure around the scanning area and opened on one side.

According to some embodiments, the distributed ray sources are in a straight line, arc, or broken line shape or any combination thereof, so that the ray source assembly is formed into a right-angled rectangular, rounded rectangular, polygonal, or elliptical structure opened on one side of the scanning area when observed in the conveying direction of the object under inspection.

According to some embodiments, each of the plurality of ray source modules is a single-point source group, and each single-point source group includes at least two single-point sources.

According to some embodiments, each ray source module includes a separate chamber to accommodate a respective ray generating device.

According to some embodiments, the chamber of each ray source module includes a separate vacuum chamber for accommodating a plurality of target spots.

According to some embodiments, the distance between the target spots in each ray source module is smaller than the distance between the target spots of the end portions of adjacent ray source modules.

According to some embodiments, the separate chamber of each ray source module is provided with a mounting-positioning structure, which is adapted for mounting and positioning the ray source module and rotating the ray source module to adjust an output angle of the ray beam.

According to some embodiments, each detector set is a detector array including a plurality of detector units, and the detector array includes a straight line detector array, an arc-shaped detector array, or a combination of the both.

According to some embodiments, each detector set is a straight line detector array, the detector assembly includes three straight line detector arrays, and the three straight line detector arrays are arranged on three sides of the scanning area respectively to form a rectangular or square structure opened on one side of the scanning area.

According to some embodiments, each detector set is a straight line detector array, the detector assembly includes a plurality of first straight line detector arrays and a plurality of second straight line detector arrays, the second straight line detector arrays are shorter than the first straight line detector arrays, and the plurality of first straight line detector arrays and the plurality of second straight line detector arrays are arranged alternately around the scanning area to form a polygonal structure opened on one side of the scanning area.

According to some embodiments, the detector sets of the detector assembly can be mounted and detached independently of each other.

According to some embodiments, the detector sets of the detector assembly are configured to move perpendicular to or parallel to the conveying direction of the object under inspection for being mounted and detached.

According to some embodiments, each detector set of the detector assembly includes a detector arm, the ray scanning apparatus includes a support frame being stationary relative to a mounting platform of the ray scanning apparatus, and the detector set is mounted to the support frame or detached from the support frame via the detector arm.

According to some embodiments, when observed in the conveying direction of the object under inspection, the detector assembly is arranged between the ray source assembly and the scanning area; and in the conveying direction of the object under inspection, the other ray source modules overlap at least partially with the detector set on the same side as them relative to the scanning area.

According to some embodiments, each detector set of the detector assembly on the same side as each of the other ray source modules relative to the scanning area is configured to avoid the ray beam of the ray source module on the same side and receive rays from the ray source modules on all the remaining sides except the ray source module on the same side.

According to some embodiments, each detector unit of the detector set includes a detector crystal for receiving rays transmitting through the object under inspection during scanning, the detector crystal is arranged at an end portion of the detector unit in the conveying direction of the object under inspection, and the detector crystal of the detector set of the detector assembly on the same side as each of the other ray source modules relative to the scanning area is arranged to be, in the conveying direction of the object under inspection, immediately adjacent to emission area of the ray beam of the ray source module on the same side, but not to obstruct the ray beam.

According to some embodiments, each of the other ray source modules of the ray source assembly on the same side as a detector set relative to the scanning area is arranged so that its ray beam avoids said detector set and illuminates the detector crystal of the detector set on the opposite side of the ray source module.

According to some embodiments, each of the other ray source modules is configured to rotate around a target spot axis to illuminate the detector crystal of the detector set on the opposite side of the ray source module with a center position of the ray beam.

According to some embodiments, the ray scanning apparatus further includes an image processing module configured to compensate for missing projection data at the end portions of the ray source modules and/or repair a reconstructed image to obtain a complete reconstructed image.

According to some embodiments, the image processing module is configured to perform image reconstruction by an iterative method, an image domain repair method, or a combination of the both.

In a fourth aspect, an embodiment of the present application provides a mounting-positioning structure for a ray source module of a ray scanning apparatus, where the ray scanning apparatus includes the ray source module and a stationary support frame, the mounting-positioning structure includes a main body, and the main body can be fixedly connected to the ray source module and the support frame, so that the ray source module can be fixedly mounted to the support frame through the main body; the mounting-positioning structure further includes: a moving device, where the ray source module can be moved to a predetermined mounting position on a first plane through the moving device; a first positioning device for positioning the ray source module on the first plane; a lifting device for adjusting a position of the ray source module in a first direction, where the first direction is perpendicular to the first plane; and a second positioning device for fixing the position of the ray source module in the first direction.

With the mounting-positioning structure according to the above embodiment, each ray source module of the ray source assembly can be mounted and detached independently, and a beam output angle of the ray source module can also be adjusted.

According to some embodiments, the moving device includes rollers disposed at two ends of the ray source module in a length direction.

According to some embodiments, the first positioning device includes a first positioning pin and first pin holes disposed on the main body and the support frame and corresponding to the first positioning pin.

According to some embodiments, the lifting devices are disposed at two ends of the ray source module in the length direction, the lifting device at one end is formed as a lifting roller, and the lifting device at the other end is formed as a lifting jackscrew.

According to some embodiments, the second positioning device is formed as a positioning block, which is placed below the main body after the ray source module is adjusted by the lifting device to the predetermined position in the first direction.

According to some embodiments, the mounting-positioning structure further includes an adjusting device for rotating the ray source module around a predetermined axis to adjust a beam output angle of the ray source module.

According to some embodiments, the ray source module is provided with a mounting shaft, the main body is provided with a corresponding shaft hole, and the main body is mounted on the mounting shaft of the ray source module through the shaft hole; the positioning-mounting structure further includes a positioning member and a fastener, and the main body is positioned relative to the ray source module through the positioning member and an engagement of the shaft hole and the mounting shaft and is fixedly connected to the ray source module through the fastener; and the adjusting device includes a rotation drive mechanism, which can drive the ray source module to rotate around the mounting shaft when the positioning member and the fastener are loosened.

According to some embodiments, the rotation drive mechanism includes an adjusting block fixed on the ray source module and a jackscrew disposed on the main body and abutting against the adjusting block, and the jackscrew can be rotated to push the adjusting block to move, so as to rotate the ray source module.

According to some embodiments, the positioning member includes a second positioning pin and corresponding second pin holes formed on the main body and the ray source module, and the fastener includes a fixing bolt and corresponding threaded holes formed on the main body and the ray source module.

According to some embodiments, a ray scanning apparatus is further provided, including a ray source module and a stationary support frame, where the ray source module is fixedly mounted to the support frame via the mounting-positioning structure in any of the above embodiments.

According to some embodiments, the ray scanning apparatus enables the ray source module to rotate through the mounting-positioning structure to adjust the beam output angle of the ray source module.

In a fifth aspect, an embodiment of the present application further provides a mounting-fixing structure for a detector assembly of a ray scanning apparatus, where the ray scanning apparatus includes the detector assembly and a stationary support frame, the detector assembly includes one or more detector sets, the detector set is fixedly mounted to the support frame or detached from the support frame via the mounting-fixing structure, and the mounting-fixing structure includes: a first mounting portion fixedly disposed on the detector set; a second mounting portion fixedly disposed on the support frame and capable of being in linear moving fit with the first mounting portion, where the detector set can be moved along the second mounting portion to a predetermined mounting position when the first mounting portion and the second mounting portion engage with each other; and a fixing device disposed on a side of the detector set in a width direction for fixing the detector set relative to a mounting reference plane on the support frame.

With the mounting-fixing structure according to the above embodiment, each detector set of the detector assembly can be mounted and detached independently, and can be mounted, detached, and maintained without detaching the ray source module when it is arranged on the inner side of the ray source module; thus the convenience of mounting, detaching, and maintenance of the detector set can be improved.

According to some embodiments, the second mounting portion is further configured to support the detector set at the predetermined mounting position in the state of engaging with the first mounting portion.

According to some embodiments, the first mounting portion includes a slider, the slider extends in a length direction of the detector set, and the second mounting portion includes a stationary guide rail matching the slider.

According to some embodiments, the fixing device includes a fastener and a positioning member disposed on the support frame, an end surface, away from the support frame, of the positioning member is formed as a mounting reference plane for abutting against a surface of a side of the detector set in the width direction, and the fastener passes through the positioning member and fastens the detector set relative to the end surface of the positioning member.

According to some embodiments, the slider is disposed on two opposite sides of the detector set in the width direction, and includes internal extension portions extending inwards from edges of the two opposite sides of the detector set in the width direction; the stationary guide rail includes external extension portions extending outwards on two opposite sides in the width direction; and in an engaging state of the slider and the stationary guide rail, the internal extension portions of the slider are located above, in contact and overlap with the external extension portions of the stationary guide rail, so as to suspend the detector set on the stationary guide rail.

According to some embodiments, the stationary guide rail supports the slider from a bottom side of the slider.

According to some embodiments, the first mounting portion is formed as a sliding groove extending in the width direction of the detector set, and the second mounting portion is formed as a sliding rod matching the sliding groove.

According to some embodiments, an end, near the support frame, of the sliding rod is formed with a protruding portion, and a surface, facing the detector set, of the protruding portion is formed as the mounting reference plane for abutting against a surface of the other side of the detector set in the width direction.

According to some embodiments, the fixing device is disposed at the other end, opposite to the protruding portion, of the sliding rod, and is arranged to abut against, with the protruding portion, two sides of the detector set in the width direction.

According to some embodiments, the fixing device includes a positioning sleeve and a fastener, the positioning sleeve is sleeved on the other end of the sliding rod and abuts against one side of the detector set in the width direction, and the fastener is used for fixing the positioning sleeve to the other end of the sliding rod.

According to some embodiments, the second mounting portion includes two sliding rods, the first mounting portion includes two sliding grooves formed at two ends of the detector set in the length direction, and the two sliding rods can engage with the two sliding grooves respectively to support the detector set at the predetermined mounting position.

According to some embodiments, the first mounting portion is formed as a fixing block fixed on a side of the detector set in the width direction, and the fixing block includes an opening facing a side of the detector set in the thickness direction; and the second mounting portion is formed as a cantilever portion fixed to the support frame, an extension portion is disposed at an end, away from the support frame, of the cantilever portion, and the extension portion can be in linear moving fit with the opening of the fixing block.

According to some embodiments, the fixing device includes a fixing member and a fastener disposed on the support frame, an end surface, away from the support frame, of the fixing member is formed as the mounting reference plane for abutting against the surface of a side of the detector set in the width direction, and the fastener is used for fastening the detector set relative to the end surface of the fixing member.

According to some embodiments, in the engagement of the first mounting portion and the second mounting portion, the cantilever portion supports the detector set at the predetermined mounting position through the fixing block.

According to some embodiments, a ray scanning apparatus is further provided, including a detector assembly and a stationary support frame, where the detector assembly includes one or more detector sets, and the detector set is mounted and fixed to the support frame or detached from the support frame through the mounting-fixing structure in any of the above embodiments.

According to some embodiments, a width direction of the detector set is parallel to a conveying direction of an object under inspection, a length direction and a thickness direction of the detector set are perpendicular to the conveying direction of the object under inspection, and the conveying direction of the object under inspection is a direction in which the object under inspection is conveyed to pass through a scanning area of the ray scanning apparatus.

According to some embodiments, in a case that the detector assembly includes a plurality of detector sets, a mounting reference planes for the plurality of detector sets are located in the same plane perpendicular to the conveying direction of the object under inspection.

According to some embodiments, a direction of linear movement of the first mounting portion relative to the second mounting portion is parallel or perpendicular to the conveying direction of the object under inspection.

Other features and technical advantages of the present application will be clearer in the following detailed descriptions with reference to the accompanying drawings and other embodiments.

DESCRIPTION OF THE DRAWINGS

To describe the technical solutions in the embodiments of the present application or in related technologies more clearly, the following briefly introduces the accompanying drawings required for use in the description of the embodiments or the related technologies. Apparently, the accompanying drawings in the following description show merely some embodiments of the present application, and those of ordinary skill in the art may still derive other drawings from the accompanying drawings without any creative efforts.

DETAILED DESCRIPTION

Figure 1:
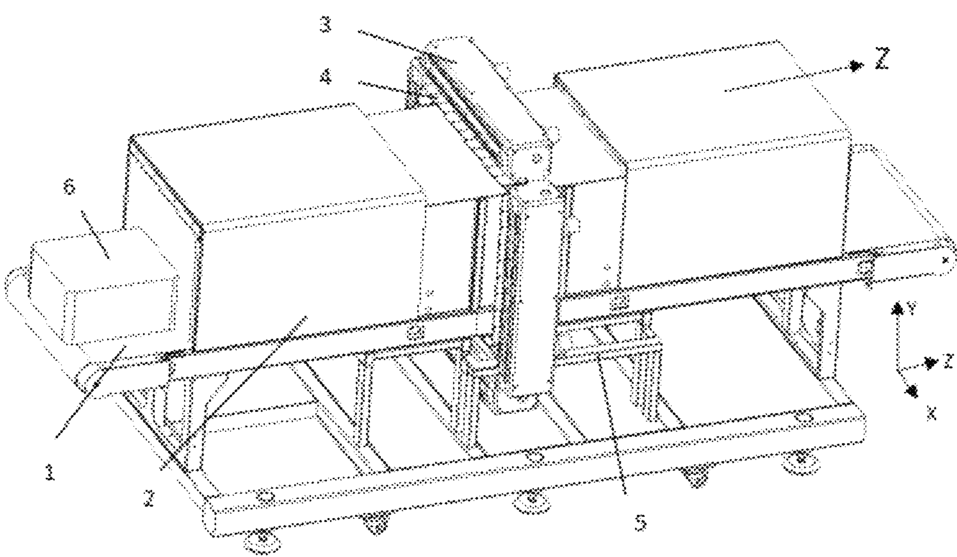
FIG. 1 is a schematic structural diagram of a ray scanning apparatus according to some embodiments of the present application.

Features and exemplary embodiments of various aspects of the present application will be described in detail below. In order to make the objectives, technical solutions, and advantages of the present application clearer, the present application will be further described in detail below with reference to the accompanying drawings and specific embodiments. It should be understood that the specific embodiments described here are only intended to explain the present application, but not to limit the present application. For those skilled in the art, the present application can be implemented without some of these specific details. The following descriptions of the embodiments are merely to provide a better understanding of the present application by showing examples of the present application.

It should be noted that the relational terms herein, such as first and second, are merely used for distinguishing one entity or operation from another, and do not necessarily require or imply that any actual relationship or sequence exists between these entities or operations. Moreover, the terms “include”, “comprise”, and any variants thereof are intended to cover a non-exclusive inclusion, so that a process, method, article, or device including a series of elements not only includes these elements, but also includes other elements not listed explicitly, or includes inherent elements of the process, method, article, or device. In the absence of more limitations, an element defined by “include a . . . ” does not exclude other same elements existing in the process, method, article, or device including the element.

The static CT (distributed ray source) or multi-view (single-point source) device in the foregoing background generally includes a plurality of planar optical paths, which are arranged in a length direction of the device (namely, a conveying direction of an object under inspection). Such arrangement results in long optical path coverage of the entire static CT (distributed ray source) or multi-view (single-point source) device, which is not conducive to shortening the length and reducing the weight of the entire device.

Moreover, in the device arranged as above, a set of detector array only corresponds to a set of distributed ray source or one single-point source, thereby increasing the quantity of detector arrays for the entire device, which is not conducive to reducing the cost of the entire device.

In the device arranged as above, all ray sources are concentrated in a single annular or rectangular enclosed chamber, which will increase the complexity of the device and reduce the reliability of the device, especially for a device that needs to maintain high vacuum; and the maintainability of the ray sources is poor.

Furthermore, in the static CT designed with a dual-ring structure as mentioned above, the arrangement of the ray source ring and the detector ring can ensure that a single detector is shared by a plurality of ray sources, but cannot solve the problem of poor reliability and maintainability caused by concentrating the ray sources in the single annular enclosed chamber. Meanwhile, if the distance between the ray source ring and the detector ring is too short, the detector can only be replaced or maintained from the inside of the ring, so the maintainability of the detector is also poor. If the distance between the ray source ring and the detector ring is long enough so that the detector can be replaced or maintained from the outside of the ring, such arrangement will increase the coverage of the optical path, resulting in an increase of the length of the device, and meanwhile, an inclination angle between the center of the ray beam and the surface of a detector crystal will be generated, resulting in that the ray beam illuminates the detector crystal obliquely, which affects image quality.

In order to solve the above various technical problems, an embodiment of the present application provides a ray scanning apparatus, including: a conveying device for conveying an object under inspection to pass through a scanning area of the ray scanning apparatus; a ray source assembly including a plurality of ray source modules, each ray source module including at least one ray source point emitting a ray beam, and the plurality of ray source modules being arranged around the scanning area and fixed in a plane perpendicular to a conveying direction of the object under inspection; and a detector assembly for detecting rays transmitting through the object under inspection during scanning and including a plurality of detector sets, end portions of the plurality of detector sets being connected to each other to surround the scanning area, and the plurality of detector sets being fixed in a plane perpendicular to the conveying direction of the object under inspection, where the detector assembly is located between the ray source assembly and the scanning area in a direction perpendicular to the conveying direction of the object under inspection, the ray source assembly and the detector assembly are arranged to overlap at least partially in the conveying direction of the object under inspection, and the plurality of ray source modules may be mounted and detached independently of each other.

According to the ray scanning apparatus in the embodiment of the present application, the ray source assembly is formed by a plurality of ray source modules arranged around the scanning area, and the plurality of ray source modules can be mounted and detached independently of each other, that is, each ray source module includes a separate chamber to accommodate respective ray generating device. Compared to an integrated ray source assembly surrounding the scanning area, the ray source assembly formed by combining the plurality of ray source modules in the present application can reduce the shell size of a single ray source module and the volume of internal vacuum chamber, so that the single ray source module is small and lightweight, thereby facilitating the mounting and detaching of the ray source assembly. In addition, a plurality of target spots of the single ray source module can use a separate vacuum chamber, which can reduce the risk of internal ignition when the ray source assembly is maintained.

According to some embodiments of the present application, the separate chamber of each ray source module is provided with a mounting-positioning structure, and the mounting-positioning structure is used for fixing the ray source module to a relative position in the ray scanning apparatus, such as positioning the ray source module relative to a support frame, and is also used for rotating the ray source module around a predetermined axis to adjust an output angle of the ray beam. Moreover, the position of each ray source module can be determined by the mounting-positioning structure, thereby ensuring that the plurality of ray source modules of the ray source assembly are located in a plane(s) (such as in the same plane or different planes) perpendicular to the conveying direction of the object under inspection after being mounted.

Here, optionally, the ray source modules may be distributed ray sources to form an annular structure around the scanning area, such as a rectangular ring, a polygonal ring, or an elliptical ring. Specifically, the ray source module may be a straight line distributed ray source, each ray source module may include a plurality of target spots, and the plurality of ray source modules may be distributed on upper, lower, left, and right sides of the scanning area to form a rectangular ring around the scanning area. End portions of the ray source modules may be directly connected to form a continuous rectangular ring, or spaced apart by a gap to form a discontinuous rectangular ring. According to some other embodiments, the ray source assembly may further include a plurality of straight line distributed ray sources with a shorter length, which may be alternately arranged with a plurality of straight line distributed ray sources with a longer length, and their end portions are directly connected to form a continuous polygonal arrangement, or their end portions are spaced apart to form a discontinuous polygonal arrangement; or, the ray source assembly may further include a plurality of arc-shaped distributed ray sources with a shorter length, which may be alternately arranged with the plurality of straight line distributed ray sources with a longer length, and their end portions are directly connected to form a continuous rounded rectangular arrangement, or their end portions are spaced apart to form a discontinuous rounded rectangular arrangement; or, the ray source assembly may further include other quantities, shapes, and/or lengths of ray source modules to form other polygonal or elliptical structures.

Further, each ray source module of the ray source assembly may alternatively be a single-point source group, which includes at least two single-point sources, and optionally, the plurality of single-point source groups of the ray source assembly are distributed at a bottom view angle, left and right view angles, a top view angle, and corner squint angles around the scanning area to form a multi-view arrangement.

Furthermore, according to some other embodiments, the ray source modules may alternatively be arranged around the scanning area on only three sides, such as upper, left, and right sides, or upper, lower, and left or right sides (here, it should be noted that the upper, lower, left, and right sides of the scanning area refer to upper, lower, left, and right sides of the scanning area when observed in the conveying direction of the object under inspection). Therefore, the ray source assembly may be arranged in a non-enclosed structure opened on one side around the scanning area, such as a rectangular structure, a polygonal structure, or an elliptical structure opened on one side, and more specifically, a discontinuous or continuous rectangular structure, a continuous polygonal structure, a continuous rounded rectangle, a discontinuous polygonal or discontinuous rounded rectangular structure, and other polygonal and elliptical structures opened on one side around the scanning area. In a case that the ray source assembly is composed of single-point sources, any single-point source may not be disposed on one side of the scanning area accordingly.

In the ray scanning apparatus of the present application, the detector assembly has a structure formed by connecting the end portions of the plurality of detector sets around the scanning area. Optionally, in conjunction with the above arrangements of the ray source assembly, such as the structure surrounding the scanning area on upper, lower, left, and right sides, or a non-enclosed structure opened on one side of the scanning area, such as a rectangular, polygonal, or elliptical structure opened on one side of the scanning area (more specifically, the continuous or discontinuous rectangular structure, the continuous or discontinuous polygonal structure, the continuous or discontinuous rounded rectangular structure, the single-point source multi-view arrangement, or the like opened on one side around the scanning area), the plurality of detector sets of the detector assembly are arranged into an enclosed rectangular structure, a square structure, a polygonal structure, an elliptical structure, or the like surrounding the scanning area. Specifically, each detector set of the detector assembly may include a plurality of detector units and a detector arm, and the plurality of detector units are arranged in a straight line on the detector arm. The detector assembly may include four detector sets arranged on the upper, lower, left, and right sides of the scanning area to form an enclosed rectangular or square structure surrounding the scanning area. The detector assembly may alternatively include a plurality of long detector sets and a plurality of short detector sets to form an enclosed polygonal structure surrounding the scanning area. Alternatively, according to some other embodiments, in conjunction with the non-enclosed structure of the ray source assembly with the opening on one side of the scanning area, the plurality of detector sets of the detector assembly may alternatively be arranged in a non-enclosed structure opened on one side around the scanning area, such as a rectangular structure, a square structure, a polygonal structure, or an elliptical structure opened on one side.

According to some embodiments, the plurality of detector sets of the detector assembly may be mounted and detached independently of each other. Accordingly, each detector set may be mounted and detached independently, thereby facilitating the maintenance of the detector assembly. Moreover, the plurality of detector sets of the detector assembly may be configured to move in the conveying direction of the object under inspection for being mounted and detached. Alternatively, in the case that the ray source assembly is arranged in a non-enclosed structure opened on one side around the scanning area, some of the plurality of detector sets of the detector assembly may be configured to move in a direction perpendicular to the conveying direction of the object under inspection for being mounted and detached, while the other are configured to move in the conveying direction of the object under inspection for being mounted and detached. In this case, even if the detector assembly is arranged on the inner side of the ray source assembly in the direction perpendicular to the conveying direction of the object under inspection, the detector sets can be mounted, detached, and maintained without detaching the ray source modules, thereby improving the convenience of mounting, detaching and maintenance operations of the detector assembly.

Moreover, according to some embodiments, the mounting and detaching of the detector set may be achieved by linear moving fit between the detector arm of the detector set and the mounting position of the detector set on the ray scanning apparatus, such as the support frame of the ray scanning apparatus, and the linear moving fit may be, linear sliding, rolling fit, or and like, and for example, may be fit of a slider and a guide rail disposed between the detector arm and the support frame, or fit between a linear ball bearing and a cylindrical shaft.

Furthermore, according to some embodiments, each detector unit of the detector set includes a detector crystal for receiving rays, and the detector units of each detector set are arranged on the detector arm, with the detector crystals facing the same direction. In addition, as mentioned earlier, in the present application, the respective detector sets are located in the plane perpendicular to the conveying direction of the object under inspection, especially in the same plane, which specifically means that the detector crystals of the respective detector sets are located in the same plane perpendicular to the conveying direction of the object under inspection. According to some other embodiments, the respective detector sets may alternatively be located in different planes perpendicular to the conveying direction of the object under inspection.

In the ray scanning apparatus according to the present application, the ray source assembly in any of the above embodiments is combined with the detector assembly in any of the above embodiments, and in the combined state, the respective ray source modules of the ray source assembly are located in a plane(s) (one or more planes) perpendicular to the conveying direction of the object under inspection, the respective detector sets of the detector assembly are located in other planes (especially in the same plane) perpendicular to the conveying direction of the object under inspection, the detector assembly is located on the inner side of the ray source assembly in the direction perpendicular to the conveying direction, and the ray source assembly and the detector assembly are arranged to overlap at least partially in the conveying direction of the object under inspection. The at least partial overlap of the ray source assembly and the detector assembly in the conveying direction of the object under inspection can reduce the length of arrangement of the ray source assembly and the detector assembly, which is beneficial to reducing the length of the entire ray scanning system.

In some embodiments, each detector set of the detector assembly on the same side as a ray source module relative to the scanning area is arranged not to obstruct the ray beam from said ray source module, but to be able to receive rays from the ray source modules on the remaining sides, so that different ray source modules share the same detector set, which can reduce the total number of detector sets.

In some embodiments, the detector crystal of each detector set of the detector assembly is arranged at an end portion of the detector unit in the conveying direction of the object under inspection, and is arranged, in the conveying direction of the object under inspection, immediately adjacent to emission area of the ray beam of the ray source module on the same side relative to the scanning area, but does not obstruct the ray beam of the ray source module. In this way, the coverage length of an optical path between the ray source assembly and the detector assembly can be reduced as much as possible, thereby further reducing the length of the apparatus.

In some embodiments, each ray source module on the same side as a detector set relative to the scanning area is arranged so that its ray beam avoids said detector set and illuminates the detector crystal of the detector set on the opposite side of the ray source module. More specifically, the ray source module may rotate relative to the predetermined axis, such as a target spot axis (for example, by means of the foregoing mounting-positioning structure of the ray source module) to adjust the output angle of the ray beam, so that the center position of the ray beam of the ray source module illuminates the detector crystal of the detector set on the opposite side of ray source module. Since the detector crystal of the detector set is located at the end portion of the detector unit in the conveying direction of the object under inspection and arranged immediately adjacent to the emission area of the ray beam of the ray source module on the same side, the ray source module only needs to rotate a small angle to ensure that the center position of the ray beam illuminates the detector crystal, thereby minimizing the adverse effects of the ray beam obliquely incident on the surface of the detector crystal on imaging. The beam output angle of the ray source module may also be adjusted by other suitable ways such as setting the opening direction of the ray source module or adjusting a collimator.

According to some embodiments, an image processing module of the ray scanning apparatus of the present application is configured to have a data compensation function, which can compensate for view angle missing data and/or repair a reconstructed image to improve image quality. Specifically, the image processing module is configured to perform image reconstruction by an iterative method, an image domain repair method, or a combination of the both. Therefore, missing projection data caused by an increase in the distance between target spots of the end portions of adjacent ray source modules can be compensated, thereby improving the quality of the reconstructed image.

The embodiments of the present application are described in detail below with reference to the accompanying drawings.

FIG. 1 schematically illustrates a ray scanning apparatus according to some embodiments of the present application. The ray scanning apparatus shown in FIG. 1 includes a conveying device 1, a passage 2, a ray source assembly 3, a detector assembly 4, and a support frame 5. The conveying device 1 is used for conveying an object under inspection 6 to pass through a scanning area of the ray scanning apparatus, and the scanning area is defined by the ray source assembly 3 and the detector assembly 4. Under the drive of the conveying device 1, the object under inspection 6 enters the passage 2 from an opening at one end of the passage 2 and exits from an opening at the other end of the passage 2. The passage 2 can shield rays from the ray source assembly 3 relative to an external environment to avoid radiation damage to people near the device, and can also limit the volume of the object under inspection 6 entering the passage 2. The ray source assembly 3 is fixed to the support frame 5 on an outer side of the passage 2, and is used for emitting a ray beam to illuminate the object under inspection 6 during scanning. The detector assembly 4 is also fixed to the support frame 5 on the outer side of the passage 2, and is used for detecting rays transmitting through the object under inspection 6 during scanning. The support frame 5 is used for supporting and fixing the devices such as the conveying device 1, the passage 2, the ray source assembly 3, and the detector assembly 4, and is stationary relative to the ground. It should be noted that although both the ray source assembly 3 and the detector assembly 4 are arranged on the outer side of the passage 2, the passage 2 is provided with an avoidance region at the scanning area, and thus does not obstruct the ray beam of the ray source assembly 3 or hinder the detector assembly 4 from receiving rays.

The ray scanning apparatus according to the embodiments of the present application may further include a control device, and the control device can control the operations of respective components of the ray scanning apparatus, such as control emission of rays from the ray source assembly 3 and data output from the detector assembly 4. The control device may further include an image processing module, and the image processing module may perform image reconstruction according to the output information of the detector assembly 4 to obtain a scanning image of the object under inspection 6.

The conveying device 1 may be, for example, a conveying belt; and the object under inspection 6 may be various items that require security inspection, such as packages and luggage.

The ray source assembly 3 may include a plurality of ray source modules, and the respective ray source modules are arranged around the scanning area and located in a plane perpendicular to a conveying direction of the object under inspection 6. The ray source modules may be arranged in a same plane or different planes perpendicular to the conveying direction of the object under inspection 6. In this embodiment, the description is made with an example that the ray source modules are located in the same plane perpendicular to the conveying direction of the object under inspection 6 (specifically meaning that ray openings of the ray source modules are located in the same plane perpendicular to the conveying direction of the object under inspection 6), but the embodiment is also suitable the case that the ray source modules are located in different planes. FIG. 1 shows a forward direction Z of the object under inspection 6, and the conveying direction of the object under inspection 6 (sometimes referred to as the conveying direction or Z-direction hereinafter) is defined as the forward direction of the object under inspection 6, including a reverse direction of the forward direction. FIG. 1 shows an XYZ coordinate system, which can be used as a reference coordinate system to describe the positions of components in the ray scanning apparatus. These position descriptions are intended to clearly describe the principle of the present application and have no limit functions. The forward direction Z of the object under inspection 6 is the same as the Z direction of the XYZ coordinate system.

According to some embodiments, each ray source module of the ray source assembly 3 of the ray scanning apparatus according to the embodiments of the present application may be a distributed ray source, and the plurality of ray source modules may be arranged in a rectangular structure, a polygonal structure, an elliptical structure, or the like surrounding the scanning area, where a portion of the structure is located below the conveying device 1 to completely surround the conveying device 1.

Figure 3:
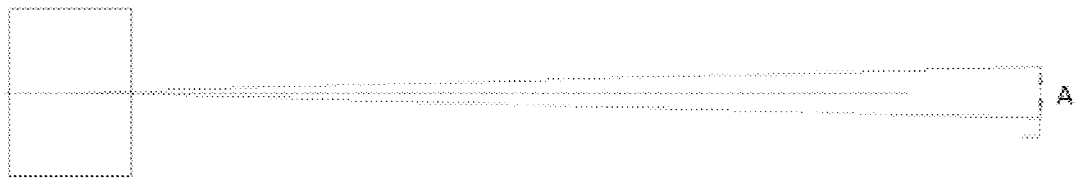
FIG. 3 is a schematic diagram of a shape of a ray beam of a ray source module according to some embodiments of the present application.

Specifically, as a distributed ray source, each ray source module may include a plurality of target spots, each target spot of each ray source module may generate a ray beam separately, and the respective target spots may generate the ray beams according to a predetermined time sequence under the control of the control device. The ray beam may be a fan-shaped beam with a flare angle A, as shown in FIG. 3. The ray beam is not limited to the fan-shaped beam, but may be in other shapes such as a conical beam or a parallel beam, which may be set according to specific requirements.

Figure 2:
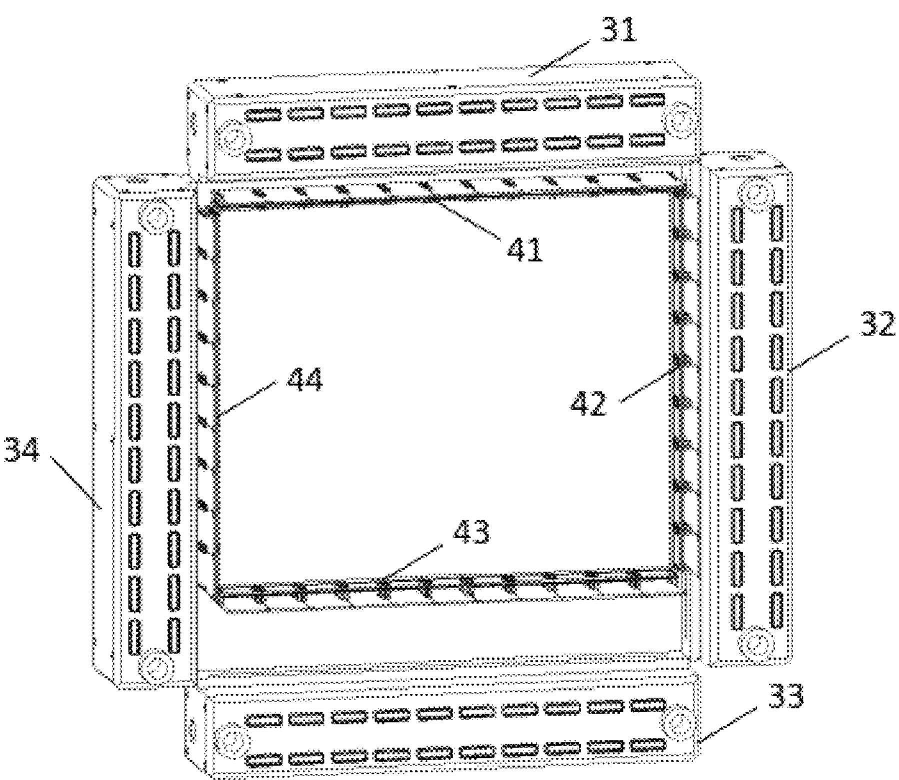
FIG. 2 is a schematic diagram of a specific structure of a ray source assembly and a detector assembly of the ray scanning apparatus shown in FIG. 1.

A specific arrangement of the ray source assembly 3 is described below. FIG. 2 illustrates a schematic structural diagram of a ray source assembly and a detector assembly according to some embodiments, where the plurality of ray source modules of the ray source assembly 3 are arranged in a rectangular structure around the scanning area. Specifically, the ray source assembly 3 includes four ray source modules 31, 32, 33, and 34, each of which is a straight line distributed ray source (namely, a plurality of target spots are arranged in a straight line), and the four ray source modules 31, 32, 33, and 34 are arranged on upper, lower, left, and right sides of the scanning area respectively to form the rectangular structure surrounding the scanning area. End portions of the ray source modules 31, 32, 33, and 34 are spaced apart by a distance to form a discontinuous rectangular structure (as shown in FIG. 4(*a*), the target spots are also arranged in a discontinuous rectangular shape).

Figure 4:
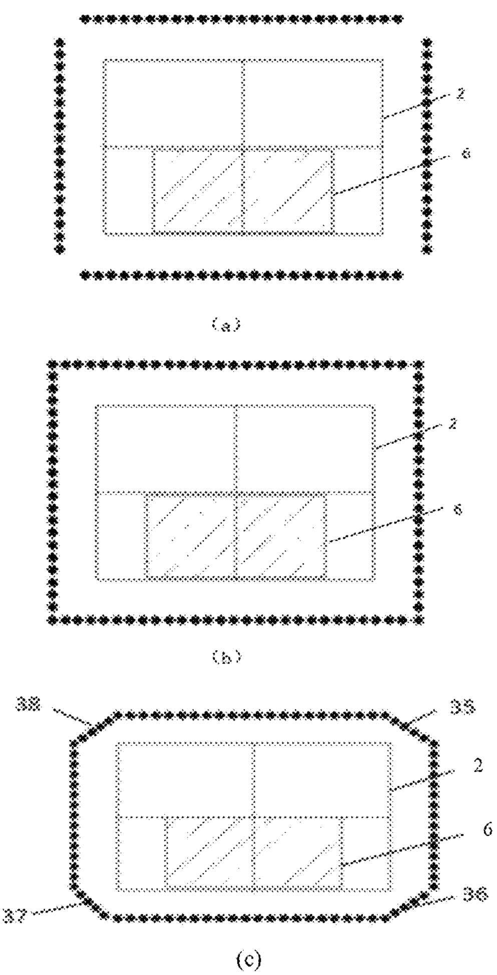
FIG. 4 is a schematic diagram of distribution of a ray source assembly in a form of target spots according to some embodiments of the present application.
Figure 4:
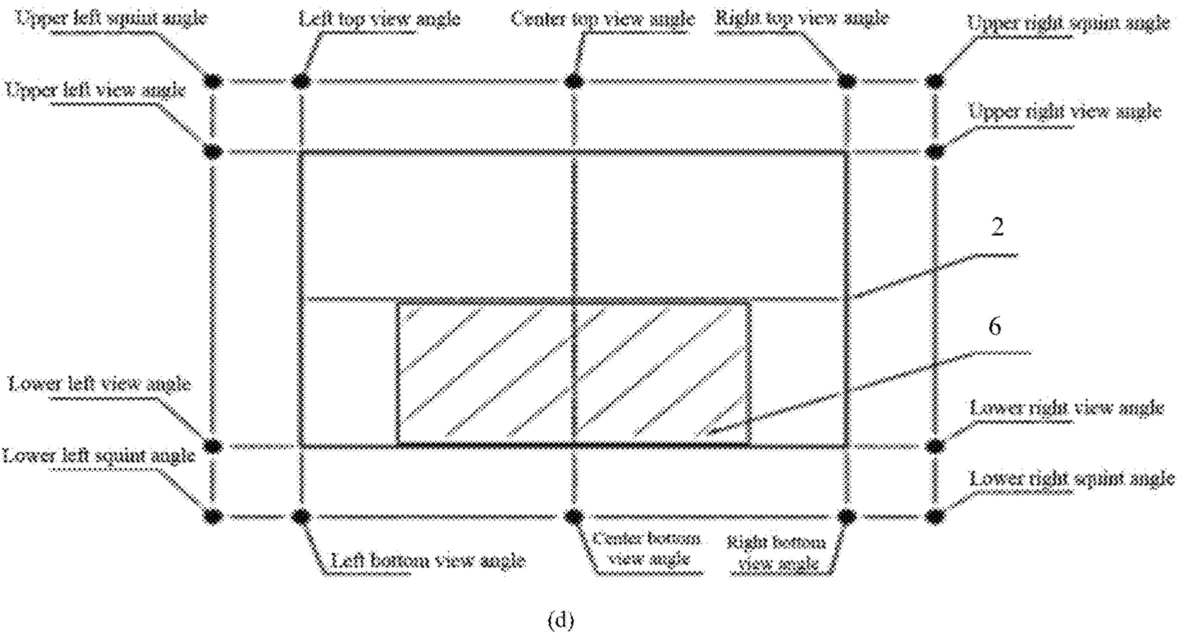

The arrangement of the ray source assembly 3 is not limited to the embodiments shown in FIG. 2 and FIG. 4(*a*), but may further include other alternative arrangements. For example, the end portions of the ray source modules 31, 32, 33, and 34 may be directly connected, so that the ray source assembly 3 is arranged in a continuous rectangular structure around the scanning area (as shown in FIG. 4(*b*), the target spots are arranged in a continuous rectangular shape). In addition, the ray source assembly 3 may further include, on the basis of the embodiment shown in FIG. 2, four other straight line distributed ray source modules 35, 36, 37, and 38, which are shorter than the ray source modules 31, 32, 33, and 34, and are arranged alternately with the ray source modules 31, 32, 33, and 34 and directly connected with the ray source modules 31, 32, 33, and 34 at end portions, so that the ray source assembly 3 is arranged in a continuous polygonal structure (as shown in FIG. 4(*c*), the target spots are arranged in a continuous polygonal shape). Moreover, the ray source modules 35, 36, 37, and 38 may be arc-shaped distributed ray sources, arranged alternately with the ray source modules 31, 32, 33, and 34 and directly connected with the ray source modules 31, 32, 33, and 34 at end portions, so that the ray source assembly 3 is arranged in a continuous rounded rectangular structure. The end portions of the ray source modules 31, 32, 33, 34, 35, 36, 37, and 38 may alternatively be spaced apart by a distance, so that the ray source assembly 3 is arranged in a discontinuous polygonal structure or a discontinuous rounded rectangular structure (not shown in the figures). Further, the ray source modules 35, 36, 37, and 38 may be as long as or longer than the ray source modules 31, 32, 33, and 34, or the ray source assembly 3 may include other numbers (a plurality of) and/or lengths of ray source modules, so as to form a polygonal structure different from the polygon that shown in FIG. 4(*c*). Furthermore, the ray source assembly 3 may include other numbers (a plurality of), lengths, and/or shapes of ray source modules, so as to form an elliptical structure.

In some embodiments, the ray source modules included in the ray source assembly 3 may be mounted and detached independently of each other, that is, each ray source module includes a separate chamber for accommodating a respective ray generating device. Each ray source module includes a separate chamber, which means that the plurality of target spots of each ray source module share a separate vacuum chamber. The distance between the target spots of each ray source module in the vacuum chamber may be determined by the quantity of target spots and the length of the chamber. According to some embodiments, the quantity of target spots in the single ray source module may be 192, 264, etc., and the distance between the target spots in the single ray source module may be 4 mm, 12 mm, etc. It should be noted that the distance between the target spots of end portions of adjacent ray source modules is greater than the distance between the target spots in the single ray source module, even if the end portions of the adjacent ray source modules are directly connected (that is, two separate chambers are directly connected). Each ray source module includes a separate chamber, which has the following advantages: compared to a ray source assembly with an integrated annular chamber (namely, all target spots of the ray source assembly are located in the same annular vacuum chamber), the shell size of the single ray source module and the volume of the internal vacuum chamber can be reduced, so that the volume and weight of the single ray source module are reduced to facilitate mounting and detaching of the ray source assembly; further, each ray source module includes a separate vacuum chamber, which can reduce the risk of internal ignition when the ray source module is maintained.

In addition, according to some embodiments, each ray source module of the ray source assembly 3 is equipped with a mounting-positioning structure to facilitate mounting and adjustment of the ray source module. With the mounting-positioning structure, each ray source module of the ray source assembly 3 may be mounted and fixed at a predetermined position in the ray scanning apparatus (for example, at a specific position relative to the XYZ reference coordinate system in the ray scanning apparatus), for example, to ensure that the plurality of ray source modules are located in the same plane perpendicular to the conveying direction of the object under inspection 6. In addition, with the mounting-positioning structure, the ray source module may further be rotated to adjust the output angle of the ray beam.

The ray source modules of the ray source assembly 3 may be mounted in different ways due to their different positions in the ray scanning apparatus, and have different mounting-positioning structures. For example, the ray source modules located above and on lateral sides of the scanning area may be mounted by hoisting with a device such as a crane. However, the ray source module on the lower side of the scanning area is not suitable for being mounted by hoisting, but needs to be mounted in other ways. In order to facilitate the mounting of such ray source module, an embodiment of the present application provides a mounting-positioning structure, which can conveniently mount and fix the ray source module that is not suitable for being hoisted to a predetermined position of the ray scanning apparatus, and can further rotate the ray source module to adjust the output angle of the ray beam. According to some embodiments, the mounting-positioning structure includes a main body, and the main body can be fixedly connected to the ray source module and the support frame of the ray scanning apparatus, so that the ray source module can be fixedly mounted to the support frame through the main body. The mounting-positioning structure includes: a moving device, where the ray source module can be moved to a predetermined mounting position on a first plane (such as an XZ plane in FIG. 1) through the moving device; a first positioning device for positioning the ray source module on the first plane; a lifting device for adjusting the position of the ray source module in a first direction (such as a Y direction in FIG. 1, which is perpendicular to the XZ plane), where the first direction is perpendicular to the first plane; and a second positioning device for fixing the position of the ray source module in the first direction.

Figure 5:
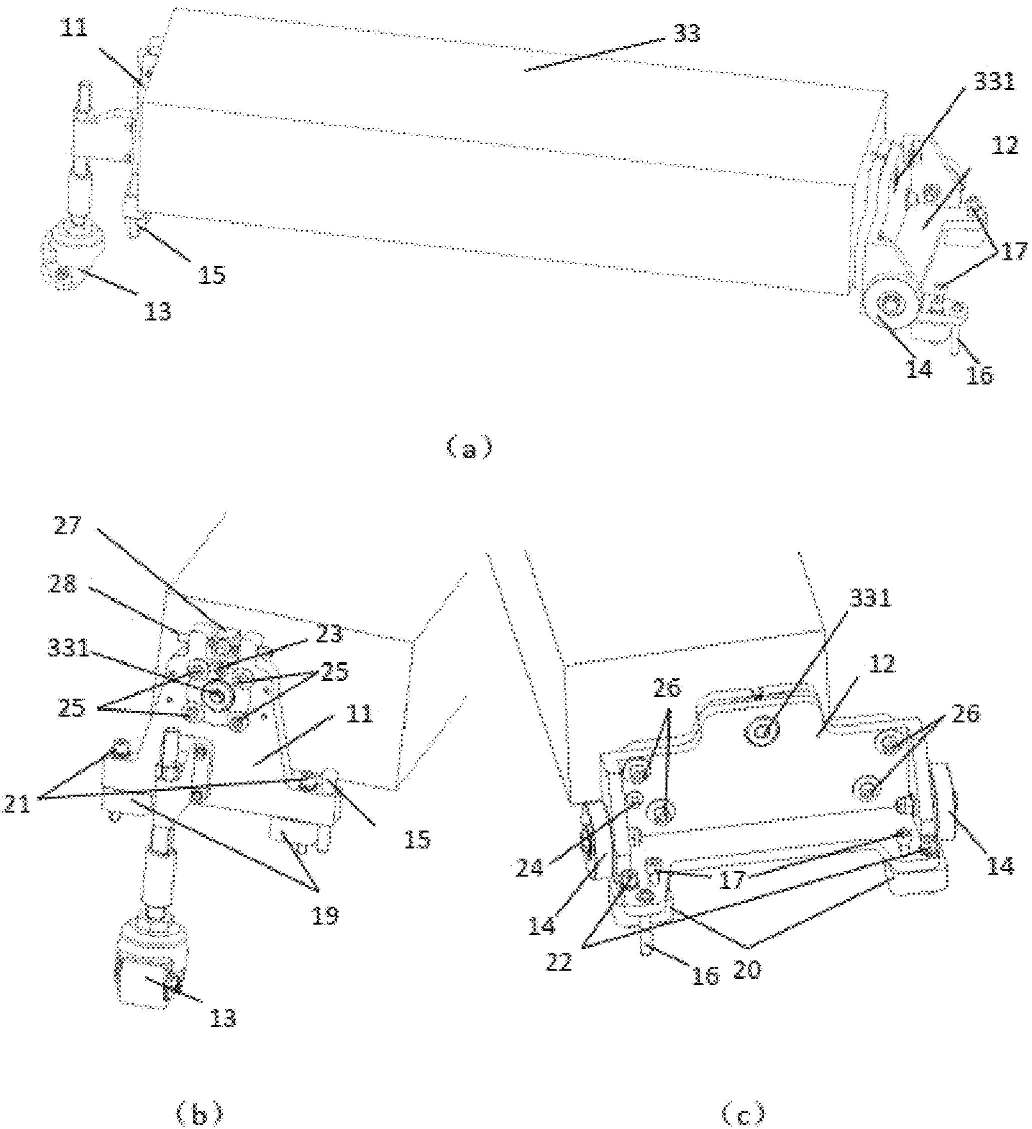
FIG. 5 is a schematic diagram of a mounting-positioning structure for a ray source module according to some embodiments of the present application.

FIG. 5 shows a specific embodiment of the above mounting-positioning structure of the ray source module. As shown in FIG. 5, the mounting-positioning structure includes main bodies 11 and 12, the main bodies 11 and 12 are respectively located at two ends of the ray source module in the length direction and fixedly connected to the ray source module (here, the ray source module is described by taking the ray source module 33 of the ray source assembly 3 in FIG. 2 as an example, or may be any other suitable ray source module), and the ray source module 33 is fixedly mounted to the support frame 5 (not shown in FIG. 5) through the main bodies 11 and 12. The moving device of the mounting-positioning structure is specifically configured as rollers 13 and 14 arranged on the main bodies 11 and 12 respectively, and the ray source module 33 can be pushed to move through the rollers 13 and 14, to the predetermined mounting position on the XZ plane. The moving device of the mounting-positioning structure is not limited to rollers. According to some other embodiments, the ray source module may alternatively be moved by sliding. For example, a linear sliding fit may be provided between the mounting-positioning structure and the support frame 5 to move the ray source module 33 to the predetermined mounting position.

The first positioning device includes first positioning pins 15 and 16, and corresponding first pin holes (not shown in the figure) disposed on the main bodies 11 and 12 and the support frame 5 of the ray scanning apparatus. After the ray source module 33 is moved to the predetermined mounting position via the rollers 13 and 14, the first positioning pins 15 and 16 are inserted into the corresponding first pin holes to position the ray source module 33 on the XZ plane.

The lifting device includes the roller 13 disposed at the main body 11, where the roller 13 is specifically disposed as a lifting roller; and the lifting device further includes a lifting jackscrew 17 disposed on the main body 12, one end of the lifting jackscrew 17 abuts against the support frame 5, and by screwing the lifting jack screw 17, the main body 12 and the ray source module 33 can be lifted or lowered relative to the support frame 5. By adjusting the lifting roller 13 and the lifting jackscrew 17, the position of the ray source module 33 relative to the support frame 5 can be adjusted in the Y direction. The second positioning device is formed as positioning blocks 19 and 20. After the ray source module 33 is adjusted to the predetermined position in the Y direction by adjusting the lifting roller 13 and the lifting jackscrew 17, the positioning blocks 19 and 20 are placed below the main bodies 11 and 12 respectively to fix the height of the ray source module 33 relative to the support frame 5, so as to position the ray source module 33 in the first Y direction. Here, in some examples, the positioning block 20 located below the main body 12 may be U-shaped, and a lower portion of the lifting jack screw 17 is located in an opening of the U-shaped positioning block 20 to prevent mutual interference between them. Moreover, the mounting-positioning structure may further include first fixing bolts 21 and 22, and corresponding first threaded holes disposed in the main bodies 11 and 12, the positioning blocks 19 and 20, and the support frame 5. By inserting the first fixing bolts 21 and 22 respectively inserted into the corresponding first threaded holes and tightening the same, the positioning blocks 19 and 20 can be fixed relative to the main bodies 11 and 12 and the support frame 5, and thus the ray source module 33 can be fixedly connected to the support frame 5.

In addition, according to some embodiments, the mounting-positioning structure further includes an adjusting device for rotating the ray source module around a predetermined axis to adjust its beam output angle. According to the specific embodiment of FIG. 5, the ray source module 33 is provided with a mounting shaft 331, each of the main bodies 11 and 12 is provided with a shaft hole, and the main bodies 11 and 12 are mounted on the mounting shaft 331 through the shaft holes. Moreover, the mounting-positioning structure further includes second positioning pins 23 and 24, and the main bodies 11 and 12 and the ray source module 33 are provided with second pin holes corresponding to the second positioning pins 23 and 24. By engaging the shaft holes of the main bodies 11 and 12 with the mounting shaft 331, and inserting the second positioning pins 23 and 24 into the corresponding second pin holes, the main bodies 11 and 12 can be positioned relative to the ray source module 33. In addition, the mounting-positioning structure further includes second fixing bolts 25 and 26 for fixedly connecting the main bodies 11 and 12 to the ray source module 33, and corresponding second threaded holes disposed in the main bodies 11 and 12 and the ray source module 33. By screwing the second fixing bolts 25 and 26 into the corresponding second threaded holes, the main bodies 11 and 12 can be fixedly connected to the ray source module 33. By pulling out the second positioning pins 23 and 24 and loosening the second fixing bolts 25 and 26, the main bodies 11 and 12 can be loosened relative to the ray source module 33. In this state, the adjusting device can drive the ray source module 33 to rotate around the mounting shaft 331 relative to the main bodies 11 and 12.

In a specific embodiment, the adjusting device includes a rotation drive mechanism, the rotation drive mechanism includes an adjusting block 27 secured on the ray source module 33 and a jackscrew 28 disposed on the main body 11 and abutting against the adjusting block 27, and the jackscrew 28 can be screwed to push the adjusting block 27 to move, so as to rotate the ray source module 33. Here, the rotation drive mechanism is disposed on only one main body of the mounting-positioning structure, that is, only at one end of the ray source module 33 in the length direction. Since two ends of the ray source module 33 are both supported by the mounting shaft 331, when the ray source module 33 is pushed to rotate at one end of the ray source module 33, the entire ray source module 33 can rotate accordingly. After the ray source module 33 is rotated by a predetermined angle, the second positioning pins 23 and 24 are inserted into the corresponding second pin holes again, the second fixing bolts 25 and 26 are screwed into the corresponding second threaded holes again, and the main bodies 11 and 12 can be fixedly connected to the ray source module 33.

In the foregoing embodiment, the mounting shaft 331 on the ray source module 33 can coincide with a virtual line which connects the plurality of target spots in the ray source module 33. Therefore, by rotating the ray source module 33 around the mounting shaft 331, the ray source module 33 can rotate around a target spot axis.

In addition, although the mounting-positioning structure according to the foregoing embodiments is described by taking the ray source module 33 of the ray source assembly 3 in FIG. 2 as an example, the foregoing mounting-positioning structure is applicable to the mounting, positioning, and adjustment of the ray source assembly of any suitable ray scanning apparatus. The mounting, positioning, and adjustment of the ray source module 33 of the ray source assembly 3 in FIG. 2 are not limited to using the mounting-positioning structure in the foregoing embodiments, but may be implemented by any other suitable structure. For example, in the embodiment shown in FIG. 5, the lifting device is implemented by the lifting roller 13 and the lifting jackscrew 17. However, the lifting device is not limited to the specific structure of this embodiment, but may be implemented as another suitable structure, and for example, the lifting device may achieve lifting and lowering by means of lifting jackscrews on both of the two main bodies. Similarly, specific implementations of the moving device, the first positioning device, the second positioning device, and the adjusting device are not limited to the specific structures in the foregoing embodiments, and other suitable structures can be used, as long as their functions can be implemented.

In the above embodiments, the ray source modules of the ray source assembly 3 of the ray scanning apparatus shown in FIG. 1 are distributed ray sources, but alternatively, the ray source assembly 3 may be composed of a plurality of single-point source groups, where each single-point source group includes at least two single-point sources. Each single-point source can emit a ray beam separately, such as a fan-shaped beam with a flare angle A (as shown in FIG. 3). The respective single-point sources of the ray source assembly 3 can emit rays in a predetermined time sequence under the control of the control device of the ray scanning system. FIG. 4(*d*) shows a layout of a ray source assembly including a plurality of single-point source groups according to some embodiments. As shown in FIG. 4(*d*), the ray source assembly includes a plurality of single-point source groups arranged around the scanning area at a bottom view angle, a left view angle, a right view angle, a top view angle, and corner squint angles, where the single-point source group at the bottom view angle includes 3 single-point sources arranged at a left bottom view angle, a middle bottom view angle, and a right bottom view angle respectively; the single-point source group at the top view angle includes three single-point sources arranged at a left top view angle, a middle top view angle, and a right top view angle respectively; the single-point source group at the left view angle includes 2 single-point sources arranged at an upper left view angle and a lower left view angle respectively; the single-point source group at the right view angle includes 2 single-point sources arranged at an upper right view angle and a lower right view angle respectively; and the single-point source group at the corner squint angles includes 4 single-point sources arranged at an upper left squint angle, an upper right squint angle, a lower left squint angle, and a lower right squint angle respectively. According to some other embodiments, each single-point source group may further include more single-point sources. Similarly, each single-point source may include a respective mounting-positioning structure to mount and position the single-point source, thereby ensuring that the plurality of single-point sources are located in the same plane perpendicular to the conveying direction of the object under inspection 6. The mounting-positioning structure may further be used for rotating the single-point source to adjust the beam output angle of each single-point source.

Hereinafter, the arrangement of the detector assembly 4 of the ray scanning apparatus shown in FIG. 1 is described in detail. The detector assembly 4 may include a plurality of detector sets located in a plane(s) perpendicular to the conveying direction of the object under inspection 6, and end portions of the detector sets are connected to each other to surround the scanning area. The plurality of detector sets may be located in the same plane or different planes perpendicular to the conveying direction of the object under inspection 6, and can optionally be disposed in the same plane. This embodiment is described by taking the same plane as an example, but is also applicable to situations in different planes. Specifically, each detector set of the detector assembly 4 is a detector array including a plurality of detector units, and the plurality of detector sets may be arranged in an enclosed square, rectangular, polygonal, or elliptical structure surrounding the scanning area, where a portion of the structure is located below the conveying device 1 to completely surround conveying device 1.

Figure 6:
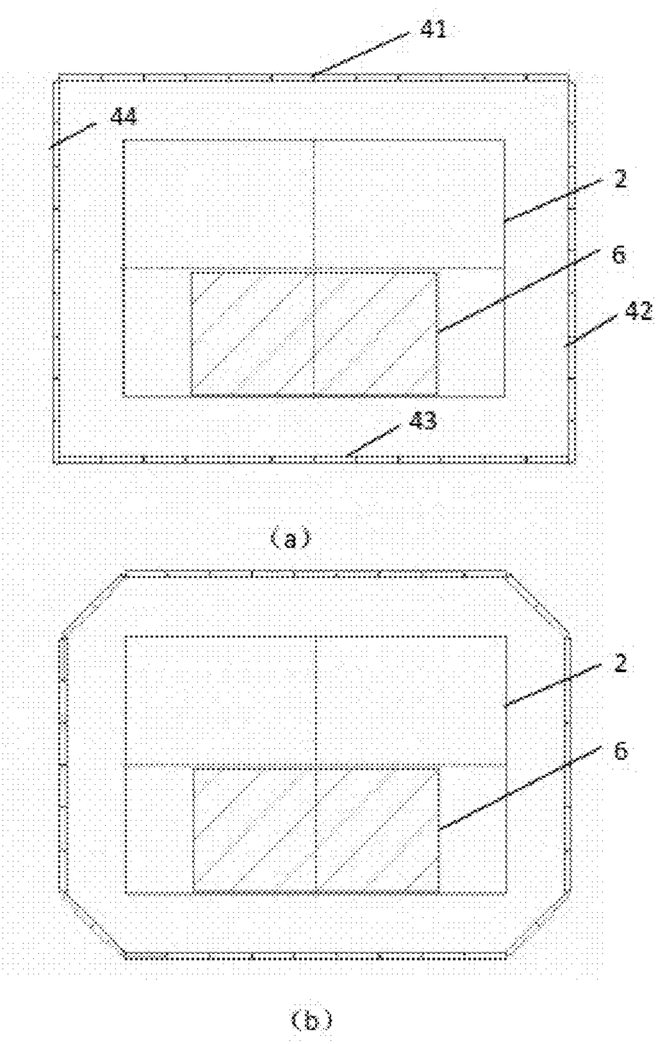
FIG. 6 is a schematic diagram of distribution of a detector assembly according to some embodiments of the present application.

FIG. 2 shows an arrangement of the detector assembly according to some embodiments, where the detector assembly 4 includes four detector sets 41, 42, 43, and 44, and each of the detector sets 41, 42, 43, and 44 is a straight line detector array and includes a plurality of detector units arranged in a straight line. The four detector sets 41, 42, 43, and 44 are arranged on the upper, lower, left, and right sides of the scanning area, and their end portions are connected to each other to form an enclosed rectangular structure (as shown in FIG. 6(*a*)) or a square structure. The arrangement of the detector assembly 4 is not limited to the embodiments shown in FIG. 2 and FIG. 6(*a*), and alternatively, the detector assembly may be arranged in other structures. For example, the detector assembly 4 may include four long straight line detector arrays and four short straight line detector arrays, which are alternately arranged around the scanning area and connected at end portions to form an enclosed polygonal structure (as shown in FIG. 6(*b*)). The detector assembly 4 may include other quantities of long straight line detector arrays and short straight line detector arrays, which are alternately arranged around the scanning area and connected at end portions to form other enclosed polygonal structures. The detector assembly 4 may further include other quantities, lengths, and/or shapes of detector sets to form enclosed structures of other shapes, such as an elliptical structure.

Figure 7:
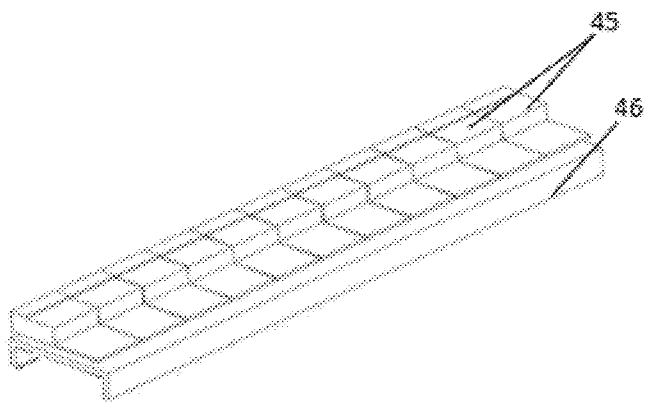
FIG. 7 is a schematic structural diagram of a straight line detector set according to some embodiments of the present application.
Figure 8:
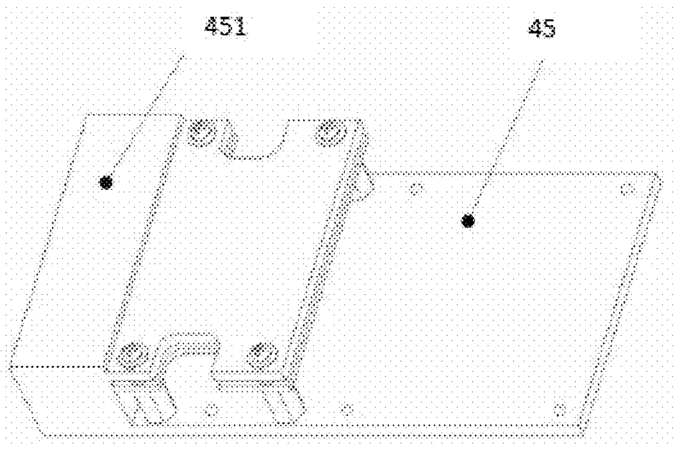
FIG. 8 is a schematic structural diagram of a detector unit according to some embodiments of the present application.

The detector set in the form of the straight line detector array may have any suitable structure, and according to some embodiments, its specific structure may be as shown in FIG. 7. As shown in FIG. 7, the detector set includes a plurality of detector units 45 and a detector arm 46, and the plurality of detector units 45 are arranged in a straight line side by side on the detector arm 46. A specific structure of a detector unit 45 may be shown in FIG. 8, or may be in any other suitable structure. As shown in FIG. 8, the detector unit 45 includes a detector crystal 451 for receiving rays. The plurality of detector units 45 are arranged side by side on the detector arm 46, with the detector crystals 451 facing the same direction. The structure of the detector arm 46 is not limited to the embodiment shown in FIG. 7, but may be any other suitable structure (for example, structures of the detector arm shown in FIGS. 9, 15, and 17 hereinafter). The detector sets of the present application are not limited to the form of straight line detector arrays, but may be in a form of arc-shaped detector arrays to form a detector assembly with an elliptical structure. The arc-shaped detector array may include a plurality of arc-shaped detector units and an arc-shaped detector arm, and the plurality of arc-shaped detector units are arranged side by side on the arc-shaped detector arm, where detector crystals of the detector units face the same direction.

According to some embodiments, the respective detector sets of the detector assembly 4 may be independently mounted and detached, thereby improving the maintainability of the detector assembly. Moreover, in some examples, the plurality of detector sets of the detector assembly 4 are configured to be mounted, detached, and adjusted in the conveying direction of the object under inspection 6. In this case, when the detector assembly 4 is arranged on the inner side of the ray source assembly 3 in a direction perpendicular to the conveying direction of the object under inspection 6, the detector sets can be mounted, detached, adjusted, and maintained without detaching the ray source assembly, thereby further improving the maintainability of the detector assembly.

Specifically, with a mounting-fixing structure for the detector set in the present application, the detector set of the detector assembly 4 can move relative to its mounting position in the ray scanning apparatus (such as the support frame 5) in the conveying direction of the object under inspection 6 and be dismounted from the mounting position or mounted to the mounting position.

Hereinafter, the mounting-fixing structure for the detector set according to some embodiments of the present application will be described in detail. The mounting-fixing structure for the detector set according to some embodiments of the present application specifically includes a first mounting portion fixedly disposed on the detector set; a second mounting portion fixedly disposed on the support frame of the ray scanning apparatus and in linear moving fit with the first mounting portion, where the detector set can be moved along the second mounting portion to a predetermined mounting position when the first mounting portion and the second mounting portion engage with each other; and a fixing device disposed on a side of the detector set in a width direction to fix the detector set relative to a mounting reference plane on the support frame. In some specific embodiments, the detector set is mounted and fixed to the support frame of the ray scanning apparatus via the detector arm, where the first mounting portion is fixedly disposed on the detector arm of the detector set, and the fixing device is disposed on a side of the detector arm in the width direction to fix the detector arm to the support frame, so as to fix the detector set.

Figure 9:
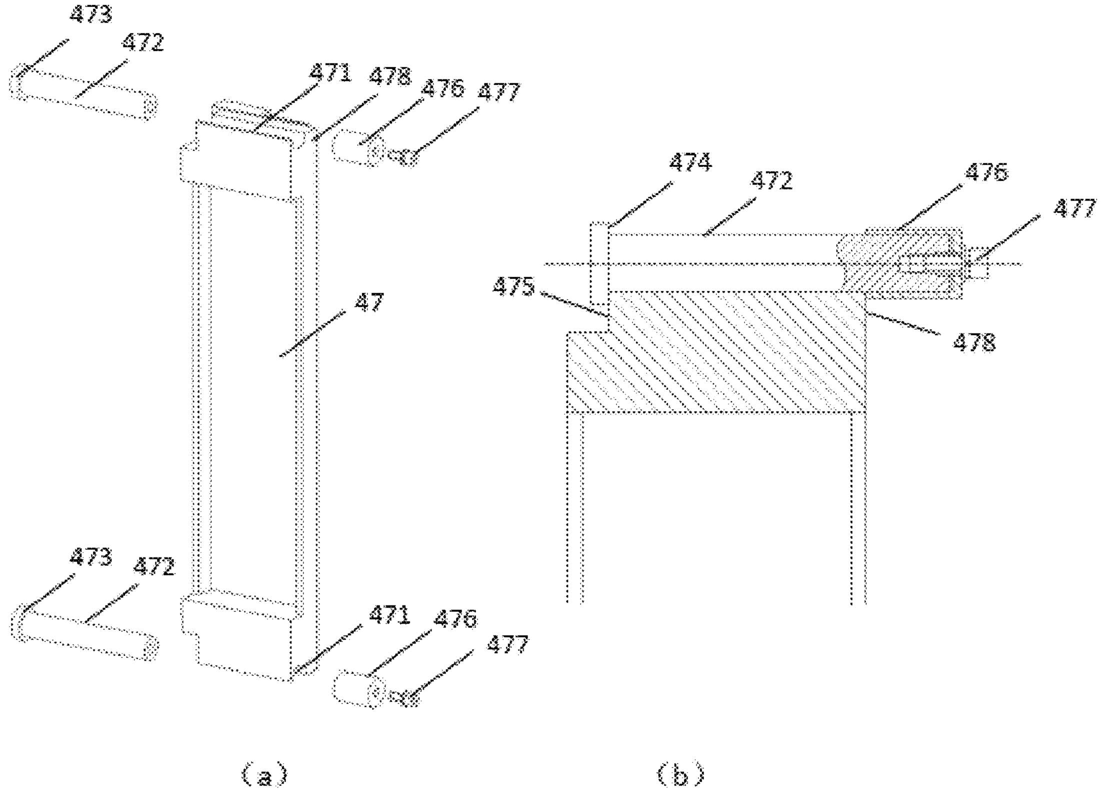
FIG. 9 is a schematic diagram of a mounting-fixing structure for a detector set according to some embodiments of the present application.

FIG. 9 shows a mounting-fixing structure for a detector set according to some specific embodiments, where (a) is an exploded three-dimensional diagram of a detector arm and the mounting-fixing structure, and (b) is a partial cross-sectional view of the detector arm in a mounting-fixing state of the detector set. FIG. 9 does not show a complete detector set, but shows only a detector arm, where a plurality of detector units may be arranged side by side in a length direction on the shown detector arm to form a complete detector set.

As shown in FIG. 9, the first mounting portion of the mounting-fixing structure for the detector set is specifically formed as a sliding groove 471 extending in the width direction of the detector arm 47. In a state of being mounted to the support frame 5 of the ray scanning apparatus, the width direction of the detector arm 47 is consistent with the conveying direction of the object under inspection 6. The second mounting portion is formed as a sliding rod 472 matching the sliding groove 471. The sliding groove 471 is formed as a semi-circular open sliding groove, and the sliding rod 472 is correspondingly formed as a cylindrical sliding rod. The sliding rod 472 is fixedly disposed on the support frame 5 or integrally formed with the support frame 5, with a length direction consistent with the conveying direction of the object under inspection 6. An end, near the support frame 5, of the sliding rod 472 is configured to increase in size relative to the remaining portion of the sliding rod 472 to form a protruding portion 473. An end surface, facing the detector arm 47, of the protruding portion

473 is formed as a mounting reference plane 474 for abutting against a surface 475 of a side of the detector arm 47 in the width direction. The surface 475 is a mounting surface of the detector arm 475, and both the surface 475 and the mounting reference plane 474 are machined to have good flatness. When the mounting surface 475 of the detector set abuts against the mounting reference plane 474 for positioning, the detector set can be accurately positioned in the width direction, namely, the conveying direction of the object under inspection 6. The protruding portion 473 may further be used as a limit portion. When the detector set is mounted, the sliding groove 471 is aligned with the sliding rod 472, and the detector arm 47 is pushed towards the support frame 5 along the sliding rod 472 until abutting against the protruding portion 473, so as to be moved to the predetermined mounting position.

The fixing device is disposed at the other end, opposite to the protruding portion 473, of the sliding rod 472 and arranged to abut against, with the protruding portion 473, two sides of the detector arm 471 in the width direction, so as to limit the position of the detector arm 47 in the width direction. Specifically, the fixing device includes a positioning sleeve 476 and a fastener 477, the positioning sleeve 476 is sleeved on the other end, opposite to the protruding portion 473, of the sliding rod 472 and abuts against a surface 478 of the other side of the detector arm 47 in the width direction, and the fastener 477 fixes the positioning sleeve 476 to the other end, opposite to the protruding portion 473, of the sliding rod 472. Specifically, the fastener 477 may be a fastening screw, and threaded holes are disposed on the positioning sleeve 476 and the other end of the sliding rod 472. By screwing the fastening screw into the threaded holes, the positioning sleeve 476 is fastened to the sliding rod 472, so as to fix the detector arm 47 in the width direction relative to the sliding rod 472 (namely, the support frame 5). Meanwhile, because the shape matching of the sliding rod 472 with the sliding groove 471 limits other degrees of freedom, the detector arm 47 can be fully positioned and secured.

Through the above mounting-fixing structure, when the detector set is mounted, in a state that the detector units face the scanning area and the width direction of the detector set is consistent with the conveying direction of the object under inspection 6, the sliding groove 471 of the detector arm 47 is first aligned with the sliding rod 472, and the detector arm 47 is moved along the sliding rod 472 until abutting against the protruding portion 473; then, the positioning sleeve 476 is sleeved on the end, opposite to the protruding portion 473, of the sliding rod 472 and fixed with screws to the sliding rod 472, thereby fixing the detector arm 47. When the detector set is dismounted, reverse operations can be performed.

Through the above mounting-fixing structure, the sliding rod 472 extends in the conveying direction of the object under inspection 6, that is, the linear moving fit between the detector set and the support frame 5 is in the conveying direction of the object under inspection, the fixing device is disposed on one side of the detector set in the width direction, and the width direction of the detector set is consistent with the conveying direction of the object under inspection 6. Therefore, with the above mounting-fixing structure, the detector set can be moved in the conveying direction of the object under inspection 6 for being mounted or detached, and the fastening operation can also be performed on a side of the detector set in the conveying direction of the object under inspection. Accordingly, the detector assembly can be mounted, detached, or maintained from a side in the conveying direction of the object under inspection. Even if the detector assembly is arranged on the inner side of the ray source assembly in the direction perpendicular to the conveying direction, its mounting, detaching or maintenance can avoid the obstruction of the ray source assembly, and can be implemented without detaching the ray source assembly, thereby improving the convenience of mounting, detaching and maintenance of the detector assembly.

In addition, optionally, the second mounting portion of the above mounting-fixing structure is configured to support the detector set at the predetermined mounting position in a state of engaging with the first mounting portion. Specifically, the second mounting portion includes two sliding rods 472, and two sliding grooves 471 are correspondingly formed on the detector arm 47 at two ends of the detector arm 47 in the length direction, so that after the detector arm 47 is moved to the predetermined mounting position on the two sliding rods 472, the two sliding rods 472 can support the detector set at the predetermined mounting position without other auxiliary structures and/or tools. In this way, when the detector set is fastened, neither an additional tool nor an operator is required to support the detector set for operation, thereby improving the convenience of operation.

Although the detector arm is shown in the vertical direction in FIG. 9, the above mounting-fixing structure is not limited to be merely used for mounting and detaching the detector set arranged vertically in the ray scanning apparatus, but can also be used for detector sets arranged in other directions.

The mounting-fixing structure between the detector set and the support frame 5 is not limited to the embodiment shown in FIG. 9, and other suitable mounting-fixing structures may also be used. For example, according to some embodiments, the linear moving fit of the mounting-fixing structure may be any other suitable fit, such as linear rolling fit between a linear ball bearing and a cylindrical shaft. According to some other embodiments, the cross-section of the sliding groove 471 is not limited to semi-circular, but may be semi-rectangular or the like, and correspondingly, the sliding rod 472 is not limited to cylindrical, but may be prism-shaped or the like to match the sliding groove 471.

In addition, in the case that the detector assembly includes a plurality of detector sets, the mounting reference planes of the plurality of detector sets are disposed in the same plane perpendicular to the conveying direction of the object under inspection 6, which can ensure that the plurality of detector sets are in the same plane perpendicular to the conveying direction of the object under inspection 6 after being mounted. Specifically, if the respective detector sets are all mounted by using the mounting-fixing structure shown in FIG. 9, if the end surfaces, facing the detector arms 47, of the protruding portions 473 corresponding to the respective detector sets, that is, the mounting reference planes 474 are located in the same plane perpendicular to the conveying direction of the object under inspection 6, and the mounting surfaces 475 of the respective detector sets in the width direction all abut against the respective mounting reference planes 474 and are fixed, the plurality of detector sets are inevitably located in the same plane perpendicular to the conveying direction of the object under inspection 6 after being mounted.

Hereinafter, the relative arrangement of the ray source assembly 3 and the detector assembly 4 of the ray scanning apparatus according to the embodiments of the present application is further described. As mentioned earlier, the ray source assembly 3 includes a plurality of ray source modules, which are arranged around the scanning area and located in the same plane perpendicular to the conveying direction of the object under inspection 6; and the detector assembly 4 includes a plurality of detector sets located in the same plane perpendicular to the conveying direction of the object under inspection 6, and end portions of the detector sets are connected to each other to surround the scanning area. Further, in a combined state of the ray source assembly 3 and the detector assembly 4, the detector assembly 4 is arranged on the inner side of the ray source assembly 3 in the direction perpendicular to the conveying direction of the object under inspection 6, and the ray source assembly 3 and the detector assembly 4 are arranged to overlap at least partially in the conveying direction of the object under inspection 6, where the plurality of ray source modules of the ray source assembly 3 may be arranged in a structure as described in any of the foregoing embodiments, such as a rectangular structure, a polygonal structure, or an elliptical structure, and the plurality of detector sets of the detector assembly 4 are arranged in a structure as described in any of the foregoing embodiments, such as a square structure, a rectangular structure, a polygonal structure, or an elliptical structure. Hereinafter, the embodiment shown in FIG. 2 is used as an example to describe the detailed arrangement of the ray source assembly 3 and the detector assembly 4 in the combined state. In FIG. 2, the four straight line distributed ray source modules 31, 32, 33, and 34 of the ray source assembly 3 are arranged in a discontinuous rectangular structure, while the four straight line detector arrays 41, 42, 43, and 44 of the detector assembly 4 are arranged in an enclosed rectangular structure, and the detailed arrangement described by the example of FIG. 2 in the combined state is also applicable to combinations of the ray source assembly 3 and the detector assembly 4 in any other structures.

Figure 10:
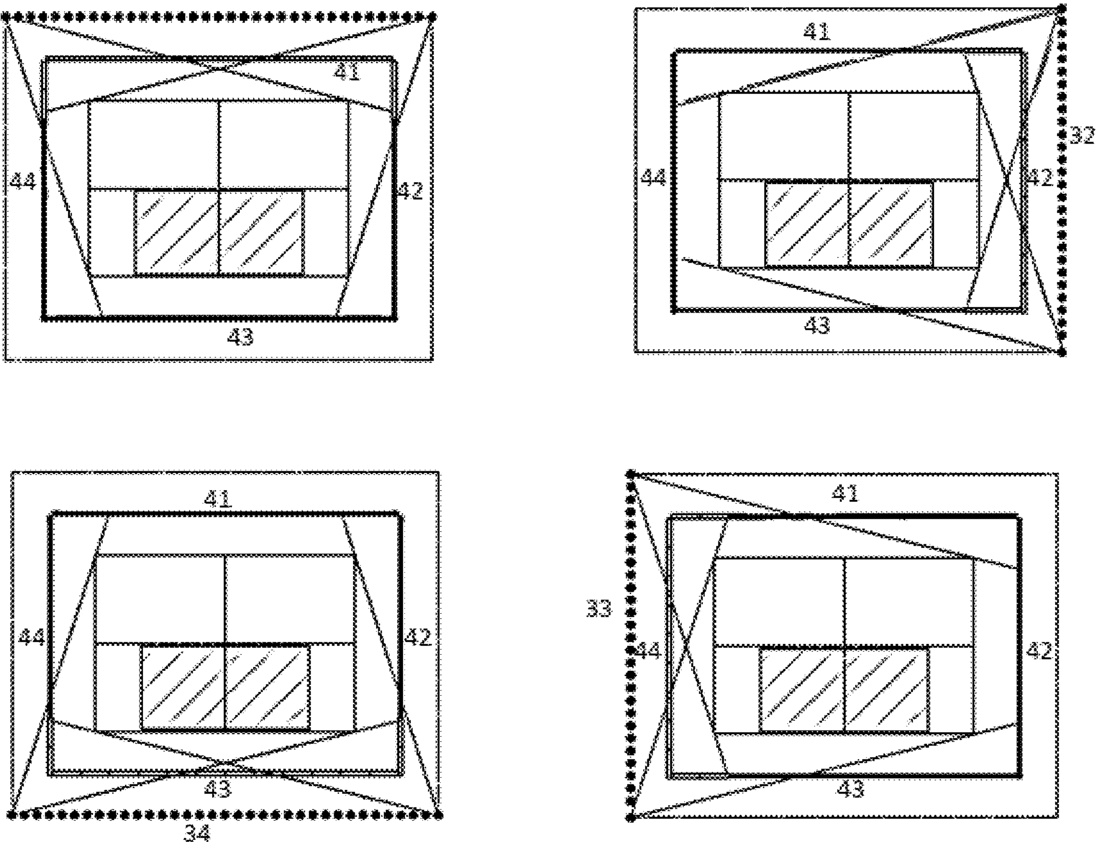
FIG. 10 is a schematic diagram of corresponding relationships between ray source modules and detector sets receiving their rays according to some embodiments of the present application.

Optionally, each of the detector sets 41, 42, 43, and 44 of the detector assembly 4 on the same side as a ray source module relative to the scanning area is arranged not to obstruct the ray beam of said ray source module, but to be able to receive rays from the ray source modules on the remaining sides. Due to the annular arrangement of the ray source assembly 3 and the detector assembly 4, the same detector set can be shared by different ray source modules of the ray source assembly. FIG. 10 shows corresponding relationships between each ray source module and the detector sets receiving its rays, where the ray beam of each target spot of the respective ray source modules 31, 32, 33, and 34 of the ray source assembly 3 is represented by a fan-shaped beam (with a flare angle A as shown in FIG. 3) as example, the ray beam emitted by each of the ray source modules 31, 32, 33, and 34 can be detected by the detector sets on three sides of the detector assembly 4, and the detector sets and their portions that can receive rays are represented by heavy lines. FIG. 10(*a*) shows the detector sets and their portions corresponding to the ray beams of the ray source module 31 on the upper side of the scanning area, where the detector sets 42, 43, and 44 of the detector assembly 4 receive the ray beams from the ray source module 31; FIG. 10(*b*) shows the detector sets and their portions corresponding to the ray beams of the ray source module 32 on the right side of the scanning area, where the detector sets 41, 43, and 44 of the detector assembly 4 receive the ray beams from the ray source module 32; FIG. 10(*c*) shows the detector sets and their portions corresponding to the ray beams of the ray source module 33 on the lower side of the scanning area, where the detector sets 41, 42, and 44 of the detector assembly 4 receive the ray beams from the ray source module 33; and FIG. 10(*d*) shows the detector sets and their portions corresponding to the ray beams of the ray source module 34 on the left side of the scanning area, where the detector sets 41, 42, and 43 of the detector assembly 4 receive the ray beams from the ray source module 34. From FIG. 10, it can be seen that the rays of one ray source module can be received by the detector sets on other sides except the detector set on the same side as the ray source module relative to the scanning area, and different ray source modules can share the same detector sets, for example, the ray source modules 31 and 32 share the detector sets 43 and 44, the ray source modules 32 and 33 share the detector sets 41 and 44, and the ray source modules 33 and 34 share the detector sets 41 and 42. In addition, the rays of each ray source module can be detected by the detector set on the opposite side of the ray source module, and can also be received by the detector sets on other sides except the detector set on the same side as the ray source module relative to the scanning area, and thus the rays of each ray source module can be detected by the detector assembly as much as possible. Therefore, the detector assembly of the present application can improve image quality and reduce the quantity of detector sets and costs of the apparatus.

Figure 11:
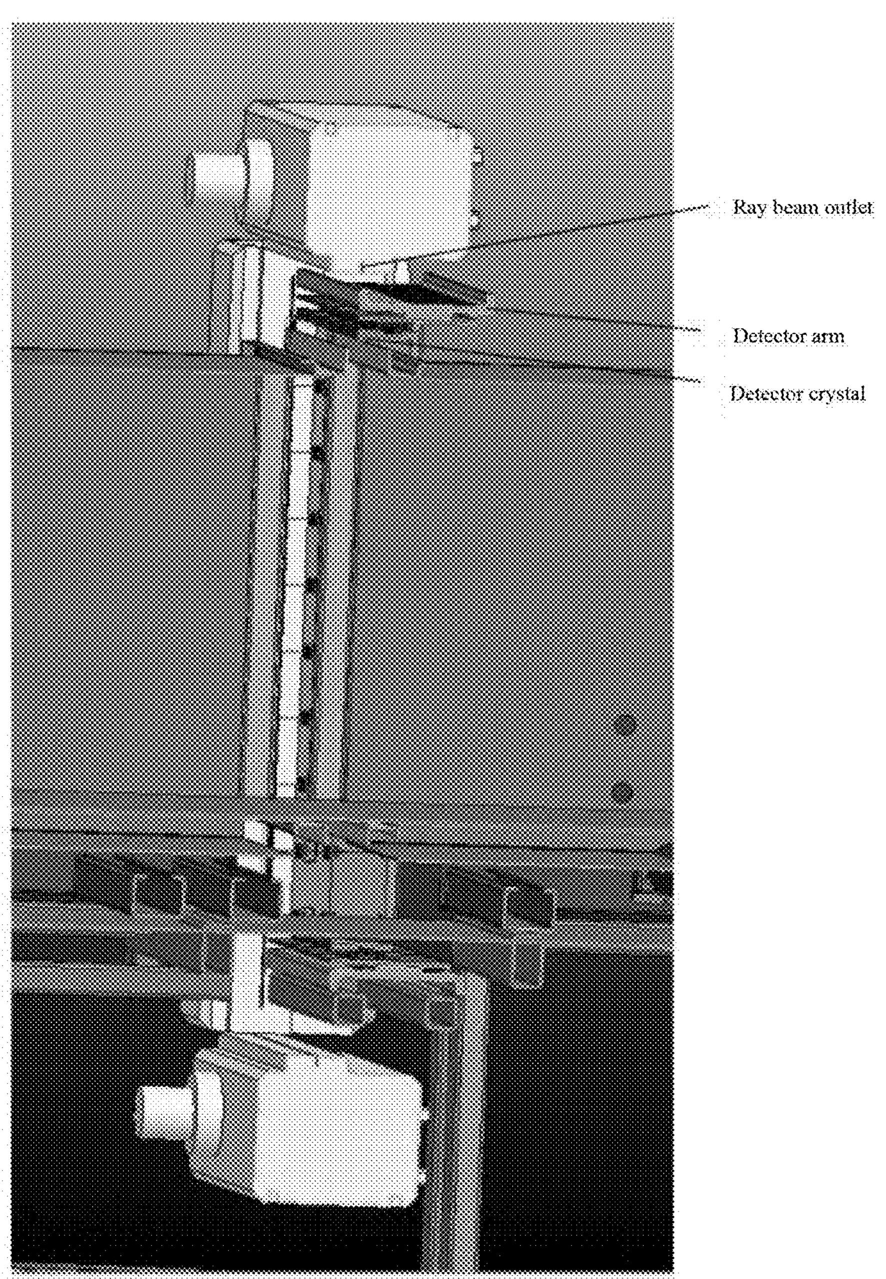
FIG. 11 is a schematic diagram of a cross-sectional structure taken along a centerline, in a conveying direction of an object under inspection, of the ray scanning apparatus shown in FIG. 1 according to some embodiments of the present application.
Figure 12:
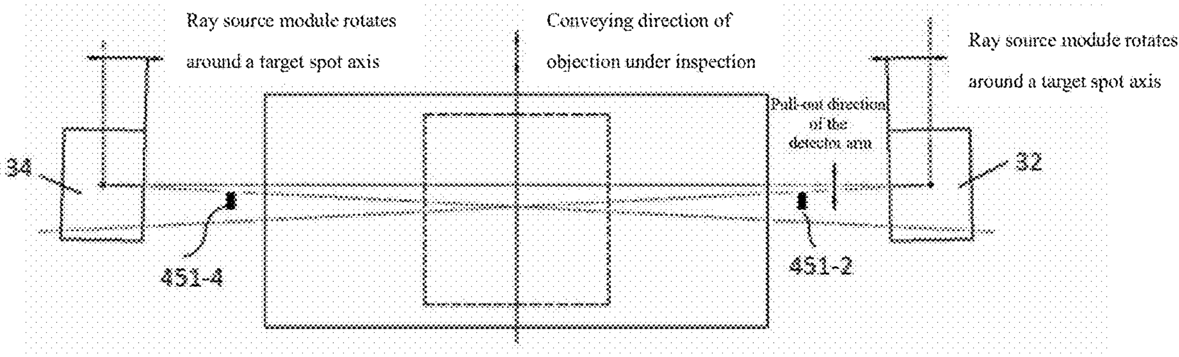
FIG. 12 is a schematic diagram of layout of detector sets and a ray source modules in a top view according to some embodiments of the present application.

Moreover, optionally, the detector crystals of each detector set of the detector assembly 4 is arranged at end portions of the detector units in the conveying direction of the object under inspection 6, and are arranged, in the conveying direction of the object under inspection 6, immediately adjacent to emission area of the ray beam of the ray source module on the same side relative to the scanning area, but does not obstruct the ray beam of said ray source module on the same side. Accordingly, the coverage length of an optical path between the ray source assembly and the detector assembly can be reduced as much as possible, thereby reducing the length of the device. Specific details please refer to FIG. 11 and FIG. 12. FIG. 11 is a schematic diagram of a cross-sectional structure taken along a centerline in the conveying direction of the object under inspection of the ray scanning apparatus shown in FIG. 1 according to some embodiments. As shown in FIG. 11, the detector unit may be, for example, the detector unit 45 shown in FIG. 7, and the detector crystal may be, for example, the detector crystal 451 shown in FIG. 8; the surface of the detector crystal 451 is arranged parallel to the conveying direction of the object under inspection 6, and is located at an end portion of the detector unit 45 in the conveying direction of the object under inspection 6. Meanwhile, other components of the detector set, such as other elements of the detector unit 45 and the detector arm, are flush with the detector crystal 451 at the end portion of the detector unit 45, so as to avoid a ray beam outlet of the ray source module on the same side as the detector set. In addition, FIG. 12 is a schematic diagram of a layout of the detector sets and the ray source modules in a top view according to some embodiments, where the ray source modules on the left and right sides are ray source modules 34 and 32 of the ray source assembly 3 respectively, and the detector crystals 451-4 and 451-2 on the left and right sides represent the positions of the detector crystals of the detector sets 44 and 42 respectively. From FIG. 12, it can be seen that the detector crystal 451-4 is arranged, in the conveying direction of the object under inspection 6 immediately adjacent to the emission area of the ray beam of the ray source module 34 on the same side as the detector crystal 451-4, and does not obstruct the ray beam of said ray source module 34 on the same side; and the detector crystal 451-2 is arranged, in the conveying direction of the object under inspection 6 immediately adjacent to the emission area of the ray beam of the ray source module 32 on the same side as the detector crystal 451-2, and does not obstruct the ray beam of said ray source module 32 on the same side. With the above configuration, the ray source assembly 3 and the detector assembly 4 can overlap as much as possible in the conveying direction of the object under inspection 6 to minimize the coverage length of the optical path between the ray source assembly and the detector assembly, thereby reducing the length of the apparatus.

In some examples, each ray source module of the ray source assembly 3 on the same side as a detector set relative to the scanning area is arranged so that its ray beam avoids said detector set and illuminates the detector crystals of the detector set on the opposite side of the ray source module. As shown in FIG. 12, the ray beam of the ray source module 34 can avoid the detector set 44 on the same side as said ray source module 34 and cover and illuminate the detector crystal 451-2 of the detector set 42 on the opposite side of said ray source module 34, and the ray beam of the ray source module 32 can avoid the detector set 42 on the same side as said ray source module 32 and cover and illuminate the detector crystal 451-4 of the detector set 44 on the opposite side of said ray source module 32. Further, each ray source module of the ray source assembly 3 is arranged to illuminate the detector crystal of the detector set on the opposite side of the corresponding ray source module with the center position of the ray beam. Specifically, the ray source module can rotate a predetermined angle relative to a target spot axis to adjust the output angle of the ray beam of the ray source module, so that the center position of the ray beam illuminates the detector crystal. Here, the target spot axis refers to a virtual line which connects the plurality of target spots in the ray source module. Since the detector crystals of the detector set are located at the end portions of the detector units in the conveying direction of the object under inspection 6 and arranged immediately adjacent to the emission area of the ray beam of the ray source module on the same side, by rotating the ray source module only a very small predetermined angle, such as 1.5 degrees, the center position of the ray beam can illuminate the detector crystals. In this way, the adverse effects of the ray beam obliquely incident on the surface of the detector crystals on imaging can be minimized. Moreover, the rotation of the ray source module is not limited to rotation around the target spot axis, but may be rotation relative to other axes except the target spot axis to adjust the output angle of the ray beam, where the rotation of the ray source module relative to the target spot axis or other axes can be implemented by the foregoing mounting-positioning structure for the ray source module. In addition, the way of adjusting the output angle of the ray beam is not limited to the above embodiment, for example, the output angle of the ray beam may be changed by changing the opening direction of the ray source module, adjusting a collimator, or by other suitable ways, as long as the above arrangement of the ray source assembly can be implemented.

In the ray scanning apparatus of the embodiments of the present application, the ray source assembly is composed of a plurality of ray source modules, and the end portions of the plurality of ray source modules are directly connected to or spaced apart from each other. In the case that the end portions of the ray source modules are directly connected, due to the mechanical connection structure between the end portions, ray source points between adjacent ray source modules are discontinuous inevitably; for example, the distance between the target spots of the end portions of two adjacent ray source modules is significantly greater than the distance between the target spots inside the ray source module, and this is especially true when the end portions of the ray source modules are spaced apart. Therefore, projection data are missing at the end portions of the adjacent ray source modules during scanning due to the lack of target spots. In this regard, according to some embodiments, the image processing module of the ray scanning apparatus in the present application is configured to have a data compensation function, which can compensate for view angle missing data and/or repair a reconstructed image to improve image quality. Specifically, the image processing module is configured to perform image reconstruction by an iterative method, an image domain repair method, or a combination of the two.

The iterative method specifically includes the following steps:

Step 1: performing image reconstruction by view angle missing data to obtain a reconstructed image, where the view angle missing data are initial data detected by the detector assembly, and the initial data lack projection data of view angles without target spots. For example, when the ray scanning apparatus includes a ray source assembly in the discontinuous rectangular structure as shown in FIG. 2 or FIG. 4(*a*), the initial data detected by the detector assembly lack projection data at the squint angles of four corners of the rectangular structure;

Step 2: performing forward re-projection to the reconstructed image obtained in Step 1 based on a complete geometry. Here, the reconstructed image obtained in Step 1 may present an object with an incomplete geometric structure due to the use of the view angle missing data, and the forward re-projection based on the complete geometry refers to forward re-projection under the condition that the geometric shape is fully supplemented. Specifically, the geometric shape can be supplemented by speculation, assumption, or the like;

Step 3: repairing the view angle missing data in a projection domain by an image repair algorithm with the re-projection data obtained in Step 2 as a reference, and performing image reconstruction again by the repaired data;

Step 4: iterating the previous steps of forward re-projection, view angle missing data repair, and image reconstruction for several times, and taking the image obtained in the last image reconstruction step as a final reconstructed image.

In the above iterative method, a convergence threshold can be pre-set. When the image obtained in the image reconstruction step satisfies the set convergence threshold, the iteration is stopped and the image is used as the final reconstructed image. When the image obtained in the image reconstruction step does not satisfy the set convergence threshold, the next iteration is continued, namely, the forward re-projection step, the view angle missing data repair step, and the image reconstruction step, until the image obtained in the image reconstruction step satisfies the set convergence threshold.

In the above iterative method, the image repair algorithm in Step 2 includes various conventional algorithms, such as methods based on TV regular terms, wavelet analysis, and dictionary learning, and artificial neural network methods.

In the above iterative method, the image reconstruction method includes commonly used algorithms such as analytical algorithms and iterative algorithms.

According to some other embodiments, the image processing module may alternatively use an image threshold repair method to obtain a reconstructed image. Specifically, the image processing module may perform the image reconstruction by using the view angle missing data, namely, the initial data detected by the detector assembly, and remove artifacts and correct data on the reconstructed image in the image threshold by using an image repair algorithm, so as to obtain a final reconstructed image. In the present embodiment, the image repair algorithm includes various conventional algorithms, such as methods based on TV regular terms, wavelet analysis, and dictionary learning, and artificial neural network methods.

According to some other embodiments, the image processing module may use a combination of the above iterative method and the above image threshold repair method for image reconstruction to improve image quality. Specifically, the image processing module may first use the above iterative method to complete the missing data in the projection domain to obtain a reconstructed image satisfying the set convergence threshold, and then use the above image threshold repair method to perform artifact removal and data correction on the reconstructed image obtained by the iterative method to obtain a final reconstructed image.

Compared with a ray source assembly using distributed ray sources, the source points of the ray source assembly in the form of a single-point source are relatively sparse, and the image processing module can use an image reconstruction algorithm suitable for sparse view angle data to obtain a scanning image.

In the ray scanning apparatus of the foregoing embodiments, the ray source assembly surrounds the scanning area on the upper, lower, left, and right sides. According to some other embodiments, the present application further provides a ray scanning apparatus, which is arranged in substantially the same way as the ray scanning apparatus of the foregoing embodiments, with the main difference in the arrangement of the ray source assembly, where the ray source assembly is arranged around the scanning area on only the upper side, the lower side, and one of the left and right sides. The following description takes the arrangement of the ray source assembly on the upper, lower, and right sides of the scanning area as an example, but is also applicable to the situation where the ray source assembly is arranged on the upper, lower, and left sides of the scanning area.

Specifically, in the ray scanning apparatus of the foregoing embodiments, each ray source module of the ray source assembly 3 is a distributed ray source, and the plurality of ray source modules may be arranged in a rectangular structure, a polygonal structure, an elliptical structure, or the like surrounding the scanning area. In the present embodiment, the plurality of ray source modules of the ray source assembly may still be distributed ray sources. The difference is that the plurality of ray source modules are arranged in a non-enclosed structure around the scanning area and opened on the left side of the scanning area, such as a rectangular structure, a polygonal structure, or an elliptical structure opened on the left side. Here, the left side of the scanning area refers to the left side of the scanning area in the direction perpendicular to the conveying direction of the object under inspection 6. In the foregoing embodiments, the ray source assembly 3 is arranged in a discontinuous or continuous rectangular structure, a continuous polygonal structure, a continuous rounded rectangular structure, a discontinuous polygonal or discontinuous rounded rectangular structure, and other polygonal and elliptical structures, and correspondingly, in the present embodiment, the ray source assembly is arranged in a discontinuous or continuous rectangular structure, a continuous polygonal structure, a continuous rounded rectangular structure, a discontinuous polygonal or discontinuous rounded rectangular structure, and other polygonal and elliptical structures opened on the left side of the scanning area. For example, compared to the ray source assembly described in FIG. 2, the ray source assembly 3 of the present embodiment does not include at least the ray source module 34 on the left side of the scanning area. For example, compared to the ray source assembly shown in FIG. 4(*b*) and FIG. 4(*c*), the ray source assembly 3 of the present embodiment does not include at least the ray source module on the left side of the object under inspection 6.

In addition, like the foregoing embodiments, the ray source assembly of the present embodiment may also be composed of a plurality of single-point source groups. The difference from the foregoing embodiments is that the ray source assembly 3 of the present embodiment does not include the single-point source at the left view angle, or does not include the single-point sources at the left view angle, the upper left squint angle, and the lower left squint angle.

In addition to the above differences, the features of other aspects of the ray source assembly in the present embodiment are the same as those of the ray source assembly 3 in the foregoing embodiments.

Figure 13:
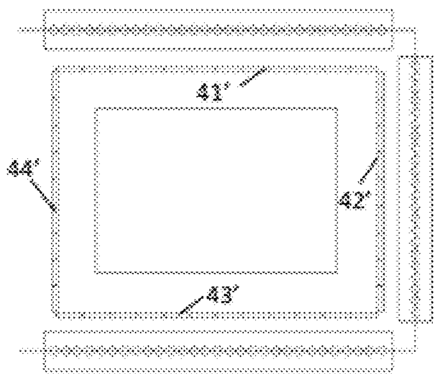
FIG. 13 is a schematic diagram of a combination of a detector assembly and a ray source assembly according to some embodiments of the present application.
Figure 14:
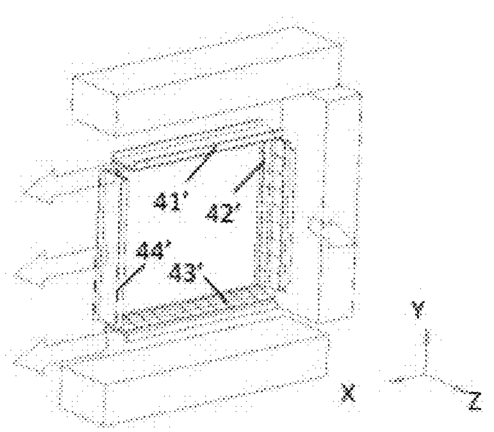
FIG. 14 is a schematic diagram of detaching directions of detector sets in the combination of the detector assembly and the ray source assembly shown in FIG. 13 according to some embodiments of the present application.

The features of various aspects of the detector assembly in the present embodiment are substantially the same as those of the detector assembly 4 in the foregoing embodiments, except that in the present embodiment, the detector assembly is combined with the ray source assembly that surrounds the scanning area on only the upper, lower, and right sides, and no ray source module is disposed on the same side as the detector set of the detector assembly 4 that is located on the left side of the scanning area. Therefore, the respective detector sets of the detector assembly 4 may be mounted and detached in the same way as the foregoing embodiments, and also may be mounted and detached in the following different way to further facilitate the mounting, detaching and maintenance of the detector assembly. Specifically, taking a combination of a detector assembly and a ray source assembly shown in FIG. 13 as an example (where the detector assembly is the same as that shown in FIG. 2, and the ray source assembly lacks the ray source module on the left side of the scanning area compared to the ray source assembly shown in FIG. 2), the detector assembly 4 may be mounted and detached as follows: the detector sets 41', 43', and 44' are mounted or detached in a direction perpendicular to the conveying direction of the object under inspection 6 (in the X direction as shown in FIG. 14) relative to the support frame 5, and the detector set 42' is mounted or detached in the conveying direction of the object under inspection 6 (in the Z direction as shown in FIG. 14) relative to the support frame 5.

The detector set 42' may be mounted or detached relative to the support frame 5 by the same mounting-fixing structure as the foregoing embodiments (as shown in FIG. 9). However, the mounting-fixing structure of the foregoing embodiments is not suitable for the mounting or detaching of the detector sets 41', 43', and 44' in the X direction. Therefore, different mounting-fixing structures are required. Specific embodiments of these mounting-fixing structures will be described in detail below.

Similar to the mounting-fixing structure of the foregoing embodiments, the mounting-fixing structure suitable for the mounting and detaching of the detector sets 41', 43', and 44' in the X direction also specifically includes a first mounting portion fixedly disposed on the detector set; a second mounting portion fixedly disposed on the support frame of the ray scanning apparatus and in linear moving fit with the first mounting portion, where the detector set can be moved along the second mounting portion to a predetermined mounting position when the first mounting portion and the second mounting portion engage with each other; and a fixing device disposed on a side of the detector set in a width direction for fixing the detector set to a mounting reference plane on the support frame. In some specific embodiments, the detector sets 41', 43', and 44' are mounted and fixed to the support frame of the ray scanning apparatus via detector arms, where the first mounting portion is fixedly disposed on the detector arm, and the fixing device is disposed on a side of the detector arm in the width direction, which fixes the detector arm to the support frame, so as to fix the detector set.

Figure 15:
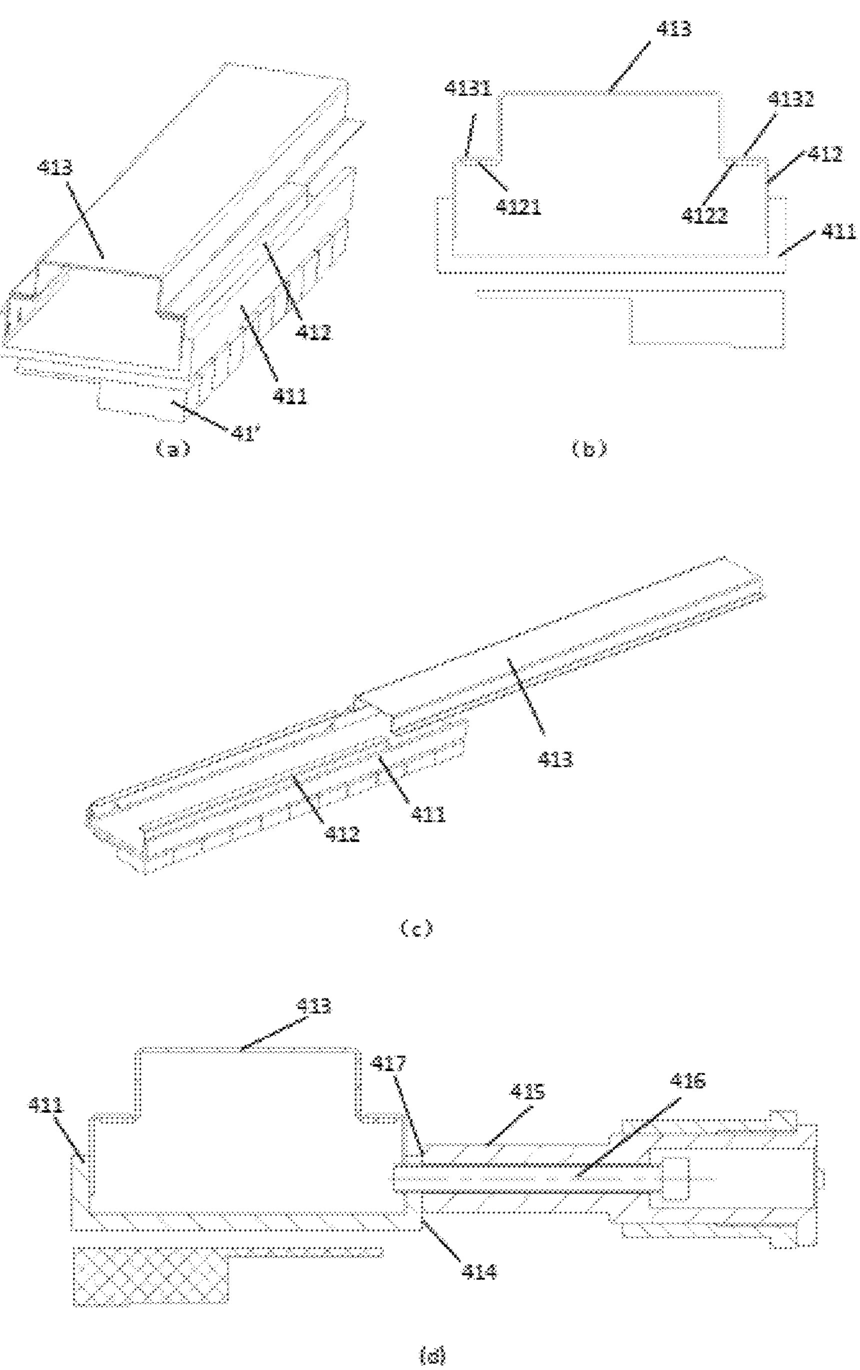
FIG. 15 shows a mounting-fixing structure suitable for a detector set according to some embodiments of the present application.

FIG. 15 shows a mounting-fixing structure suitable for the detector set 41' according to some specific embodiments, where (a) is a three-dimensional diagram of the detector set in a mounting state, (b) is a side view of the detector set in the mounting state, (c) is a three-dimensional diagram of the detector set in a detaching state, and (d) is a cross-sectional view of the detector set with a fixing device in the mounting state. As shown in FIG. 15, the first mounting portion of the mounting-fixing structure for the detector set 41' includes a slider 412 disposed on the detector arm 411, and the slider 412 extends in a length direction of the detector arm 411. When the detector set 41' is mounted in the ray scanning apparatus, the length direction of the detector arm 411 is perpendicular to the conveying direction of the object under inspection 6. In FIG. 15, the slider 412 extends over a portion of the length of the detector arm 411. In other embodiments, the slider 412 may alternatively extend over the entire length or another length of the detector arm 411. In addition, the slider 412 may be fixed to the detector arm 411 by bolt connection or the like. According to some other embodiments, the slider 412 may alternatively be integrally formed with the detector arm 411.

The second mounting portion is formed as a stationary guide rail 413 matching the slider 412. The stationary guide rail 413 is fixedly connected to the support frame 5 (not shown in FIG. 15) of the ray scanning apparatus, or may be integrally formed with the support frame 5. A length direction of the stationary guide rail 413 is perpendicular to the conveying direction of the object under inspection 6 on the ray scanning apparatus. A limit portion (not shown) may be disposed at one end of the stationary guide rail 413 in the length direction. When the detector set 41' is mounted, the slider 412 is aligned with the stationary guide rail 413, and the detector set 41' is pushed along the stationary guide rail 413 until abutting against the limit portion, so as to be moved to the predetermined mounting position.

The fixing device is disposed on a side of the detector set 41' in the width direction, and abuts against a surface 414 of a side of the detector arm 411 in the width direction. Specifically, the fixing device includes a positioning member 415 and a fastener 416, where the positioning member 415 is fixedly connected to the support frame 5, and its end surface away from the support frame 5 is formed as a mounting reference plane 417, which is used for abutting against the surface 414 of the side of the detector arm 411 in the width direction. The surface 414 is a mounting surface of the detector arm 411, and both of the surface 414 and the mounting reference plane 417 are machined to have good flatness, so that when the mounting surface 414 of the detector arm 411 abuts against the mounting reference plane 417 for fixing, the detector set 41' can be accurately positioned in the width direction. The fastener 416 can pass through the positioning member 415 and fasten the detector set 41' relative to an end surface of the positioning member 415. Specifically, the fastener 416 may be, for example, a fastening bolt, and corresponding threaded holes are provided on the positioning member 415 and a side surface, opposite to the positioning member 415, of the detector arm 411. By inserting the fastening bolt 416 into the corresponding threaded holes and tightening the same, the detector set 41' can be fastened relative to the end surface of the positioning member 415. A plurality of, such as at least two, fixing devices may be provided in the length direction of the detector set 41' to firmly fix the detector set 41' to the support frame 5.

Through the above mounting-fixing structure, when the detector set 41' is mounted, in a state that the detector units of the detector set 41' face downwards, the slider 412 on the detector set 41' is first aligned with the stationary guide rail 413, so that the detector set 41' is moved along the stationary guide rail 413 until abutting against the limit portion on the stationary guide rail 413; then, the fastening bolt 416 is inserted into the corresponding threaded holes on the positioning member 415 and the detector arm 411 and tightened, so as to position the detector set 41' relative to the end surface of the positioning member 415, namely, the mounting reference plane 417. When the detector set 41' is detached, reverse operations are performed.

Because the length direction of the stationary guide rail is perpendicular to the conveying direction of the object under inspection 6 on the ray scanning apparatus and a side of the detector set 41' in the X direction is not obstructed by the ray source assembly, the detector set 41' can be mounted or detached perpendicular to the conveying direction of the object under inspection 6 on the ray scanning apparatus relative to the support frame 5 by means of the above mounting-fixing structure. Moreover, the fixing device is disposed on a side of the detector set in the width direction, namely, a side of the detector assembly in the Z direction, which can avoid the obstruction of the ray source assembly to fasten the detector set and facilitate the mounting, detaching, and maintenance of the detector set.

In addition, optionally, in the above mounting-fixing structure, the second mounting portion is configured to support the detector set 41' at the predetermined mounting position in a state of engaging with the first mounting portion. Specifically, the slider 412 is disposed on two opposite sides of the detector arm 411 in the width direction, and includes internal extension portions 4121 and 4122 extending inwards from edges of the two opposite sides of the detector arm 411 in the width direction (see FIG. 15(*b*)); the stationary guide rail 413 includes external extension portions 4131 and 4132 extending outwards on the two opposite sides in the width direction (see FIG. 15(*b*)); and in the engaging state of the slider 412 and the stationary guide rail 413, the internal extension portions 4121 and 4122 of the slider 412 are located above the external extension portions 4131 and 4132 of the stationary guide rail 413, and are in contact and overlapped with the external extension portions 4131 and 4132. In this case, after the detector set 41' is moved along the stationary guide rail 413 to the predetermined mounting position, the detector set 41' can be suspended over the external extension portions 4131 and 4132 of the stationary guide rail 413 through the internal extension portions 4121 and 4122 of the slider 412. In this way, the stationary guide rail 413 can support the detector set 41' at the predetermined mounting position without other auxiliary structures or tools. When the detector set 41' is fastened, an operator can operate without supporting the detector set 41', and thus the convenience of operation is improved.

The detector set 43' and the detector set 41' are similarly mounted or detached by a combination of a slider and a stationary guide rail. Specifically, FIG. 16 shows a mounting-fixing structure suitable for the detector set 43' according to some specific embodiments, where (a) is a three-dimensional diagram of the detector set in a mounting state, and (b) is a side view of the detector set in the mounting state.

Figure 16:
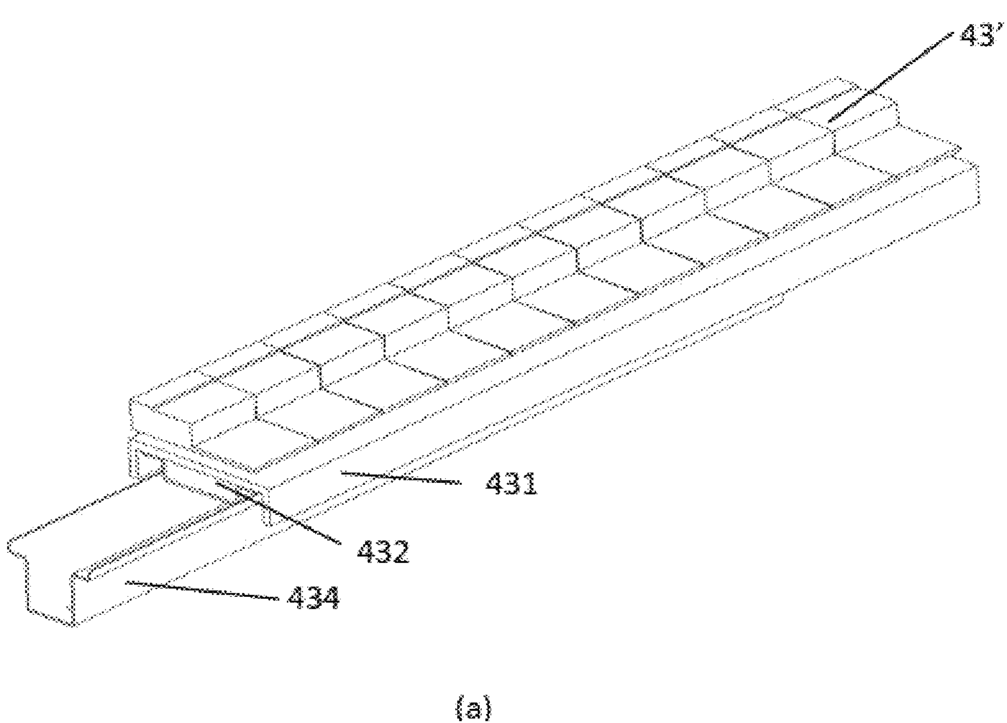
FIG. 16 shows a mounting-fixing structure suitable for a detector set according to some other embodiments of the present application.
Figure 16:
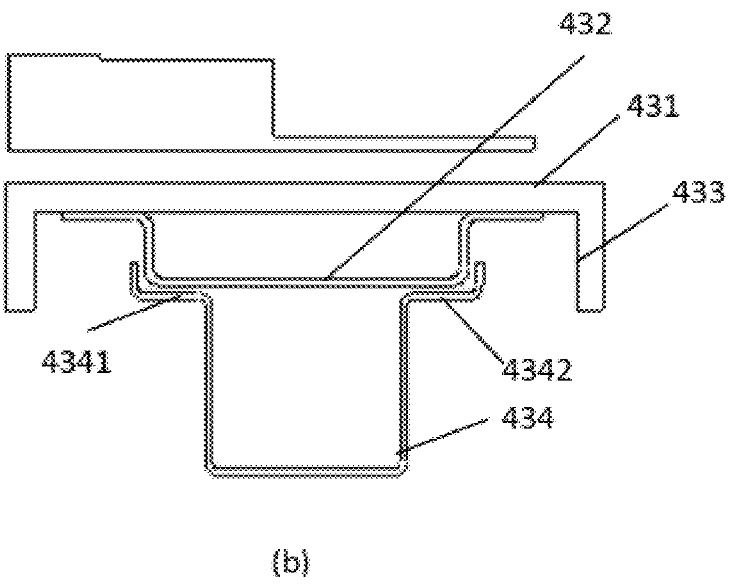

As shown in FIG. 16, the first mounting portion of the mounting-fixing structure for the detector set 43' includes a slider 432 disposed on the detector arm 431, and the slider 432 extends in a length direction of the detector arm 431. When the detector set 43' is mounted in the ray scanning apparatus, the length direction of the detector arm 431 is perpendicular to the conveying direction of the object under inspection 6 on the ray scanning apparatus. The slider 432 may be fixed to the detector arm 431 by bolt connection or the like or integrally formed with the detector arm 431. The detector arm 431 is formed with a groove 433 extending in the length direction, and the slider 432 is disposed in the groove 433.

The second mounting portion is formed as a stationary guide rail 434 matching the slider 432. The stationary guide rail 434 is fixedly connected to the support frame 5 of the ray scanning apparatus, or may be integrally formed with the support frame 5. A length direction of the stationary guide rail 434 is perpendicular to the conveying direction of the object under inspection 6. A limit portion (not shown) may be disposed at one end of the stationary guide rail 434 in the length direction; when the detector set 43' is mounted, the slider 432 is aligned with the stationary guide rail 434, and the detector set 43' is pushed along the stationary guide rail 434 until the detector arm 431 abuts against the limit portion, so as to move the detector set 43' to the predetermined mounting position.

The fixing device of the mounting-fixing structure for the detector set 43' is the same as that for the detector set 41', and a specific structure of the fixing device will not be described in detail here. With the fixing device, the detector set 43' can be firmly fixed against the corresponding mounting reference plane on the support frame 5. The detector arm 431 of the detector set 43' also includes a mounting surface on a side in the width direction, and similarly, the mounting surface and the mounting reference plane on the support frame 5 are machined to have good flatness, so that when the mounting surface of the detector arm 431 abuts against the mounting reference plane, the detector set 43' can be accurately positioned in the width direction. Similarly, a plurality of, such as at least two, fixing devices may be provided in the length direction of the detector set 43' to firmly fix the detector set 43' to the support frame 5.

Through the above mounting-fixing structure, when the detector set 43' is mounted, in a state that the detector units face upwards, the slider 432 on the detector set 43' is first aligned with the stationary guide rail 434, so that the detector set 43' is moved along the stationary guide rail 434 until abutting against the limit portion on the stationary guide rail 434; then, the fastening bolt is inserted into the corresponding threaded holes on the positioning member and the detector arm and tightened, so as to position the detector set 43' relative to the mounting reference plane of the positioning member. When the detector set 43' is detached, reverse operations can be performed.

Because the length direction of the stationary guide rail is perpendicular to the conveying direction of the object under inspection 6 on the ray scanning apparatus and a side of the detector set 43' in the X direction is not obstructed by the ray source assembly, the detector set 43' can be mounted or detached in a direction perpendicular to the conveying direction of the object under inspection 6 on the ray scanning apparatus relative to the support frame 5 by means of the above mounting-fixing structure. Moreover, the fixing device is disposed on a side of the detector set 43' in the width direction, namely, a side of the detector assembly in the Z direction, which can avoid the obstruction of the ray source assembly to fasten the detector set and facilitate the mounting, detaching, and maintenance of the detector set.

In addition, optionally, in the above mounting-fixing structure, the second mounting portion is configured to support the detector set 43' at the predetermined mounting position in a state of engaging with the first mounting portion. Specifically, as shown in FIG. 16, the stationary guide rail 434 includes support portions 4341 and 4342, and the support portions 4341 and 4342 are in sliding fit with the slider 432 and support the slider 432 from a bottom side of the slider 432, so as to support the detector set 43' at the predetermined mounting position from a bottom side thereof, after the detector set 43' is moved along the stationary guide rail 434 to the predetermined mounting position. In this way, when the detector set 43' is fastened, neither an additional tool nor an operator is required to support the detector set 43' for operation, thereby improving the convenience of operation.

Figure 17:
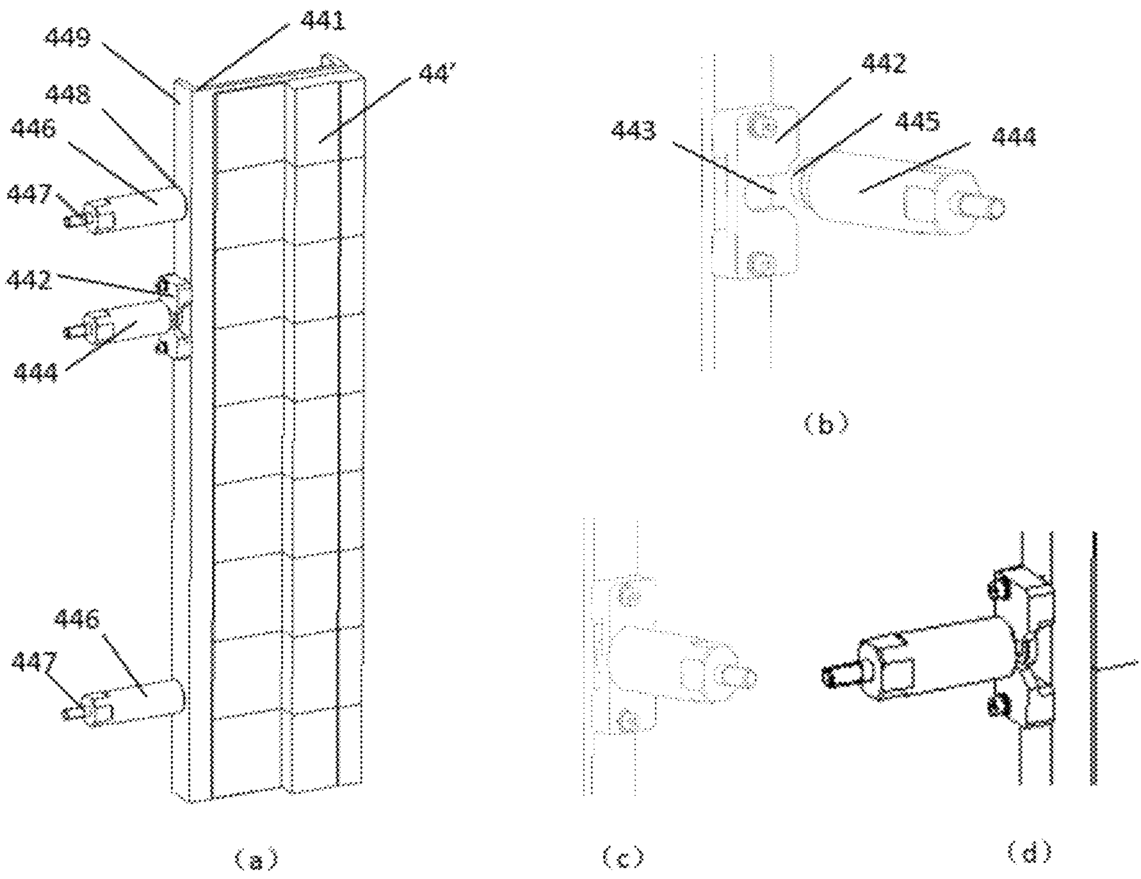
FIG. 17 shows a mounting-fixing structure suitable for a detector set according to some further embodiments of the present application.

FIG. 17 shows a mounting-fixing structure suitable for the detector set 44' according to some specific embodiments, where (a) is a three-dimensional diagram of the detector set in a mounting state, (b) is a schematic diagram of a first mounting portion and a second mounting portion of the mounting-fixing structure in a separate state, and (c) and (d) are three-dimensional diagrams of the first mounting portion and the second mounting portion of the mounting-fixing structure in in an engaging state from different perspectives.

The first mounting portion of the mounting-fixing structure for the detector set 44' is specifically formed as a fixing block 442 disposed on a side of the detector arm 441 in a width direction, and the fixing block 442 includes an opening 443 facing a side of the detector arm 441 in a thickness direction. In the mounting state of the detector set 44', the width direction of the detector arm 441 is consistent with the conveying direction of the object under inspection 6 of the ray scanning apparatus, and its thickness direction is perpendicular to the conveying direction of the object under inspection 6. The opening 443 of the fixing block 442 may be U-shaped or in other suitable shapes. The fixing block 442 may be fixedly connected to the detector arm 441 by a bolt or the like, or may be integrally formed with the detector arm 441.

The second mounting portion is formed as a cantilever portion 444 fixed on the support frame 5, an extension portion 445 is disposed at an end, away from the support frame 5, of the cantilever portion 444, and the extension portion 445 is in linear moving fit with the opening 443 on the fixing block 442, that is, the extension portion 445 can move linearly from an edge of the opening 443 to the inside of the opening 443. The length direction of the cantilever portion 444 is consistent with the conveying direction of the object under inspection 6 on the ray scanning apparatus. The bottom of the opening 443 may be used as a limit portion. When the detector set 44' is mounted, the opening 443 of the fixing block 442 on the detector arm 441 is aligned with the extension portion 445, and the detector arm 441 is moved linearly relative to the extension portion 445 until the bottom of the opening 443 abuts against the extension portion 445, so as to limit the detector set 44' to the predetermined mounting position.

The fixing device is disposed on a side of the detector arm 441 in the width direction (on the same side as the fixing block 442), an end surface of the fixing device is formed as a mounting reference plane, and the fixing device fastens the detector arm 441 relative to the mounting reference plane. Specifically, the fixing device may include a fixing member 446 and a fastener 447, and an end surface, away from the support frame 5, of the fixing member 446 is formed as a mounting reference plane 448, which is used for abutting against a surface 449 of a side of the detector arm 441 in the width direction. The surface 449 is a mounting surface of the detector arm 441, and the surface 449 and the mounting reference plane 448 are machined to have good flatness, so that when the mounting surface 449 of the detector arm 441 is fixed against the mounting reference plane 448, the detector set 44' can be accurately positioned in the width direction. The fastener 447 is used for fastening the detector arm 441 relative to the end surface 448 of the fixing member 446. The fastener 447 may be a fixing bolt, corresponding threaded holes are formed on a side, opposite to the fixing member 446, of the detector arm 441 in the width direction and the fixing member 446, and the securing bolt 447 can penetrate through the corresponding threaded holes on the fixing member 446 and the detector arm 441 and be tightened to fasten the detector set 44' relative to the mounting reference plane 448. In addition, a plurality of, such as at least two, fixing devices may be provided, and the plurality of fixing devices may be spaced apart from each other in the length direction of the detector set 44' to firmly fix and position the detector set 44'.

Through the above mounting-fixing structure, when the detector set 44' is mounted, in a state that the detector units face the scanning area and the width direction is consistent with the conveying direction of the object under inspection 6, the opening 443 of the fixing block 442 on the detector set 44' is first aligned with the extension portion 445 of the cantilever portion 444, and the detector set 44' is moved along the extension portion 445 until the bottom of the opening 443 abuts against the extension portion 445; then, the fastener 447 is inserted into the corresponding threaded holes on the fastener 446 and the detector arm 441 and tightened, so as to position the detector set 44' relative to the mounting reference plane 448 of the fastener 446. When the detector set 44' is detached, reverse operations can be performed.

According to the above mounting-fixing structure, the cantilever portion 444 extends in the conveying direction of the object under inspection 6 in the ray scanning apparatus, the width direction of the detector set 44' is parallel to the conveying direction of the object under inspection 6, and the opening 443 of the fixing block 442 faces a side of the detector set 44' in the thickness direction; thus, the detector set 44' can be mounted or detached in a direction perpendicular to the conveying direction of the object under inspection 6 by ensuring that the detector crystals face the scanning area.

In addition, optionally, in the above mounting-fixing structure, the second mounting portion is configured to support the detector set 44' at the predetermined mounting position in a state of engaging with the first mounting portion. That is, after the detector set 44' is moved to the predetermined mounting position relative to the extension portion 445 of the cantilever portion 444, the cantilever portion 444 can support the entire detector set 44' through the fixing block 442 without other auxiliary structures or tools. In this way, when the detector set 44' is fastened, neither an additional tool nor an operator is required to support the detector set 44' for operation, thereby improving the convenience of operation.

Although the respective detector sets 41', 42', 43', and 44' are mounted or detached by different mounting-fixing structures relative to the support frame 5, the respective detector sets can still be in the same plane perpendicular to the conveying direction of the object under inspection 6 as other detector sets after being mounted. Specifically, the mounting reference planes of the respective detector sets are disposed in the same plane perpendicular to the conveying direction of the object under inspection 6, which can ensure that the respective detector sets 41', 42', 43', and 44' are located in the same plane perpendicular to the conveying direction of the object under inspection 6 after being mounted in place.

Moreover, the linear moving fit between the first mounting portion and the second mounting portion of the mounting-fixing structure in FIG. 15 and FIG. 16 is a slider-guide rail fit. According to other embodiments, the mounting-fixing structure of the present application may use other linear moving fits, such as a linear sliding or linear rolling fit, such as a fit between a linear ball bearing and a cylindrical shaft.

The above describes the mounting-fixing structures for the detector sets of the detector assembly 4 of the ray scanning apparatus of the present embodiment. The following will continue to describe the features of other aspects of the ray scanning apparatus of the present embodiment.

The relative arrangement of the ray source assembly 3 and the detector assembly 4 of the ray scanning apparatus in the present embodiment is substantially the same as that in the foregoing embodiments. Like the foregoing embodiments, the ray source assembly 3 includes a plurality of ray source modules, which are arranged around the scanning area and located in a plane(s), especially in the same plane, perpendicular to the conveying direction of the object under inspection 6; the detector assembly 4 includes a plurality of detector sets located in another plane(s), especially in another same plane, perpendicular to the conveying direction of the object under inspection 6, and end portions of the detector sets are connected to each other to surround the scanning area; further, in a combined state of the ray source assembly 3 and the detector assembly 4, the detector assembly 4 is arranged on an inner side of the ray source assembly 3 in the direction perpendicular to the conveying direction of the object under inspection 6, and the ray source assembly 3 and the detector assembly 4 are arranged to overlap at least partially in the conveying direction of the object under inspection 6, where the plurality of detector sets of the detector assembly 4 may have any structure such as an enclosed square structure, rectangular structure, polygonal structure, or elliptical structure surrounding the scanning area as described in the foregoing embodiments; unlike the foregoing embodiments, the plurality of ray source modules of the ray source assembly 3 are arranged in a non-enclosed structure opened on the left side of the scanning area around the scanning area, such as a rectangular structure, polygonal structure, or elliptical structure opened on the left side as described earlier in the present embodiment.

Like the foregoing embodiments, each detector set of the detector assembly 4 on the same side as a ray source module relative to the scanning area in the present embodiment is optionally arranged not to obstruct the ray beam of said ray source module, while to be able to receive rays from the ray source modules on the remaining sides. Due to the annular arrangement of the ray source assembly 3 and the detector assembly 4 (where the ray source assembly 3 is arranged in a semi-enclosed ring opened on the left side), the same detector set can be shared by different ray source modules of the ray source assembly. In addition, the rays of each ray source module of the ray source assembly 3 can be detected by not only the detector set on the opposite side of the ray source module, but also the detector sets on other sides. Therefore, the rays of each ray source module can be detected by the detector assembly as much as possible. Therefore, the detector assembly in the present embodiment can reduce the quantity of detector sets and costs of apparatus, while improving image quality.

Moreover, like the foregoing embodiments, optionally, the detector crystals of each detector set of the detector assembly 4 are arranged at the end portions of the detector units in the conveying direction of the object under inspection 6, and is arranged, in the conveying direction of the object under inspection 6, immediately adjacent to the emission area of the ray beam of the ray source module on the same side relative to the scanning area, but does not obstruct the ray beam of said ray source module on the same side. Accordingly, the coverage length of an optical path between the ray source assembly and the detector assembly can be reduced as much as possible, thereby reducing the length of the apparatus.

Furthermore, like the foregoing embodiments, optionally, each ray source module of the ray source assembly 3 on the same side as a detector set relative to the scanning area is arranged so that its ray beam avoids said detector set and illuminates the detector crystals of the detector set on the opposite side of the ray source module. Specifically, like the foregoing embodiments, the ray source module can rotate a predetermined angle relative to a target spot axis to adjust the beam output angle of the ray source module, so that the center position of the ray beam illuminates the detector crystals. Since the detector crystals of the detector set are located at the end portions of the detector units in the conveying direction of the object under inspection 6 and arranged immediately adjacent to the emission area of the ray beam of the ray source module on the same side, by rotating the ray source module only a very small predetermined angle, such as 1.5 degrees, the center position of the ray beam can illuminate the detector crystals. In this way, the adverse effects of the ray beam obliquely incident on the surfaces of the detector crystals on imaging can be minimized. Like the foregoing embodiments, the ray source module may rotate around the target spot axis or other axes, or use other suitable ways mentioned in the foregoing embodiments, to adjust the output angle of the ray beam.

In addition, like the foregoing embodiments, projection data are also missing at the end portions of adjacent ray source modules of the ray source assembly in the present embodiment. Therefore, the image processing module of the ray scanning apparatus in the present embodiment is also configured to have a data compensation function, which can compensate for view angle missing data and/or repair a reconstructed image to improve image quality. The image processing module of the ray scanning apparatus of the present embodiment uses the same method as the foregoing embodiments for image reconstruction.

In addition to the same advantages as the ray scanning apparatus in the foregoing embodiments, the ray scanning apparatus in the present embodiment also has the following advantages.

The ray scanning apparatus of the present embodiment is particularly suitable for use in airport hand luggage safety inspection. Airport hand luggage has the characteristics of small volume (usually within 600 mm*400 mm), large length and width, and small thickness, and when the luggage is placed on the conveying device for inspection, its thickness is in an up-down direction, its width is in a left-right direction, and its length is in the conveying direction under normal circumstances. The ray scanning apparatus in the present embodiment is equipped with the ray source modules on the upper and lower sides of the scanning area to scan the luggage in the thickness direction. In this way, more projection data can be obtained in the thickness direction with a relatively small size. In addition, due to the small thickness of the luggage, the projection data in the thickness direction are less affected by self-obstruction and ray attenuation. Therefore, the projection data in the thickness direction are more accurate and clearer than those in other directions, which is conducive to improving image quality. Meanwhile, the ray source assembly of the ray scanning apparatus of the present application is equipped with a ray source module on only one side in the width direction of the luggage; in the width direction, the projection data are greatly affected by self-obstruction of the luggage and ray attenuation, the quality of the projection data is poorer than that of the projection data in the thickness direction, and the arrangement of the ray source module on only one side in the width direction of the luggage can reduce the cost of the ray source assembly while ensuring the image quality.

In addition, although the ray scanning apparatus of the present embodiment does not include a ray source module on the left side of the scanning area, a detector set on a right side opposite to the left side of the scanning area is still provided, which can receive rays from the ray source modules on the upper and lower sides, and increase the detection data corresponding to the rays of the ray source modules on the upper and lower sides. Therefore, compared to the arrangement that the detector set is only provided on the opposite side of each ray source module, the image quality can be improved.

Moreover, the present embodiment is described by taking the arrangement of the plurality of ray source modules in the same plane perpendicular to the conveying direction of the object under inspection as an example, but is also applicable to the situation where the plurality of ray source modules of the ray source assembly are arranged in different planes perpendicular to the conveying direction of the object under inspection.

In addition, the present embodiment is described by taking the arrangement of the plurality of detector sets of the detector assembly in the same plane perpendicular to the conveying direction of the object under inspection as an example, but is also applicable to the situation where the plurality of detector sets of the detector assembly are arranged in different planes perpendicular to the conveying direction of the object under inspection.

Figure 18:
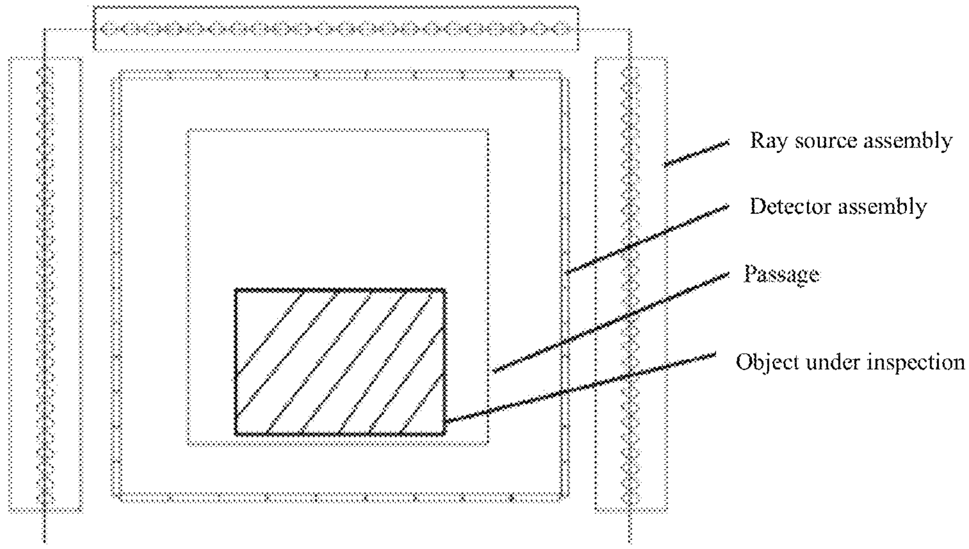
FIG. 18 is a schematic diagram of arrangement of a ray source assembly and a detector assembly of a ray scanning apparatus according to some embodiments of the present application.

In said foregoing embodiments, the ray scanning apparatus is described where the ray source assembly surrounds the scanning area on the upper, lower, left, and right sides. According to some other embodiments, the present application further provides a ray scanning apparatus, which is arranged in substantially the same way as the ray scanning apparatus of said foregoing embodiments, with the main difference in the arrangement of the ray source assembly. In the present embodiment, the ray source assembly is arranged around the scanning area only on the upper, left, and right sides thereof, that is, the ray source assembly is arranged around the scanning area only on an upper side of the conveying device, and no ray source module is disposed on a lower side of the conveying device (see FIG. 18 for details, FIG. 18 is a schematic diagram of layout of the ray source assembly and the detector assembly according to the present embodiment). Here, the upper side of the conveying device not only includes the right upper side of the conveying device, but also includes lateral upper sides of the conveying device. In addition, the upper side of the conveying device is not strictly limited to being higher than the conveying device, and the situation where the upper side of the conveying device is roughly as high as or slightly lower than the conveying device also falls within the scope of the present embodiment.

Specifically, in the ray scanning apparatus of said foregoing embodiments, each ray source module of the ray source assembly 3 is a distributed ray source, and the plurality of ray source modules may be arranged in a rectangular structure, a polygonal structure, an elliptical structure, or the like surrounding the scanning area. In the present embodiment, the plurality of ray source modules of the ray source assembly may still be distributed ray sources, and the difference lies in that the plurality of ray source modules are arranged in a non-enclosed structure opened on the lower side of the conveying device around the scanning area, such as a rectangular structure, a polygonal structure, or an elliptical structure opened on the lower side of the conveying device. In said foregoing embodiments, the ray source assembly 3 is arranged in a discontinuous or continuous rectangular structure, a continuous polygonal structure, a continuous rounded rectangle, a discontinuous polygonal or discontinuous rounded rectangular structure, and other polygonal and elliptical structures; while in the present embodiment, the ray source assembly is arranged in a discontinuous or continuous rectangular structure, a continuous polygonal structure, a continuous rounded rectangular structure, a discontinuous polygonal or discontinuous rounded rectangular structure, and other polygonal and elliptical structures opened on the lower side of the conveying device. For example, compared to the ray source assembly shown in FIG. 2, the ray source assembly 3 of the present embodiment does not include at least the ray source module 33 on the lower side, and does not include portions of the ray source modules 32 and 34 lower than the conveying device 1 in some situations. For example, compared to the ray source assembly shown in FIG. 4(*b*)-(*c*), the ray source assembly 3 of the present embodiment does not include at least the ray source module on a lower side of the object under inspection 6.

In addition, like said foregoing embodiments, the ray source assembly of the present embodiment may further be composed of a plurality of single-point source groups, with the only difference in that the ray source assembly 3 of the present embodiment does not include single-point sources at the bottom view angle, the lower left squint angle, and the lower right squint angle.

In addition to the above differences, the features of other aspects of the ray source assembly in the present embodiment are the same as those of the ray source assembly 3 in said foregoing embodiments.

The features of various aspects of the detector assembly in the present embodiment are substantially the same as those of the detector assembly 4 in said foregoing embodiments, except that in the present embodiment, the detector assembly is combined with the ray source assembly that surrounds the scanning area on only the upper, left, and right sides, no ray source module is disposed on the same side as the detector set of the detector assembly 4 that is located on the lower side of the scanning area, and the mounting and detaching of the detector set of the detector assembly 4 that is located on the lower side of the scanning area will not be hindered by the ray source module there. Therefore, the respective detector sets of the detector assembly may be mounted or detached by the same mounting-fixing structure as descried in said foregoing embodiments, and the detector set on the lower side of the scanning area may also be mounted or dismounted relative to the support frame 5 in a direction perpendicular to the conveying direction of the object under inspection 6, when being not obstructed by the ray source module on the left or right side, specifically, by using the mounting-fixing structure described in FIG. 16.

In addition, the relative arrangement of the ray source assembly 3 and the detector assembly 4 of the ray scanning apparatus in the present embodiment is substantially the same as that in said foregoing embodiments. Specifically, like said foregoing embodiments, the ray source assembly 3 includes a plurality of ray source modules, which are arranged around the scanning area and located in a plane(s), especially in the same plane, perpendicular to the conveying direction of the object under inspection 6; the detector assembly 4 includes a plurality of detector sets located in another plane(s), especially in another same plane, perpendicular to the conveying direction of the object under inspection 6, and end portions of the detector sets are connected to each other to surround the scanning area; further, in a combined state of the ray source assembly 3 and the detector assembly 4, the detector assembly 4 is arranged on the inner side of the ray source assembly 3 in the direction perpendicular to the conveying direction of the object under inspection 6, and the ray source assembly 3 and the detector assembly 4 are arranged to overlap at least partially in the conveying direction of the object under inspection 6, where the plurality of detector sets of the detector assembly 4 may have any structure such as an enclosed square structure, rectangular structure, polygonal structure, or elliptical structure surrounding the scanning area as described in said foregoing embodiments. Unlike said foregoing embodiments, the plurality of ray source modules of the ray source assembly 3 are arranged in a non-enclosed structure opened on the lower side of the conveying device around the scanning area, such as a rectangular structure, polygonal structure, or elliptical structure opened on the lower side of the conveying device as described earlier in the present embodiment.

Like the foregoing embodiments, each detector set of the detector assembly 4 on the same side as a ray source module relative to the scanning area in the present embodiment is optionally arranged not to obstruct the ray beam of said ray source module, but to be able to receive rays from the ray source modules on the remaining sides. Due to the annular arrangement of the ray source assembly 3 and the detector assembly 4 (where the ray source assembly 3 is arranged in a semi-enclosed ring opened on the lower side), the same detector set can be shared by different ray source modules of the ray source assembly. In addition, the rays of each ray source module of the ray source assembly 3 can be detected by not only the detector set on the opposite side of the ray source module but also the detector sets on other sides, and thus, the rays of each ray source module can be detected by the detector assembly as much as possible. Therefore, the detector assembly in the present embodiment can reduce the quantity of detector sets and costs of apparatus while improving image quality.

Moreover, like said foregoing embodiments, optionally, the detector crystals of each detector set of the detector assembly 4 are arranged at the end portions of the detector units in the conveying direction of the object under inspection 6, and are arranged, in the conveying direction of the object under inspection 6, immediately adjacent to the emission area of the ray beam of the ray source module on the same side relative to the scanning area, while do not obstruct the ray beam of said ray source module on the same side. Accordingly, the coverage length of an optical path between the ray source assembly and the detector assembly can be reduced as much as possible, thereby reducing the length of the device.

Further, like said foregoing embodiments, optionally, each ray source module of the ray source assembly 3 on the same side as a detector set relative to the scanning area is arranged so that its ray beam avoids said detector set and illuminates the detector crystals of the detector set on the opposite side of the ray source module. Specifically, like said foregoing embodiments, the ray source module can rotate a predetermined angle relative to a target spot axis to adjust the beam output angle of the ray source module, so that the center position of the ray beam illuminates the detector crystals. Since the detector crystals of the detector set are located at the end portions of the detector units in the conveying direction of the object under inspection 6 and arranged immediately adjacent to the emission area of the ray beam of the ray source module on the same side, by rotating the ray source module only a very small predetermined angle, such as 1.5 degrees, the center position of the ray beam can illuminate the detector crystals. In this way, the adverse effects of the ray beam obliquely incident on the surface of the detector crystals on imaging can be minimized. Like said foregoing embodiments, the ray source module may rotate around the target spot axis or other axes, or use other suitable ways mentioned in said foregoing embodiments, to adjust the output angle of the ray beam.

In addition, like said foregoing embodiments, projection data are also missing at the end portions of the adjacent ray source modules of the ray source assembly in the present embodiment. Therefore, the image processing module of the ray scanning apparatus in the present embodiment is also configured to have a data compensation function, which can compensate for view angle missing data and/or repair a reconstructed image to improve image quality. The image processing module of the ray scanning apparatus in the present embodiment uses the same method as said foregoing embodiments for image reconstruction.

In addition to the same advantages as the ray scanning apparatus in said foregoing embodiments, the ray scanning apparatus in the present embodiment further has the following advantages.

No ray source module is arranged on the lower side of the conveying device in the ray scanning apparatus of the present embodiment, and thus the height of the conveying device can be reduced and the transportation of the object under inspection to the conveying device is facilitated. In addition, compared to said foregoing embodiments where a ray source module is also arranged on the lower side of the conveying device, the present embodiment can save costs of the apparatus.

In addition, although the ray scanning apparatus of the present embodiment is not provided with a lower ray source module, a detector set on the upper side opposite to the lower position is still provided, which can receive rays from the ray source modules on the left and right sides, and increase detection data corresponding to the rays of the ray source modules on the left and right sides. Therefore, compared to the arrangement that the detector sets are disposed only on the opposite sides of the respective ray source modules, the image quality can be improved.

Moreover, the present embodiment is described by taking the arrangement of the plurality of ray source modules in the same plane perpendicular to the conveying direction of the object under inspection as an example, but is also applicable to the situation where the plurality of ray source modules of the ray source assembly are arranged in different planes perpendicular to the conveying direction of the object under inspection.

In addition, the present embodiment is described by taking the arrangement of the plurality of detector sets of the detector assembly in the same plane perpendicular to the conveying direction of the object under inspection as an example, but is also applicable to the situation where the plurality of detector sets of the detector assembly are arranged in different planes perpendicular to the conveying direction of the object under inspection.

In said foregoing embodiments, the ray scanning apparatus is described where the ray source assembly and the detector assembly surround the scanning area on the upper, lower, left, and right sides. According to some other embodiments, the present application further provides a ray scanning apparatus, which has substantially the same structure as the ray scanning apparatus of said foregoing embodiments, with the difference only in the arrangement of the ray source assembly and the detector assembly. The specific differences are as follows: in the present embodiment, when observed from the conveying direction of the object under inspection, the plurality of ray source modules of the ray source assembly are arranged around the scanning area in a non-enclosed structure opened on one side of the scanning area, the plurality of detector sets of the detector assembly are arranged around the scanning area also in a non-enclosed structure opened on one side of the scanning area, and the opening of the non-enclosed structure of the detector assembly is opposite to the opening of the non-enclosed structure of the ray source assembly; further, the plurality of detector sets of the detector assembly are fixed in the same plane perpendicular to the conveying direction of the object under inspection, while the plurality of ray source modules of the ray source assembly are fixed in a plurality of different planes perpendicular to the conveying direction of the object under inspection, for example, the ray source module of the ray source assembly that is arranged on the open side of the non-enclosed structure of the detector assembly is fixed in the same plane perpendicular to the conveying direction of the object under inspection as the respective detector sets of the detector assembly, while other ray source modules of the ray source assembly are fixed in another plane(s) perpendicular to the conveying direction of the object under inspection.

The structure and arrangement of the ray source assembly of the ray scanning apparatus according to the present embodiment are described in detail below.

Like said foregoing embodiments, the ray source assembly of the ray scanning apparatus in the present embodiment includes a plurality of ray source modules, and each ray source module may be a distributed ray source. As a distributed ray source, each ray source module may include a plurality of target spots, each target spot of each ray source module may generate a ray beam separately, and the respective target spots may generate the ray beam according to a predetermined time sequence under the control of the control device. The ray beam may be a fan-shaped beam with a flare angle A, as shown in FIG. 3. The ray beam is not limited to the sector beam, but may be in other shapes such as a conical beam or parallel beam, which may be set according to specific requirements.

Figure 19:
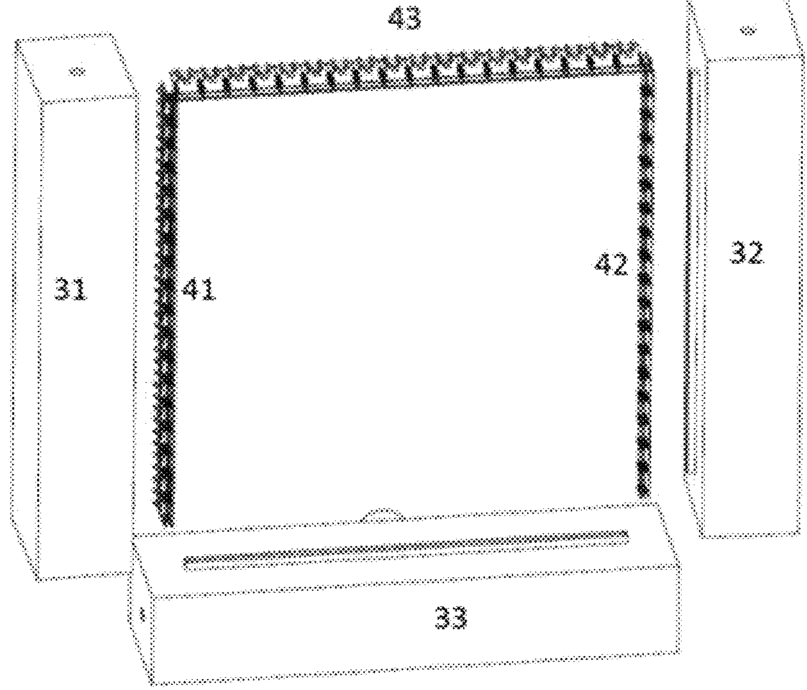
FIG. 19 is a three-dimensional schematic diagram of layout of a ray source assembly and a detector assembly of a ray scanning apparatus according to some embodiments of the present application.
Figure 20:
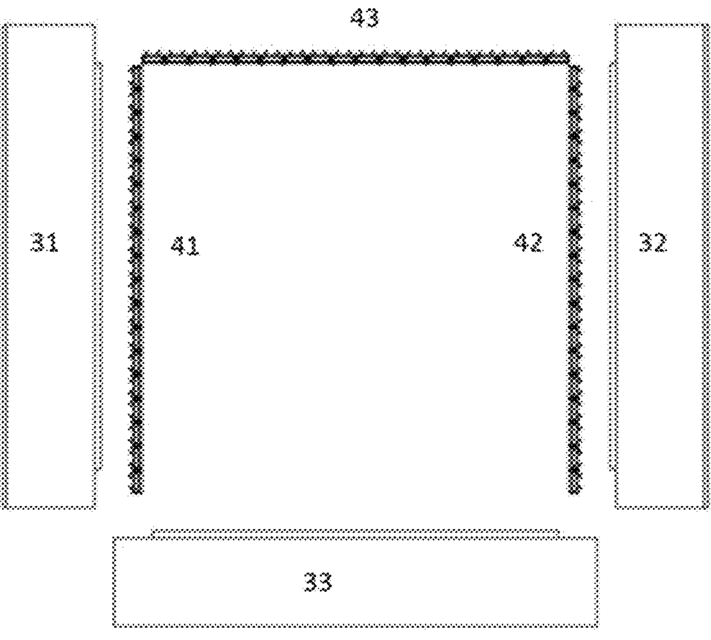
FIG. 20 is a side view of layout of the ray source assembly and the detector assembly of the ray scanning apparatus shown in FIG. 19, observed along a Z axis.
Figure 21:
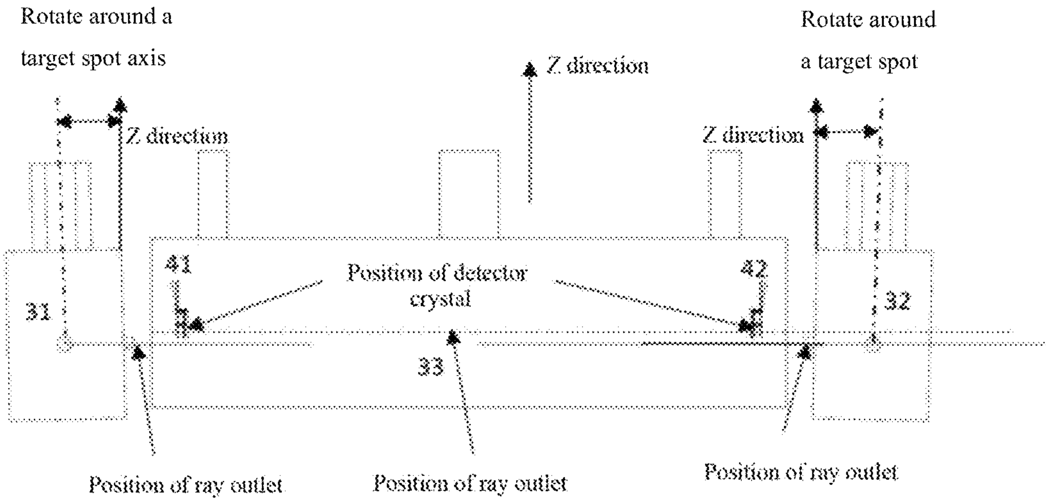
FIG. 21 is a top view of layout of the ray source assembly and the detector assembly of the ray scanning apparatus shown in FIG. 19.

In said foregoing embodiments, observed in the conveying direction of the object under inspection, the plurality of ray source modules of the ray source assembly surround the scanning area on four sides, while in the present embodiment, when observed in the conveying direction of the object under inspection, the plurality of ray source modules of the ray source assembly are arranged around the scanning area on only three sides, that is, arranged around the scanning area in a non-enclosed structure opened on one side of the scanning area. Specifically, as shown in FIGS. 19-21, FIG. 19 is a three-dimensional schematic diagram of layout of the ray source assembly and the detector assembly of the ray scanning apparatus according to the present embodiment, FIG. 20 is a side view of the ray source assembly and the detector assembly shown in FIG. 19 when observed in the conveying direction of the object under inspection, and FIG. 21 is a top view of layout of the ray source assembly and the detector assembly shown in FIG. 19, where the ray source modules on the left and right sides of the scanning area are arranged in the same plane perpendicular to the conveying direction of the object under inspection (as shown by ray outlet positions indicated by solid lines in FIG. 21), while the ray source module on the lower side of the scanning area is arranged in another plane perpendicular to the conveying direction of the object under inspection (as shown by a ray outlet position indicated by a dashed line in FIG. 21); when observed in the conveying direction of the object under inspection, the ray source assembly 3 includes ray source modules 31, 32, and 33 arranged on the left, right, and lower sides of the scanning area respectively, and the ray source modules 31, 32, and 33 form a non-enclosed structure opened on the upper side of the scanning area and arranged around the scanning area. In the illustrated embodiment, the ray source modules are straight line distributed ray sources, and the non-enclosed structure of the ray source assembly is a right-angled rectangular structure opened on the upper side of the scanning area. The ray source modules 31, 32, and 33 of the ray source assembly 3 are not limited to the straight line distributed ray sources, and may alternatively be in an arc or broken line shape or the like according to some other embodiments. The ray source modules in the straight line, arc or broken line shape may be provided or combined as required, so that when observed in the conveying direction of the object under inspection, the ray source assembly 3 may appear as a rounded rectangular structure, a polygonal structure, an elliptical structure, or the like opened on the upper side of the scanning area and arranged around the scanning area. In addition, when observed in the conveying direction of the object under inspection, the ray source modules of the ray source assembly 3 are not limited to being disposed on the left, right, and lower sides of the scanning area, but may alternatively be disposed on the upper, left, and right sides, the upper, lower and left sides, or the upper, lower and right sides, depending on the actual usage situations. In the following description of the present embodiment, the situation where the ray source modules are arranged on the left, right, and lower sides of the scanning area is described as an example, but the described principle is also applicable to the situations where the ray source modules are arranged on any other three sides.

Like said foregoing embodiments, the plurality of ray source modules of the ray source assembly in the present embodiment may also be mounted and detached independently of each other, that is, each ray source module includes a separate chamber to accommodate a respective ray generating device. Each ray source module includes a separate chamber, which means that a plurality of target spots of each ray source module share a separate vacuum chamber. The distance between the target spots of each ray source module in the vacuum chamber may be determined by the quantity of target spots and the length of the chamber. According to some embodiments, the quantity of target spots in the single ray source module may be 192, 264, etc., and the distance between the target spots in the single ray source module may be 4 mm, 12 mm, etc. Each ray source module includes a separate chamber, which has the following advantages: compared to a ray source assembly with an integrated annular chamber (namely, all target spots of the ray source assembly are located in the same annular vacuum chamber), the shell size of the single ray source module and the volume of the internal vacuum chamber can be reduced, so that the volume and weight of the single ray source module are reduced, thereby facilitating mounting and detaching of the ray source assembly; further, each ray source module includes a separate vacuum chamber, which can reduce the risk of internal ignition when the ray source module is maintained.

Further, like said foregoing embodiments, each ray source module of the ray source assembly 3 is equipped with a mounting-positioning structure to facilitate the mounting and adjustment of the ray source module. With the mounting-positioning structure, each ray source module of the ray source assembly 3 may be mounted and fixed at a predetermined position in the ray scanning apparatus. In addition, with the mounting-positioning structure, the ray source module may further be rotated to adjust the output angle of the ray beam. The respective ray source modules of the ray source assembly 3 may be mounted in different ways due to their different positions in the ray scanning apparatus, and include different mounting-positioning structures. For example, the ray source modules located on the left and right sides of the scanning area can be mounted by hoisting with a device such as a crane, and the ray source module located on the lower side of the scanning area is not suitable for being mounted by hoisting, but can be mounted and fixed by the mounting-positioning structure described in said foregoing embodiments (such as the mounting-positioning structure shown in FIG. 5), and the output angle of its ray beam may be adjusted by the same.

Figure 22:
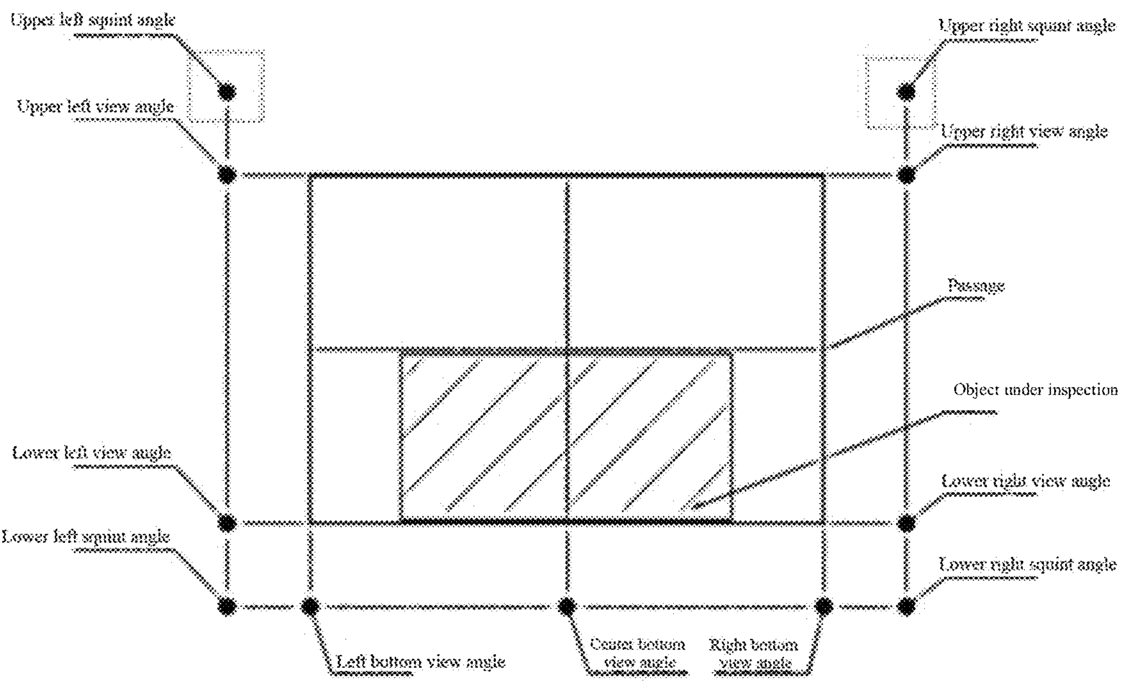
FIG. 22 is a schematic diagram of distribution of single-point sources of a ray source assembly of a ray scanning apparatus according to some embodiments of the present application.

In addition, like said foregoing embodiments, the ray source assembly 3 may also be composed of a plurality of single-point sources, each ray source module may be a single-point source group, and each single-point source group includes at least two single-point sources. Each single-point source can emit a ray beam separately, such as a fan-shaped beam with a flare angle A (as shown in FIG. 3). The respective single-point sources of the ray source assembly 3 can emit rays in a predetermined time sequence under the control of the control device of the ray scanning system. In the case where the respective ray source modules are single-point source groups, when observed in the conveying direction of the object under inspection 6, the single-point source groups are at least distributed at bottom, left, and right view angles, and may be further distributed at corner squint angles, such as at a lower left squint angle and a lower right squint angle, and even further distributed at an upper left squint angle and an upper right squint angle (as shown in FIG. 22).

Hereinafter, the arrangement of the detector assembly 4 of the ray scanning apparatus in the present embodiment is described in detail. Like said foregoing embodiments, the detector assembly 4 may include a plurality of detector sets, which are optionally located in the same plane perpendicular to the conveying direction of the object under inspection 6. In addition, like said foregoing embodiments, the detector set of the present embodiment is also a detector array including a plurality of detector units.

Figure 23:
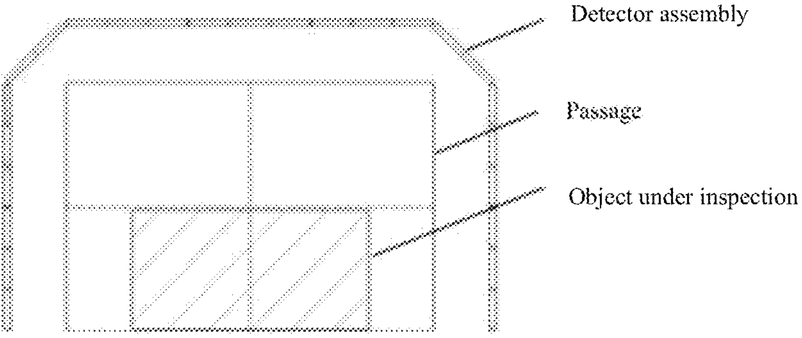
FIG. 23 is a schematic structural diagram of a detector assembly of a ray scanning apparatus according to some embodiments of the present application.

Moreover, in said foregoing embodiments, when observed in the conveying direction of the object under inspection, the plurality of detector sets of the detector assembly 4 are arranged around the scanning area on four sides, forming an enclosed structure around the scanning area, while in the present embodiment, when observed in the conveying direction of the object under inspection, the detector sets of the detector assembly 4 are arranged around the scanning area on only three sides, namely, arranged in a non-enclosed structure opened on one side of the scanning area and around the scanning area. Specifically, as shown in FIGS. 19-21, the detector assembly 4 includes detector sets 41, 42, and 43 arranged on the left, right, and upper sides of the scanning area respectively, and end portions of the detector sets 41, 42, and 43 are connected to each other to form a non-enclosed structure opened on one side of the scanning area and arranged around the scanning area. In the embodiments shown in FIGS. 19-21, the detector sets 41, 42, and 43 are straight line detector arrays including a plurality of detector units arranged in a straight line, so as to form a non-enclosed rectangular or square structure opened on the lower side of the scanning area. However, the detector assembly 4 of the present embodiment is not limited to the above structure and may alternatively be arranged in other structures. For example, the detector assembly 4 may include 3 long straight line detector arrays and 2 short straight line detector arrays, which are alternately arranged around the scanning area and connected at end portions to form a non-enclosed polygonal structure opened on the lower side of the scanning area (as shown in FIG. 23). In addition, the detector assembly 4 may further include other quantities of long straight line detector arrays and short straight line detector arrays, which are alternately arranged around the scanning area and connected at end portions to form other non-enclosed polygonal structures opened on the lower side of the scanning area. The detector sets of the detector assembly 4 in the present embodiment may alternatively be arc-shaped detector arrays, and the plurality of arc-shaped detector arrays are arranged around the scanning area and connected at end portions to form a non-enclosed elliptical structure opened on the lower side of the scanning area. The detector sets of the detector assembly 4 in the present embodiment may alternatively be a combination of straight line detector arrays and arc-shaped detector arrays to form a non-enclosed structure in other shapes that is opened on the lower side of the scanning area, such as a rounded rectangular structure opened on the lower side of the scanning area. Here, the structure of the detector units and the structure of the detector sets in the form of straight line detector arrays and arc-shaped detector arrays are identical to the structures described in said foregoing embodiments.

Moreover, the detector sets of the detector assembly 4 are not limited to being disposed on the left, right, and upper sides of the scanning area as shown in FIGS. 19-21, and may alternatively be disposed on the lower, left, and right sides, the upper, lower, and left sides, or the upper, lower, and right sides, as long as the opening of the non-enclosed structure of the detector assembly is opposite to the opening of the non-enclosed structure of the ray source assembly. In the present embodiment, the situation shown in FIGS. 19 to 21 where the detector sets are disposed on the left, right, and upper sides of the scanning area is described as an example, but the present embodiment is also applicable to the situation where the detector sets are arranged on any other three sides.

In addition, like said foregoing embodiments, in some embodiments, the respective detector sets of the detector assembly 4 may be mounted and detached independently of each other, thereby improving the maintainability of the detector assembly. Moreover, like said foregoing embodiments, the plurality of detector sets of the detector assembly 4 in the present embodiment are configured to move in the conveying direction of the object under inspection 6 for being mounted and detached. In this case, when the detector sets of the detector assembly 4 are arranged on the inner side of the ray source assembly 3 in the direction perpendicular to the conveying direction of the object under inspection 6, the detector sets can be mounted, detached, adjusted, and maintained without detaching the ray source assembly, thereby further improving the maintainability of the detector assembly. The detector sets 41, 42, and 43 of the detector assembly 4 as shown in FIGS. 19-21 can move parallel to the conveying direction of the object under inspection 6 for being mounted and detached, and can thus be mounted, detached, adjusted, and maintained without detaching the ray source modules 31, 32, and 33. The detector sets 41, 42, and 43 of the detector assembly 4 may depend on the same mounting-fixing structure as described in said foregoing embodiments (such as the embodiment shown in FIG. 9 and variants thereof) to move in the conveying direction of the object under inspection 6 relative to their mounting positions in the ray scanning apparatus, so as to be mounted to or detached from the mounting positions. For example, like said foregoing embodiments, the detector sets 41, 42, and 43 may be mounted to the support frame 5 of the ray scanning apparatus or detached from the support frame 5 via their respective detector arms.

Figure 24:
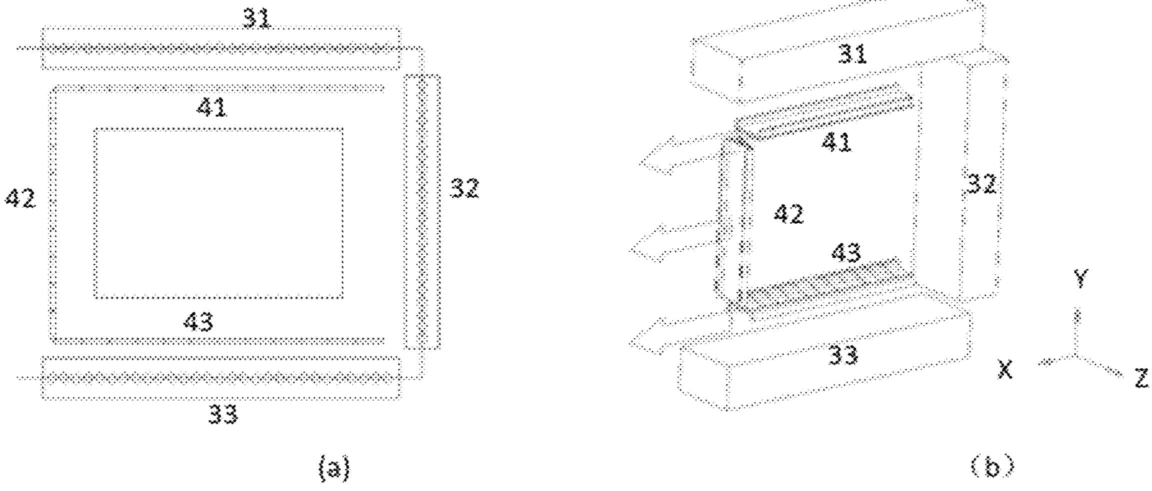
FIG. 24 is a schematic diagram of detaching directions of a detector assembly according to some embodiments of the present application.

In addition, when the opening of the non-enclosed structure of the ray source assembly or the detector assembly faces the left or right side of the scanning area, the detector sets of the detector assembly 4 may alternatively move in the direction perpendicular to the conveying direction of the object under inspection for being mounted and detached. As shown in FIG. 24, when observed in the conveying direction of the object under inspection, the opening of the non-enclosed structure of the ray source modules 31, 32, and 33 of the ray source assembly faces the left side of the scanning area, while the opening of the non-enclosed structure of detector sets 41, 42, and 43 of the detector assembly 4 faces the right side of the scanning area. In this case, the detector sets 41, 42, and 43 may move relative to their mounting positions (such as the support frame 5) in the direction perpendicular to the conveying direction of the object under inspection for being mounted or detached, and the specific moving directions are as shown by arrows in FIG. 24(*b*). Since no ray source module is disposed on the left side of the scanning area, the ray source assembly does not hinder the foregoing movement of the detector assembly, making it easy to mount and detach the detector sets. The above-described mounting-fixing structure suitable for mounting and detaching the detector sets in the direction perpendicular to the conveying direction of the object under inspection, such as the mounting-fixing structure described with reference to FIGS. 15-17 and variants thereof, may be used to implement such mounting and detaching.

Alternatively, some of the detector sets of the detector assembly 4 may move in the conveying direction of the object under inspection for being mounted and detached, while the other may move in the direction perpendicular to the conveying direction of the object under inspection for being mounted and detached. For example, in the embodiments shown in FIGS. 19-21, if the highest point of the ray source module 31 or 32 on the left or right side of the scanning area is lower than the detector set 41 above the scanning area, the detector set 41 may alternatively move in the direction perpendicular to the conveying direction of the object under inspection for being mounted and detached. The specific mounting-fixing structure may be the one in the embodiment shown in FIG. 15 and variants thereof. Similarly, if the detector sets of the detector assembly 4 are arranged on the left, right, and lower sides of the scanning area, and the lower detector set is lower than the lowest point of the ray source module on the left side or right side, the lower detector set may alternatively move in the direction perpendicular to the conveying direction of the object under inspection for being mounted and detached. The specific mounting-fixing structure may be the one in the embodiment shown in FIG. 16 and variants thereof.

Moreover, like said foregoing embodiments, the plurality of detector sets of the detector assembly are located in the same plane perpendicular to the conveying direction of the object under inspection 6 after being mounted, by means of their respective mounting surfaces and corresponding mounting reference planes (disposed in the same plane perpendicular to the conveying direction of the object under inspection 6).

Hereinafter, the relative arrangement of the ray source assembly 3 and the detector assembly 4 of the ray scanning apparatus according to the present embodiment is further described. The relative arrangement of the ray source assembly 3 and the detector assembly 4 in the present embodiment is different from that in said foregoing embodiments. In the present embodiment, in the combined state of the ray source assembly and the detector assembly, the opening of the non-enclosed structure of the ray source assembly is opposite to the opening of the non-enclosed structure of the detector assembly, the plurality of detector sets of the detector assembly are fixed in the same plane perpendicular to the conveying direction of the object under inspection, while the plurality of ray source modules of the ray source assembly are arranged in a plurality of planes perpendicular to the conveying direction of the object under inspection, for example, the ray source module of the ray source assembly that is arranged on the open side of the non-enclosed structure of the detector assembly is fixed in the same plane perpendicular to the conveying direction of the object under inspection as the respective detector sets of the detector assembly, while other ray source modules of the ray source assembly are fixed in another plane(s) perpendicular to the conveying direction of the object under inspection. The other ray source modules of the ray source assembly may be located in another single plane or a plurality of other different planes perpendicular to the conveying direction of the object under inspection, and optionally in another single plane. The present embodiment is described by taking the arrangement of the other ray source modules being located in another single plane perpendicular to the conveying direction of the object under inspection (as shown in FIG. 21) as an example, but is also applicable to the situation of being located in a plurality of other different planes.

In the combined state of the ray source assembly and the detector assembly, the ray source assembly may have a structure as described in any of the foregoing implementations, such as a rectangular, polygonal, or elliptical structure opened on one side of the scanning area when observed in the conveying direction of the object under inspection, and the detector assembly may have a structure as described in any of the foregoing implementations, such as a square, rectangular, polygonal, or elliptical structure opened on one side of the scanning area, as long as the opening of the ray source assembly is opposite to that of the detector assembly. Hereinafter, the embodiment shown in FIGS. 19-21 is used as an example to describe the detailed arrangement of the ray source assembly 3 and the detector assembly 4 in the combined state. However, the same principle is also applicable to combinations of the ray source assembly 3 and the detector assembly 4 in any other structures.

In some examples, similar to said foregoing embodiments, based on the combination of the ray source assembly 3 and the detector assembly 4 as described above, considering the annular arrangement (semi-enclosed ring) of the detector assembly, each of the detector sets 41, 42, and 43 of the detector assembly 4 may be arranged to be able to receive rays from the ray source modules on the remaining sides, so that the plurality of ray source modules of the ray source assembly can share each detector set of the detector assembly. Accordingly, the quantity of detector sets can be reduced. In addition, since the rays of the ray source modules 31 and 32 can be detected by the detector sets 42 and 41 on their opposite sides and can also be received by other detector sets except the detector sets on the same side as the ray source modules 31 and 32 relative to the scanning area, and the rays of the ray source module 33 can be received by all the detector sets 41, 42, and 43, the rays of the respective ray source modules can be detected by the detector assembly as much as possible. As a result, although the ray source modules and the detector sets are arranged on only three sides of the scanning area, the ray scanning apparatus in the present embodiment can still obtain enough detection data for image reconstruction. Meanwhile, due to the reduction of ray source modules and detector sets, the weight of the apparatus can be reduced, which is conducive to the construction of a lightweight ray scanning apparatus.

Moreover, in some examples, the ray source module 33 of the ray source assembly 3 is arranged in the same plane perpendicular to the conveying direction of the object under inspection as the detector sets 41, 42, and 43 of the detector assembly 4, and this specifically means that the ray outlet of the ray source module 33 directly faces the detector crystals of the respective detector sets (as shown in FIG. 21). Therefore, the ray beam of the ray source module 33 can cover more detector crystals, which is conducive to obtaining more detection data and improving image quality.

Furthermore, in some examples, similar to the respective detector sets in said foregoing embodiments, when observed in the conveying direction of the object under inspection, namely, in the direction perpendicular to the conveying direction of the object under inspection, the detector set 41 or 42 of the detector assembly 4 on the same side as the other ray source module 31 or 32 relative to the scanning area is arranged between the other ray source module 31 or 32 of the ray source assembly 3 and the scanning area, and in the conveying direction of the object under inspection, the other ray source module 31 or 32 overlaps at least partially with the detector set 41 or 42 on the same side as them (as shown in FIG. 21). Therefore, the length of the device covered by the optical path between the ray source assembly and the detector assembly can be reduced, thereby reducing the total length of the apparatus.

In addition, similar to the respective detector sets of said foregoing embodiments, in the case that the detector set 41 or 42 overlaps at least partially with the ray source module 31 or 32 in the conveying direction of the object under inspection, the detector set 41 or 42 on the same side as the ray source module 31 or 32 relative to the scanning area is configured to avoid the ray beam of the ray source module 31 or 32, and receive the rays of the ray source modules on all the remaining sides except the ray source module on the same side.

Furthermore, similar to said foregoing embodiments, the detector crystals of each detector set of the detector assembly 4 are arranged at the end portions of the detector units in the conveying direction of the object under inspection, and the detector set 41 or 42 of the detector assembly 4 on the same side as the other ray source module 31 or 32 relative to the scanning area is arranged, in the conveying direction of the object under inspection, immediately adjacent to the emission area of the ray beam of the ray source module 31 or 32, but does not obstruct the ray beam of the ray source module 31 or 32. Therefore, the ray source assembly 3 and the detector assembly 4 can overlap as much as possible in the conveying direction of the object under inspection 6, thereby minimizing the length of the device covered by the optical path between the ray source assembly and the detector assembly to reduce the total length of the apparatus.

In some examples, similar to said foregoing embodiments, the ray source module 31 or 32 of the ray source assembly 3 on the same side as the detector set 41 or 42 relative to the scanning area is arranged so that its ray beam avoids the detector set 41 or 42 and illuminates the detector crystals of the detector set on the opposite side. Further, similar to said foregoing embodiments, the ray source module 31 or 32 can rotate a predetermined angle relative to its target spot axis to adjust the output angle of its ray beam, so that the center position of its ray beam illuminates the detector crystals on the opposite side of the ray source module 31, 32. Since the detector crystals of the detector set are located at the end portions of the detector units in the conveying direction of the object under inspection and arranged immediately adjacent to the emission area of the ray beam of the ray source module on the same side as the detector set, by rotating the ray source module only a very small predetermined angle, such as 1.5 degrees, the center position of the ray beam can illuminate the detector crystals. In this way, the adverse effects of the ray beam obliquely incident on the surfaces of the detector crystals on imaging can be minimized. In addition, like said foregoing embodiments, the ray source module may rotate around the target spot axis or other axes, or use other suitable ways mentioned in said foregoing embodiments, to adjust the output angle of the ray beam.

Moreover, similar to said foregoing embodiments, projection data may also be missing at the end portions of the adjacent ray source modules of the ray source assembly in the present embodiment. For example, in the embodiment shown in FIGS. 19-21, the distances between the target spots of the adjacent end portions of the ray source modules 31 and 33 and of the adjacent end portions of the ray source modules 33 and 32 may be greater than the distance between target spots in each ray source module, and thus projection data are missing at these end portions. Therefore, similar to said foregoing embodiments, the image processing module of the ray scanning apparatus in the present embodiment is also configured to have a data compensation function, which can compensate for view angle missing data and/or repair a reconstructed image to improve image quality. The image processing module of the ray scanning apparatus in the present embodiment uses the same method as said foregoing embodiments for image reconstruction.

According to some other embodiments, since the ray source modules 31, 32 and 33 are arranged in different planes perpendicular to the conveying direction of the object under inspection, the adjacent end portions of the ray source modules 31 and 33 and/or the adjacent end portions of the ray source modules 33 and 32 may be configured to overlap in the conveying direction of the object under inspection in some examples, so that the target spots of adjacent end portions of the adjacent ray source modules 31 and 33, or 32 and 33 overlap, or the distance between said target spots is not greater than the distance between the target spots in each ray source module. In this case, there is no missing projection data, and accordingly, the data compensation function of the image processing module is not required for image reconstruction.

In addition to the same advantages as the ray scanning apparatus of said foregoing embodiments, the ray scanning apparatus of the present embodiment further has the following advantages.

The ray source assembly and the detector assembly in the present embodiment surround the scanning area on only three sides, which can obtain enough data for image reconstruction, and can also reduce the cost and weight of the apparatus to provide a lightweight ray scanning apparatus, compared to the situation that one or both of the ray source assembly and the detector assembly surround the scanning area on four sides.

In the present embodiment, a separate ray source module on one side of the scanning area is provided to directly face the detector crystals of the detector assembly, so that the rays of the ray source module can cover more detector units, which is beneficial to increasing data quantity and improving image quality.

The above describes the ray scanning apparatus where the ray source assembly surrounds the scanning area on the upper, lower, left, and right sides or any three of the four sides. According to some other embodiments, the ray source assembly may alternatively be arranged to surround the scanning area on any two of the upper, lower, left, and right sides.

The above describes the mounting-positioning structure for each ray source module of the ray source assembly. The mounting-positioning structure is not limited to use in the ray scanning apparatus of the present application, but may also be used in other suitable ray scanning apparatus.

The above describes various mounting-fixing structures for detector sets. The mounting-fixing structures are not limited to use in the ray scanning apparatus of the present application, but may also be used in other suitable ray scanning apparatus. The mounting-fixing structures in the embodiments may be used alone or used together in a single ray scanning apparatus.

The foregoing descriptions are merely preferred embodiments of the present application, but are not intended to limit the present application. For those skilled in the art, the embodiments of the present application may have various modifications and variations. Any modifications, equivalent replacements, improvements, and the like made within the spirit and principle of the present application shall fall within the protection scope of the present application.

Those skilled in the art should understand that the above embodiments are all illustrative but not restrictive. Different technical features appearing in different embodiments can be combined to achieve beneficial effects. Those skilled in the art should be able to understand and implement other modified embodiments of the disclosed embodiments after studying the drawings, description, and claims. In the claims, the term "comprise" does not exclude other apparatuses or steps; when an article is not modified by a quantifier, it is intended to include one or more articles, and can be exchanged with the "one or more articles" for use; the terms "first" and "second" are used to denote names rather than to indicate any specific order. Any reference numerals in the claims should not be construed as limiting the scope of protection. The functions of a plurality of portions appearing in the claims can be implemented by a single hardware or software module. The appearance of certain technical features in different dependent claims does not mean that these technical features cannot be combined to achieve beneficial effects.

What is claimed is:

1. A ray scanning apparatus, comprising:

a conveying device, for conveying an object under inspection to pass through a scanning area of the ray scanning apparatus;

a ray source assembly, comprising a plurality of ray source modules, each ray source module comprising multiple ray source points each emitting a ray beam, wherein the plurality of ray source modules are arranged around the scanning area merely from three sides on an upper side of the conveying device, forming a U-shape with an opening toward a lower side of the conveying device, and the plurality of ray source modules are fixed in a plane perpendicular to a conveying direction of the object under inspection; and a detector assembly, for detecting rays transmitting through the object under inspection during scanning and comprising a plurality of detector sets, end portions of the plurality of detector sets being connected to each other to surround the scanning area from four sides in a closed shape, and the plurality of detector sets being fixed in a plane perpendicular to the conveying direction of the object under inspection, wherein the detector assembly is located between the ray source assembly and the scanning area in a direction perpendicular to the conveying direction of the object under inspection, the ray source assembly and the detector assembly are arranged to at least partially overlap with each other in the conveying direction of the object under inspection, and the plurality of ray source modules can be mounted and detached independently of each other.

2. The ray scanning apparatus according to claim 1, wherein the ray source module is a distributed ray source.

3. The ray scanning apparatus according to claim 1, wherein each of the plurality of ray source modules is a single-point source group, a plurality of single-point source groups are arranged at least on a left view angle, a right view angle, a top view angle, and corner squint angles on the upper side of the conveying device, and each single-point source group comprises at least two single-point sources.

4. The ray scanning apparatus according to claim 1, wherein each ray source module comprises a separate chamber to accommodate a respective ray generating device and the separate chamber of each ray source module is provided with a mounting-positioning structure, which is adapted for mounting and positioning the ray source module and rotating the ray source module to adjust an output angle of the ray beam.

5. The ray scanning apparatus according to claim 1, wherein each detector set is a detector array comprising a plurality of detector units, and the plurality of detector sets are arranged in a closed square, rectangular, polygonal, or elliptical structure surrounding the scanning area.

6. The ray scanning apparatus according to claim 1, further comprising:

an image processing module configured to compensate for missing projection data at end portions of the ray source modules and/or repair a reconstructed image to obtain a complete reconstructed image.

7. The ray scanning apparatus according to claim 2, wherein each of the plurality of ray source modules is a straight line distributed ray source, and the plurality of straight line distributed ray sources are arranged on upper, left, and right sides of the scanning area, wherein end portions of the plurality of straight line distributed ray sources are directly connected to or spaced apart from each other.

8. The ray scanning apparatus according to claim 2, wherein the plurality of ray source modules comprise a plurality of first distributed ray sources and a plurality of second distributed ray sources, the plurality of first distributed ray sources are arranged alternately with the plurality of second distributed ray sources, and their end portions are directly connected to or spaced apart from each other.

9. The ray scanning apparatus according to claim 8, wherein the first distributed ray sources are straight line distributed ray sources, and the second distributed ray sources are straight line distributed ray sources or arc-shaped distributed ray sources shorter than the first distributed ray sources.

10. The ray scanning apparatus according to claim 5, wherein each detector set is a straight line detector array, and the detector assembly comprises four straight line detector arrays, which are arranged on the upper, lower, left, and right sides of the scanning area respectively to form the rectangular or square structure.

11. The ray scanning apparatus according to claim 5, wherein each detector set is a straight line detector array, the detector assembly comprises a plurality of first straight line detector arrays and a plurality of second straight line detector arrays, the second straight line detector arrays are shorter than the first straight line detector arrays, and the first straight line detector arrays and the second straight line detector arrays are arranged alternately around the scanning area to form a polygonal structure.

12. The ray scanning apparatus according to claim 5, wherein the respective detector sets of the detector assembly can be mounted and detached independently of each other.

13. The ray scanning apparatus according to claim 5, wherein each detector set of the detector assembly on the same side as a ray source module relative to the scanning area is configured to avoid the ray beam of said ray source module and to receive rays from the ray source modules on all the remaining sides except said ray source module.

14. The ray scanning apparatus according to claim 5, wherein each detector unit of the detector set comprises a detector crystal for receiving the rays transmitting through the object under inspection during scanning, and the detector crystal is arranged at an end portion of the detector unit in the conveying direction of the object under inspection and arranged to be, in the conveying direction of the object under inspection, immediately adjacent to emission area of the ray beam of the ray source module on the same side relative to the scanning area while not to obstruct the ray beam.

15. The ray scanning apparatus according to claim 12, wherein the respective detector sets of the detector assembly are configured to move in the conveying direction of the object under inspection for being mounted and detached.

16. The ray scanning apparatus according to claim 15, wherein each detector set of the detector assembly comprises a detector arm, the ray scanning apparatus comprises a support frame being stationary relative to a mounting platform of the ray scanning apparatus, and the detector set moves in the conveying direction of the object under inspection or the direction perpendicular to the conveying direction of the object under inspection through the detector arm, so as to be mounted to the support frame or detached from the support frame.

17. The ray scanning apparatus according to claim 12, wherein some of the detector sets of the detector assembly are configured to move in the conveying direction of the object under inspection for being mounted and detached, and other detector sets are configured to move in the direction perpendicular to the conveying direction of the object under inspection for being mounted and detached.

18. The ray scanning apparatus according to claim 14, wherein each ray source module of the ray source assembly on the same side as a detector set relative to the scanning area is arranged so that its ray beam avoids said detector set and illuminates the detector crystal of the detector set on the opposite side of the ray source module.

19. The ray scanning apparatus according to claim 18, wherein each ray source module is configured to rotate around a target spot axis so as to illuminate the detector crystal of the detector set on the opposite side of the ray source module with a center position of the ray beam.

20. The ray scanning apparatus according to claim 6, wherein the image processing module is configured to perform image reconstruction by an iterative method, an image domain repair method, or a combination of the both.

* * * * *